United States Patent [19]

Sugawara et al.

[11] Patent Number: 5,499,193
[45] Date of Patent: *Mar. 12, 1996

[54] AUTOMATED SYNTHESIS APPARATUS AND METHOD OF CONTROLLING THE APPARATUS

[75] Inventors: Tohru Sugawara, Osaka; Shinji Kato, Takatsuki, both of Japan

[73] Assignee: Takeda Chemical Industries, Ltd., Osaka, Japan

[*] Notice: The term of this patent shall not extend beyond the expiration date of Pat. No. 5,164,159.

[21] Appl. No.: 79,375

[22] Filed: Jun. 21, 1993

Related U.S. Application Data

[63] Continuation-in-part of Ser. No. 870,426, Apr. 17, 1992, abandoned.

[30] Foreign Application Priority Data

Apr. 17, 1991 [JP] Japan ................................ 3-085492
Jun. 23, 1992 [JP] Japan ................................ 4-043600 U

[51] Int. Cl.$^6$ ................................ G01N 33/50
[52] U.S. Cl. .................... 364/500; 364/496; 364/502; 422/68.1; 422/62; 422/63; 422/67
[58] Field of Search ................ 364/500, 496, 364/502, 497; 422/70, 68.1, 62, 63, 67, 81, 135, 138; 436/161, 180

[56] References Cited

U.S. PATENT DOCUMENTS

| | | | |
|---|---|---|---|
| 4,543,637 | 9/1985 | Smith et al. | 364/500 |
| 4,589,072 | 5/1986 | Arimatsu | 364/500 |
| 4,668,476 | 5/1987 | Bridgham et al. | 364/500 |
| 4,744,037 | 5/1988 | Nina et al. | 364/497 |
| 4,754,410 | 6/1988 | Leech et al. | 364/513 |
| 4,910,691 | 3/1990 | Skeirik | 364/500 |
| 5,164,159 | 11/1992 | Hayashi et al. | 364/500 |
| 5,239,484 | 8/1993 | Hayashi et al. | 364/500 |
| 5,316,726 | 5/1994 | Babson et al. | 422/65 |
| 5,316,728 | 5/1994 | Hayashi et al. | 422/70 |
| 5,362,447 | 11/1994 | Nokihara | 422/131 |
| 5,380,495 | 1/1995 | Chang et al. | 422/131 |
| 5,428,470 | 6/1995 | Labirola, II | 359/119 |
| 5,437,838 | 8/1995 | De Moranville et al. | 422/67 |

FOREIGN PATENT DOCUMENTS

| | | |
|---|---|---|
| 0332452A1 | 3/1989 | European Pat. Off. . |
| 0335628A3 | 3/1989 | European Pat. Off. . |
| 0332452 | 9/1989 | European Pat. Off. . |
| 0335628 | 10/1989 | European Pat. Off. . |

OTHER PUBLICATIONS

Omega Engineering, The pH & Conductivity Handbook, pp. Z–3 to Z–16, 1992.

*Primary Examiner*—Emanuel T. Voeltz
*Assistant Examiner*—Patrick J. Assouad
*Attorney, Agent, or Firm*—Wenderoth, Lind & Ponack

[57] ABSTRACT

An automatic synthesizing apparatus for continuously effecting automatically by a controlling apparatus all the operations including the supplying of samples into reaction vessel and so on, reaction processing of the contents within the reaction vessels, PH adjustment, extraction/dehydration processing, purification of the contents, and further analysis of the reaction condition so as to produce the target compounds. Many basic unit operation procedures are made and stored so that programs for effecting the operation controlling of the automatic synthesizing apparatus may be extremely easily made. The innumerable syntheses programs in the chemical experiments may be effected simply by the inputting of the operation names of the unit operation procedures in the operational orders when the synthesis order programs may be made for each target compound.

37 Claims, 20 Drawing Sheets

AUTOMATED SYNTHESIS APPARATUS AND METHOD OF CONTROLLING THE APPARATUS

This is a continuation in-part application of now abandoned U.S. patent application Ser. No. 07/870,426 filed on Apr. 17, 1992 now abandoned.

BACKGROUND OF THE INVENTION

The present invention generally relates to an automated synthesis apparatus for compounds and a method of controlling the automated synthesis apparatus, and more particularly, to an automated synthesis apparatus for compounds and a method of controlling the automated synthesis apparatus capable of fully automatically synthesizing, with a computer controlled by programs, many derivatives of specific compound structure of various compounds.

In pharmaceutical research, one specific compound is required to be synthesized in large numbers respectively from various compounds so as to investigate the relationship between chemical structures and biological activity.

The conventional synthesizing operations are effected manually in accordance with experience. Most operations of quantifying the sample to supply it to a reaction vessel, of stirring the contents in the reaction vessel, of taking out reactant from the reaction vessel to move it to a purifying device, further washing the reaction vessel or the like after the completion of the manufacture of the products are manually effected mainly by researchers. Therefore, a lot of time and hands are required for this type of synthesizing operation which is necessary for pharmaceutical basic research.

Automation is demanded for this type of synthesizing operation. Conventionally, automated reaction apparatuses, of a batch type, or the like are provided to meet the demand. But automated apparatuses for purifying and isolating products followed by a series of synthesis procedure are hardly provided. In order to make the reactions optimum in the above described automated reaction apparatus, analyzing techniques using high performance liquid chromatography (HPLC) or the like, requiring the measurement for a comparatively long time period have to be used.

Therefore, the present invention provides an automated synthesis apparatus capable of automatically processing, as a series, the formation and isolation of compounds of a wide range from samples such as raw materials, regents, solvents or the like. The automated synthesis apparatus (such as disclosed in Japanese Laid-Open Patent Application Tokuheisho No. 2-2870) is composed of a synthesis processing apparatus I and a control apparatus II as shown in FIG. 21. The synthesis processing apparatus I is provided with a series of units composed of a sample supply unit 1, a reaction unit 2, a purifying unit 3, a hot & cold medium circulating unit 4, a washing solvent supply unit 5, an exhaust gas - drain water unit 6. Although not shown, a reaction tracing (reaction analysis) unit or the like may be additionally provided. Each unit of the above described synthesis processing apparatus I is connected, through an interface 9, with a computer 8 of the automated control apparatus II. Reference numeral 10 is a main power source.

Each of the above described units is controlled and operated in accordance with a program stored and inputted to the computer 8. In each service unit composed of the heating & cooling medium circulating unit 4, a washing solvent supplying unit 5 and the exhaust gas - drain water unit 6, the materials, reagents, catalysts, solvents and so on are fed to the reaction unit 2 from the sample supply unit 1 while the ambient conditions of the reaction unit 2 and the purifying unit 3 are being adjusted. The reaction processing such as heating, cooling, concentrating, PH adjusting and so on is effected in the reaction unit 2. A product produced through the reaction processing in the purifying unit 3 is purified so as to automatically obtain products.

A target compound to be produced by the above described automated synthesis apparatus varies over a wide range and the synthesizing procedures are different in accordance with the target compounds. Namely, a series of synthesizing procedure programs are different for each specific target compound, and an individual synthesizing procedure program is required in accordance of the specific target compounds.

Synthesizing procedure programs for automatically controlling the synthesis processing apparatus I as a series in accordance with the individual target compounds are very hard to make. For example, the sample supply unit 1 is provided with a plurality of volumetric tubes and liquid level boundary sensors for quantifying the raw materials, reagents, and solvents, and many flow lines for transferring to the next step the raw materials, the reagents, and solvents from each of the liquid storage containers and many electromagnetic valves for switching flow passages interposed in each flow line. The reaction unit 2 is provided with a plurality of reaction vessels for raw materials to be fed from the above described sample supply unit, a separator funnel where the reaction vessels and the tunnel contents (reaction mixture) can be circulated, a vessel for PH adjusting use where the reaction vessels and the reaction mixture can be circulated, and where the reagent can be fed from the above described sample supply unit 1.

Each unit has many components, and they are complicated in construction. The whole automated synthesis processing apparatus is provided with about one hundred fifty valves, about thirty relays, and about twenty sensors. Furthermore, flow lines which relate these elements organically are very complicated.

When creating a synthesizing procedure program for synthesizing one specific target compound, a sub-program (unit operation procedure) with the operating conditions of many electromagnetic valves, relays, and sensors arranged in order is required even for one operation procedure for feeding materials to the specific reaction vessel from, for example, a specific liquid storing container. The number of unit operation procedures necessary to reach a final stage for separately taking the target compound finally from a first stage of starting the material supply may be about one hundred.

Since the construction of an apparatus using hardware is extremely complicated, and the making of a software program for driving and controlling the hardware is complicated, the program maker has to be familiar with the knowledge of the hardware of the synthesis processing apparatus and its program. Otherwise, the program is impossible to make in reality. Even if the automation of the apparatus is made possible, it is very difficult to make programs for automatically controlling the apparatus in accordance with the target compound.

The above described problem is based on the fact that compounds to be synthesized by the automated synthesis apparatus cannot be formed using a single or a few synthesizing procedure programs, and different programs are respective.

The conventional program has a defect consisting of inferior flexibility in that it is incapable of stopping operation even when the reaction processing operation should be stopped in a case where, for example, the reaction is completed earlier than the reaction setting time, which is understood by viewing with the naked eye, with the operation control of the synthesis processing apparatus being effected as the program progresses.

In a conventional method of confirming the separation of two layers by the eyes of a person, the separation thereof in a separated liquid funnel and a PH adjusting cell and so on must be confirmed by a tester. Also, when the degree of skill of an experimenter is low, a confirmation error is likely to be caused, with a problem in that a separated liquid error and a PH adjustment error are likely to be caused by the operation error after the confirmation.

Therefore, an apparatus capable of automatically detecting the separation of two layers is desired, and also, two layers are desired to be automatically divided and be taken out by a separated liquid funnel, and the automatic adjustment of the PH is desired to be effected by the PH adjustment cell.

SUMMARY OF THE INVENTION

Accordingly, the present invention has been developed with a view to substantially eliminate the above discussed drawbacks inherent in the prior art, and has for its essential object to provide an improved automated synthesis apparatus and a method of controlling the automated synthesis apparatus.

Another important object of the present invention is to provide an automated synthesis apparatus and a method of controlling the apparatus, wherein a series of operation programs from the stage of the raw feeding operation to the final stage of isolation and separation of the final products are easily and quickly made.

Further, the present invention has been developed with a view to substantially eliminate the above discussed drawbacks inherent in the prior art and has for its essential object to provide a liquid separated detecting apparatus for automatically confirming the separation of two liquids.

Furthermore, the other object of the present invention is an apparatus which is capable of dividing and taking out the separated two liquids in the separated liquid funnel, and is capable of the automatic adjustment of the PH in a PH adjusting cell.

In order to achieve the above described demands in accordance with the present invention, a unit operation procedure to be made necessary in the making of a series of synthesizing procedure programs, for example, a unit operation procedure for effecting the volumetric supply to a specific reaction vessel of the reaction unit from the specific liquid storing container out of the sample supply unit or a unit operation procedure composed of unit operation and so on for carrying the content liquid to another specific reaction vessel from the specific reaction vessel are all programmed in advance and are stored in a retaining means such as floppy or the like. When a series of automated synthesis procedure programs of the specific target compound are made, the above described unit operating procedures are selected when necessary. The programs can be made quickly with extreme efficiency simply with the combination of the data names of the unit operation procedures.

The present invention is characterized in that various synthesizing procedure programs can be made easily with the use of the above described unit operation procedures, and also, that when the synthesizing procedure programs made are loaded, executed with the programs for automated synthesis control use, an interrupting operations of the interrupt program may be effected with the manual operation of the keys of the computer, the execution stop of the above described synthesizing procedure program, the earlier start of the next step, and so on may be changed so as to retain the flexibility in the program execution.

The present invention is to provide an automated synthesis apparatus having various advantages in that a correct driving operation is effected with the above described synthesizing procedure programs, various operations necessary in the synthesizing operation of the various target compounds can be combined, accuracy is provided, loss is less in the respective operations, and so on.

Concretely, the present invention is to provide an automated synthesis apparatus composed of a synthesis processing apparatus provided with a means for moving the contents to the other containers and circulating them to the containers from at least one container selected from the respective kinds of liquid storing containers including a plurality of reaction vessels, a means for reacting the contents within one reaction vessel selected, a means for automatically effecting analyses by an analyzer with at least one portion of the contents taken out of the above described reaction vessel, a means for separating, purifying specific materials, with a separate purifier, from the contents of the above described reaction vessel, a means for restoring each of the above described means into an initial condition, and a control apparatus provided with a retaining means where many unit operating procedures necessary for operating each means of the above described synthesis processing apparatus are stored in advance, a retaining means where a procedure for the synthesizing of specific target compounds is selected from many unit operation procedures stored, the synthesis procedure program made with the operation order of the selected unit operation procedure being set is stored, a retaining means where the above described unit operation procedure is loaded in accordance with the operation order of the above described synthesizing procedure program so as to couple a series of unit operation procedures for the synthesis processing, programs for automated synthesis control use for operating the above described selected means are stored in accordance with the coupled unit operation procedures, a computer for effecting the operation control of each means of the above described synthesis processing apparatus with the program for the above described automated synthesis control use.

The means for moving the contents to the other containers from one container in the above described automated processing apparatus and for circulating them to the container is provided with flow lines communicated mutually with among the respective means and among the components of the respective means, opening, closing valve means, volumetric devices, sensors interposed in the flow lines, with the opening, closing valve means, the volumetric devices and sensors being connected with the above described control apparatus.

The above described reaction means is composed of at least one of a temperature controller for controlling the reaction temperature of the contents, a stirrer for stirring the contents, an adder for adding a reagent to the contents in a dropwise fashion, a timer for controlling the reaction time of the contents, a dryer for drying the contents, and an extractor for extracting the specific reaction mixture from the contents.

The above described analyzer may be a meter for measuring the characteristics of the reaction mixture, including an HPLC apparatus. The above described separator/purifier may also include an HPLC apparatus. The above described restorer includes a washing means for washing each described element.

The synthesis processing apparatus in accordance with the present invention is provided with a sample supply unit, a reaction vessel unit, an extraction/dehydration unit, a PH adjusting unit, a reaction tracing unit for analyzing, a purifying unit including a fraction collector, a temperature control unit, and a washing unit. Each of the above described elements are included in the above described units.

The above described sample supply unit is provided with a plurality of liquid storage containers for storing liquids such as raw materials, reagents, solvents, PH adjusting liquids and so on, a feeder for automatically feeding the above described liquids from a storage cell to these liquid storage containers, a volumetric tube for determining volumetrically the above described liquid from the above described liquid storage containers, and a transportation confirming sensor, a flow line for circulating from each of the above described liquid storing container to the next step, and an electromagnetic valve for opening and closing flow passages interposed in each flow line.

The above described reaction vessel unit, extraction/dehydrating unit, PH adjusting unit and reaction tracing unit for analytical use compose a reaction unit in a broad sense. The reaction unit is provided with a plurality of reaction vessels and PH adjusting vessels, flow lines adapted to feed the liquid of an optional liquid storage container from among liquid storage containers provided in the above described sample feeding unit with respect to each of these vessels, flow lines provided for their mutually free circulating operations among the above described plurality of reaction vessels and among these reaction vessels and the PH adjusting vessels, extraction/separation funnels and dehydrating tubes provided for their mutually free circulating operations through the flow lines among the above described respective vessels, tracing HPLC for reaction liquid analyzing use connected through the above described reaction vessels and flow lines, and electromagnetic valves for opening and closing the flow passages interposed in each of the above described flow lines.

The above described purifying unit is provided with a purifying HPLC connected through the respective reaction vessels and flow lines provided in the above described reaction units, and with a fraction collector connected to the purifier so as to feed optional purified products collected by the fraction collector and so that the optional purified products can also be transferred to the reaction vessels of the above described reaction units through the flow lines.

The above described temperature control unit is provided with a circulator for circulating hot or cold media to heat or cool the above described reaction vessels and a heater for heating the reaction vessels. The above described washing unit is provided with a washer for moving the washing liquid to the above described reaction vessel and volumetric unit.

The above described reaction vessel is provided with a jacket on its outer peripheral portion so as to effect a heating or cooling operation. The above described hot or cold media are adapted to be circulated in the space between the vessel and the jacket. Stirring blades and so on are provided within the vessel so as to stir the reaction liquid within the vessel. An opening portion connected to a pressure reducer and a thermoelectric couple operated as a concentration sensor are mounted in the upper opening portion of the vessel. The reaction mixture is concentrated by heating at a reduced pressure. The existence of the vapor from the vessel is detected by the thermoelectric couple so as to detect the extent of the concentration.

A reflux condenser may be provided so as to be in communication with the upper portion of the above described reaction vessel so that the vapor is liquefied to drip into the vessel. Also, the stirring operation may be effected with bubbling through the introduction of air or inert gases or the like into the reaction vessel. The reaction vessel may be placed in an oil bath provided with a heater or the like. Filters and transportation confirming photosensors may be desirably provided near the dehydrating tubes and valves, liquid and gas take-out and introduction portions of the flow lines. A plurality of storage vessels where solutions are temporarily stored for their repeated extraction may be desirably provided on the extraction apparatus.

The present invention provides a controlling method of an automated synthesis apparatus comprising steps of automatically controlling a synthesis processing apparatus provided with a means for transferring the contents to the other container and circulating them to the container from at least one container selected from the respective kinds of liquid storing containers including a plurality of reaction vessels, a means for reacting the contents within one reaction vessel selected, a means for automatically analyzing with a selected analyzer one portion of the contents taken out of the above described reaction vessel, a means for separating and purifying specific materials, with a separating purifier, from the contents of the above described reaction vessel, a means for restoring each of the above described means to an initial condition, effecting in advance the unit operation procedures necessary for operating the above described respective means to keep them stored in the retaining means, selecting a unit operation procedure necessary for a specific synthesis processing from the above described stored unit operation procedures, effecting a synthesis procedure program for deciding the operation order of the above described selected unit operation procedure, loading the above described synthesis procedure program with an automated synthesis controlling program so as to load the above described unit operation procedure in accordance with the operation order of the synthesis procedure program, automatically operating the above described selected means sequentially with the output of the computer in accordance with the operation order of a series of coupled unit operation procedure loaded.

The correction & addition of the unit operation procedure for composing the synthesis procedure program and/or change in the operation order can be made with the use of synthesis procedure program for synthesizing the other specific target compound stored with the retaining means so as to make the synthesis procedure program for synthesizing the above described specific target compound being made in advance.

The above described unit operation procedures for operating the above described respective means are composed of unit operation procedures to be enumerated hereinafter.

The unit operation procedure for operating a means for transferring the contents to the other container from the above described one liquid storing container and circulating the contents to the container comprises a procedure of feeding a required amount to one specific reaction vessel of the reaction unit from one specific liquid storing container of the sample supply unit, a procedure of feeding the entire amount of the sample to one specific reaction vessel from one specific liquid storing container of the sample supply unit, a procedure of transporting the contents of one specific reaction vessel to other one specific reaction vessel, a procedure for extraction/dehydration of transporting to the extraction/separation funnels the contents from one specific reaction vessel to transport the upper layer liquid to the other one specific reaction vessel, a procedure for extraction/ dehydration transporting the contents from one specific reaction vessel to the extraction/separation funnels to transport the lower layer liquid to other one specific reaction vessel, a procedure of transporting the contents from one specific reaction vessel to the PH adjusting vessel, a procedure of transporting the contents to one specific reaction vessel from the PH adjusting vessel, a procedure of transporting the contents to one specific reaction vessel from a fraction tube, a procedure of transporting the contents from one specific reaction vessel to the container of the purifying unit, a procedure of transporting the contents to the extraction/separation funnels from one specific reaction vessel, a procedure of wasting the contents from the extraction/ separation funnels, a procedure of transporting the contents of the storing container of the extraction/dehydration unit to the extraction/separation funnels for wasting them, a procedure of transporting the contents of the extraction/separation funnels to the storing container, a procedure of transporting the contents of the extraction/separation funnels by half to two specific reaction vessels, a procedure of transporting the contents of the extraction/separation funnels to one specific reaction vessel, a procedure of transporting the contents of one specific reaction vessel to the storing container of the analytical reaction tracing unit, a procedure of transporting the washing liquid to one specific reaction vessel through one specific quantifier device.

The unit operation procedure of operating a means for reacting the contents of the selected specific reaction vessel comprises a procedure for bubbling in (or within) one specific reaction vessel, a procedure for starting the cooling of one specific reaction vessel, a procedure of completing the cooling of one specific reaction vessel, a procedure of effecting by optional number the cooling of one specific reaction vessel, a procedure of effecting by optional number the concentration of one specific reaction vessel, a procedure of starting the stirring of one specific reaction vessel, a procedure of completing the stirring of one specific reaction vessel.

The unit operation procedure for operating a means for automatically analyzing with an analyzer with one portion of the reactant taken out form the above described reaction vessel being selected comprises a procedure of turning on an analyzing HPLC switch, a procedure turning off the analyzing HPLC switch, a procedure for sampling the sample of one specific reaction vessel to effect the analyzing operation with HPLC after dilution.

The unit operation procedure for operating a means for separating, purifying by a separating, purifying device a specific material from the contents within the above described reaction vessel comprises a procedure of selecting the column for chromatography to stand by a detector, a procedure of resetting a column for chromatography and a detector, a procedure of purifying samples to the HPLC from the storing container so as to effect the chromatographic operation.

A unit operation procedure for operating a means for restoring the above described respective means into the initial conditions includes a procedure for transporting a washing solvent to one specific reaction vessel through one specific volumetric device, a procedure for drying one specific reaction vessel, a procedure for drying flow lines.

The unit operation procedures include a start procedure for inputting, setting the conditions for the synthesis, a sub-operation procedure for exclusive extraction use.

The synthesis procedure program for automated synthesis controlling use of the above described specific target compound is normally made by inputting of program names (synthesis procedure data names), selecting of the start procedure for inputting the conditions of the synthesis, thereafter selecting of the above described unit operation procedure, sequential inputting of the names of the unit operation procedures selected in accordance with the operation order so as to effect the combining operation.

Also, an interrupt program is interrupted during the execution in accordance with the above described synthesis procedure program by the described automated synthesis controlling program so that the driving operation of the synthesis processing apparatus in accordance with the interrupt program may be effected. The interrupt program includes a program for changing the time setting of reaction, concentration with the time setting the synthesis procedure program, a program adapted so that the analysis start and completion can be effected in an optional time period of earlier time and so on, a program of re-setting the conditions at the purification time, a program adapted to change so that the completion judgment of the reaction may be effected by the automated analysis of the reaction condition, instead of the time setting. The interruption of the above described interrupt program is adapted to be easily effected by the key operation of the computer at a program execution time based on the synthesis procedure program.

As described hereinabove, in the present invention, a synthesis processing apparatus capable of automatically effecting a series of synthesis processing is provided so that a program (synthesis processing procedure) necessary for an automated synthesis operation of the specific target compound with the synthesis processing apparatus may be made extremely easily. The synthesis of compounds in wide range may be effected without assistance in a shorter time with the efficient use of the present synthesis processing apparatus.

In the present invention, the synthesis program can be easily made, preserved till a plurality of reactions from the single reaction even without knowledge of the program language at the program making time of the synthesis processing procedure. Further, the correction, addition and so on of the programs can be easily effected. The synthesis processing program may be easily made even when a synthesizing person is not familiar with the knowledge of the apparatus (hardware) and the programming (software).

As the interruption of the interrupt program by the manual operation may be effected at the execution time of the synthesis procedure program, the step may be advanced to the next one with the reaction processing operation determined with the program being stopped when the reaction has been completed before a time set with the program with the progressing condition of the reaction being observed on the CRT provided in the automated control apparatus or the reaction situation in the reaction vessel being observed by an operator himself. The synthesis processing apparatus is not operated only as set with the program. As the interruption by the manual operation is adapted to be applied upon the control operation by the synthesis procedure program, the synthesis processing operation can be performed with more flexibility and rationality.

Furthermore, in accomplishing these and other objects, the present invention provides a separated liquid detecting apparatus which is provided with an electrode provided for measuring at a plurality of level positions the electric conduction degree of the solution within the cell, and a deciding means for deciding whether or not the electric conduction degree detected in the plurality of level positions is the same as the measured value at the previous time.

The electrode provided within the above described apparatus is provided with a common electrode composed of one platinum electric wire or the like disposed in upper, lower directions, an individual electrode composed of a platinum electric wire or the like disposed in a horizontal direction with alternate required intervals in the upper, lower directions on both the sides of the common electrode, a conductor connected to the common electrode and the individual electrode is connected with an electric conduction degree measuring apparatus through the respective contacts of the relay, the electric conduction degree measuring apparatus is connected with a computer through an A / D converter so as to decide whether or not the electric conduction degree detected in the above described plurality of level positions is the same as the measuring value at the previous time in the computer.

Also, the present invention provides a separated liquid detecting apparatus provided with a pair of electrodes for measuring the electric conduction degree of a solution discharged from a cell, and a deciding means for deciding whether or not the variations are caused in the electric conduction degree measured by the opposite electrode.

The one pair of opposite electrodes are oppositely disposed in the discharging opening of the cell.

The opposite electrode is connected with an electric conduction degree measuring apparatus through a contact of the relay, the electric conduction degree measuring apparatus is connected with a computer through an A / D converter so as to decide whether or not the variations are caused in the electric conduction degree measured by the opposite electrode.

A separated liquid detecting apparatus provided with an electrode for measuring at a plurality of level positions the electric conduction degree of a solution within a cell composed of a separated liquid funnel, a pair of opposite electrodes for measuring the electric conduction degree of the solution to be discharged from the cell, a first deciding means for deciding whether or not the electric conduction degree detected in the plurality of level positions becomes the same as the measured value at the previous time, a second deciding means for deciding whether or not the vibrations are caused in the electric conduction degree measured by the opposite electrode at the discharging time of the solution is desired to be provided on the separation liquid funnel.

Also, a PH adjusting cell is provided with an electrode for measuring in a plurality of level positions the electric conduction degree of the solution within the cell, a deciding means for decision whether or not the electric conduction degree detected in a plurality of level positions is the same as the measured value at the previous time, a valve for dripping acid and alkali, a PH meter for measuring the PH within the cell, a means for stirring the solution within the cell, a control means for controlling so that the open time of the valve may become shorter as the PH for measuring the PH meter becomes closer to a target value; acid or alkali is dripped, and is stirred by a stirring means, and is stopped; thereafter, the PH is measured with the PH meter after the decision of the separation of two layers by the deciding means; the operation is automatically repeated so as to effect the automatic adjustment of the PH.

According to the construction, an automatic detecting operation of the present invention can be effected whether or not two liquids have been separated in layer by the decision whether or not the electric conduction degree detected in a plurality of level positions is the same as the measured value at the previous time by the detection of the electric conduction degree between the common electrode and the individual electrode.

Also, two liquids can be taken out through the automatic division thereof by deciding whether or not the boundary of the layer has passed by the decision as to whether or not the variations are caused in the electric conduction degree of the solution measured by the opposite electrode at the discharging time of the solution through the detection of the electric conduction degree to be caused between the opposite electrodes.

In the PH adjusting cell, acid or alkali is dripped and thereafter is stirred, and is stopped; thereafter, the separation of two liquids is automatically confirmed to measure the PH of the water layer with a Ph meter; closer correct PH adjustment can be automatically effected with controlling so that the open time of a valve for dripping the acid and alkali into the separated liquid funnel may become shorter as the PH measured with the PH meter becomes closer to the specified PH.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
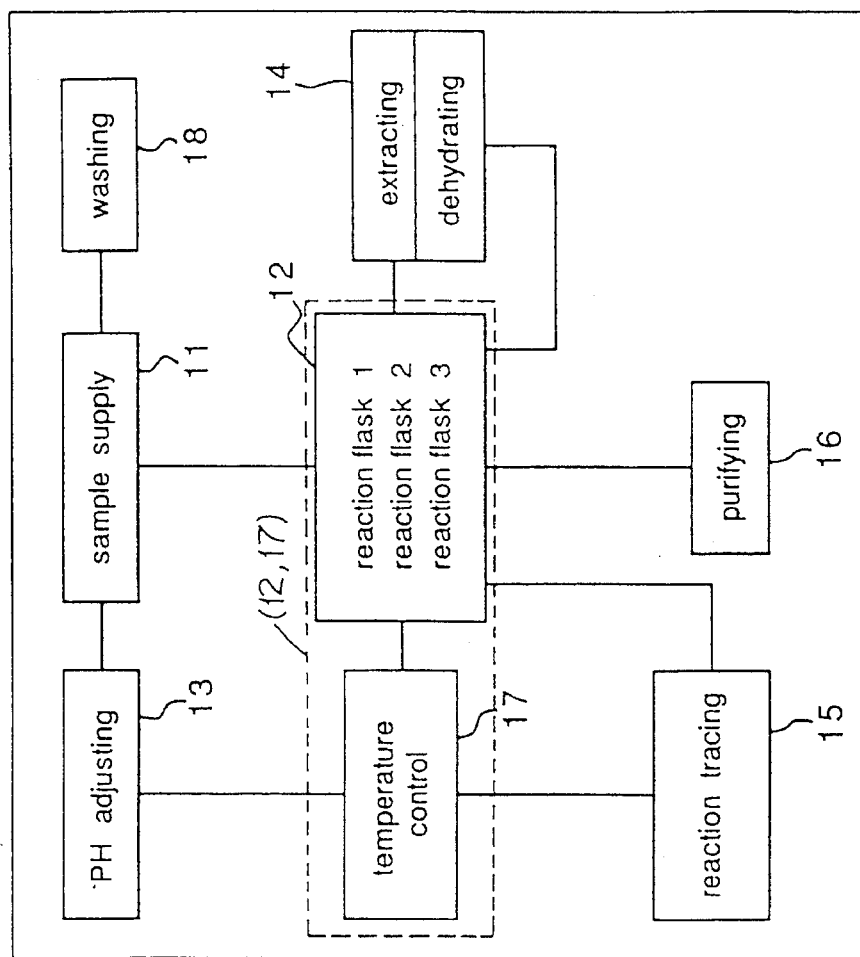
FIG. 1 is a block diagram of a whole automated synthesis apparatus of the present invention.
Figure 1:
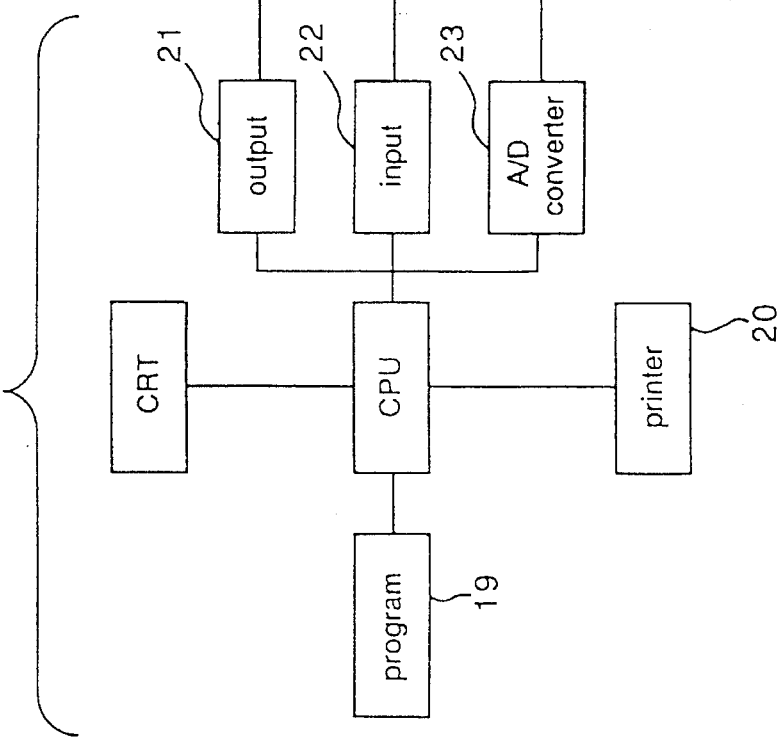

Before the description of the present invention proceeds, it is to be noted that like parts are designated by like reference numerals throughout the accompanying drawings.

Referring now to the drawings, there is shown in FIG. 1, an automated synthesis apparatus, according to one preferred embodiment of the present invention, which is composed of a synthesis processing apparatus (I) and a control apparatus (II). The synthesis processing apparatus (I) is provided with a sample supply unit 11 including raw materials, reagents, solvents, a reaction flask unit 12, a PH adjusting unit 13, an extracting/dehydrating unit 14, an analytical reaction tracing unit 15, a purifying unit 16, a temperature control unit 17, a washing unit 18. The above described reaction flask unit 12, a PH adjusting unit 13, an extracting/dehydrating unit 14, an analytical reaction tracing unit 15 constitute a reaction unit in a broad sense.

The above described control apparatus (II) is provided with a computer (hereinafter referred to as a CPU), a program 19 (e.g.—a floppy disk, a hard disk, an IC card, a magnetic tape, a CD and so on for storing and retaining the program) to be inputted to the CPU, a display (hereinafter referred to as a CRT) connected to the CPU, an output portion 21, an input portion 22, an A/D converting portion 23 for connecting the printer 20, the CPU with each unit of the above described synthesis processing apparatus (I).

The above described synthesis processing apparatus (I) drives each of the above described units in accordance with the stored programs inputted to the CPU and in the above described control apparatus (II), samples are fed to the reaction flask unit 12 from the sample supply unit 11, adjusting the surrounding conditions of the reaction unit and the purifying unit with each service unit composed of a temperature control unit 17, a washing unit 18, effecting the reaction processing operation with the reaction unit, purifying the reaction mixture with the purifying unit 16 so as to automatically form the products.

Figure 2:
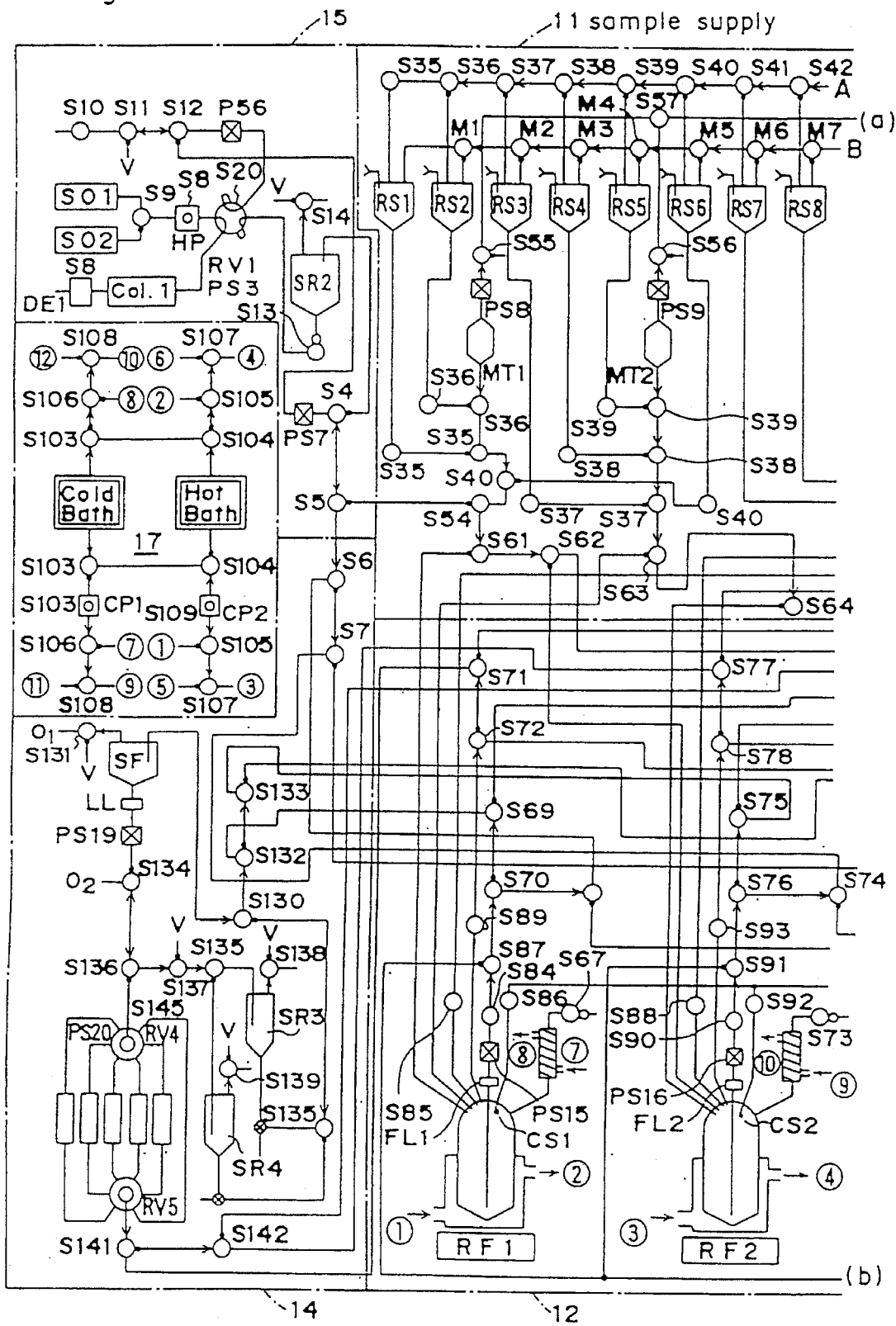
FIG. 2 is a block diagram showing one side portion of a synthesis processing apparatus in the automated synthesis apparatus of the present invention.
Figure 3:
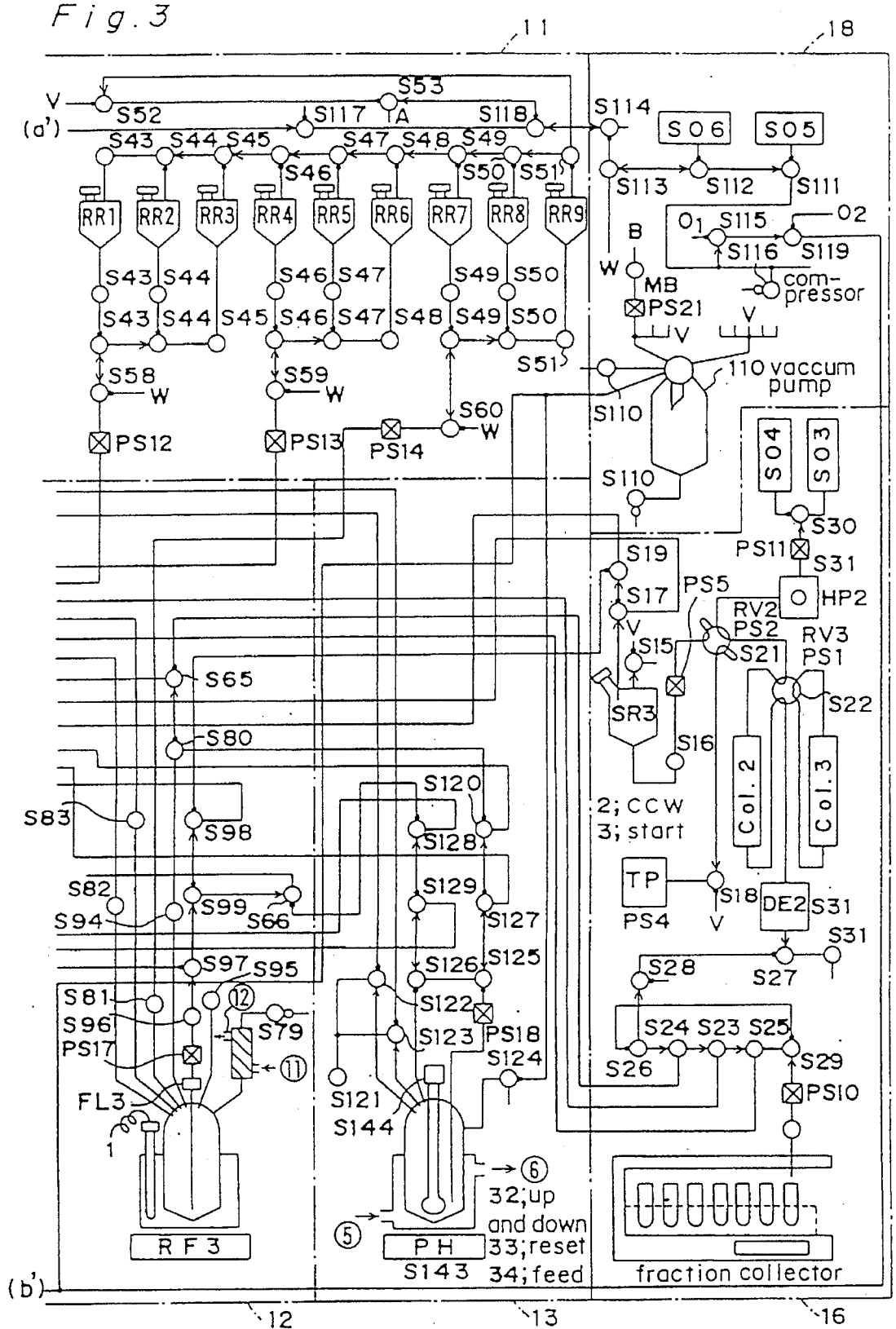
FIG. 3 is a block diagram showing the other side portion of the synthesis processing apparatus in the automated synthesis apparatus of the present invention.
Figure 4:
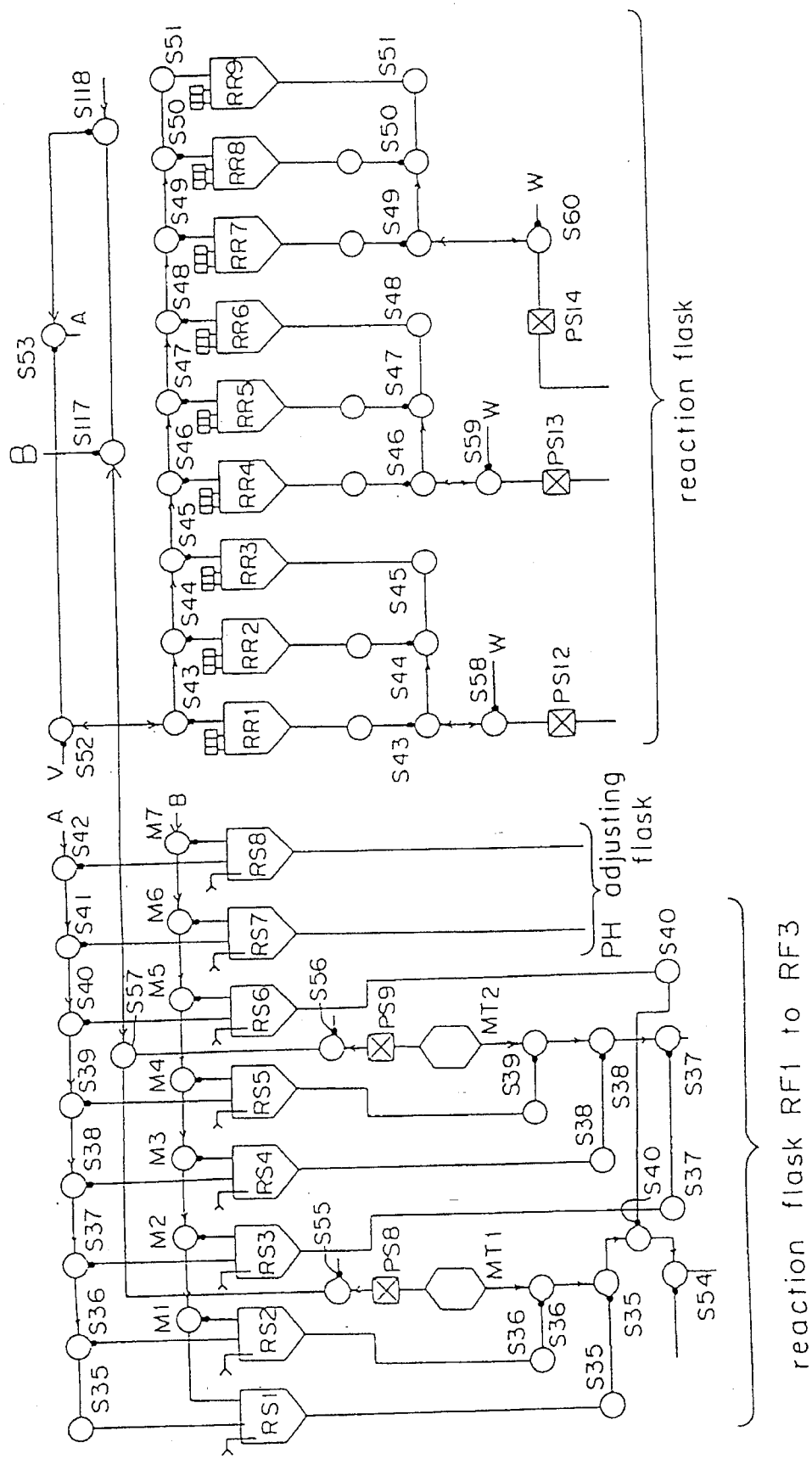
FIG. 4 is a block diagram of a sample supply unit in the above described automated synthesis apparatus.

The whole construction of the above described synthesis processing apparatus (I) is shown in FIG. 2 and FIG. 3. The apparatus will be described sequentially hereinafter with reference to FIG. 4 showing the construction of the respective units. FIG. 2 and FIG. 3 show the whole block diagram divided in two with the coupling portion of a flow line shown with solid lines of the upper end and the lower end being shown by (a) and (a'), (b) and (b').

In the drawing, the flow lines are shown by solid lines. The marks A through W and (1) through (12) shown at the ends of the flow lines are coupled to the ends of the flow lines with corresponding marks A through W and (1) through (12). Electromagnetic valves for opening and closing the flow passages and interposed in the flow lines are shown by the small ○ signs. In the electromagnetic valve of the small ○ sign in a portion of a three-way valve, the flow line side with an arrow sign is a common side, a flow line side with the small ● sign being attached is a steady-state closed, a flow line side with the small ● sign being not attached is a steady-state open, the flow line on the arrow mark side and a flow line with the small ○ sign being not attached shows a condition where the fluid flows. Therefore, when an electromagnetic valve is turned on, the side of the ● mark opens, and the other closes so as to change the flow passage. When the electromagnetic valve of the ○ mark is a two-way valve, only the opening and closing operations are effected. The electromagnetic valve with a small ○ being not attached to it is a steady-state closed valve, and the electromagnetic valve with a small ○ being attached to it is a steady-state open valve.

The above described ○ mark electromagnetic valves are S1 through S145. Operating switches for pumps except for the electromagnetic valves are also shown by S8 and so on. The electromagnetic valves are shown as switches S1 through S145 for opening and closing the flow passages. The electromagnetic valves of the small ○ mark to be opened and closed by the same switches are shown with the same numerals. Photosensors for transportation confirming use are shown by PS1 through PS21. Volumetric devices are shown by MT1 and MT2.

A sample supply unit 11 of raw materials & reagents, solvents and so on shown fully in FIG. 4 measures a predetermined amount (in the present embodiment, 10 ml units) using volumetric tubes MT1 and MT2 and photosensors PS8 and PS9 coupled to each flow line from the selected liquid storing containers RS1 through RS6 so as to transport it to the selected reaction flasks RF1 through RF3 described later. Also, the whole amount is adapted to be transported, using the photosensors PS12 through PS14 to the reaction flasks RF1 through RF3 coupled through the flow lines from the selected liquid storing containers RR1 through RR9. At the transportation time, the transporting speed is adapted to be changed, depending upon the reaction conditions acid or alkali solution is adapted to be transferred to a PH adjusting flask PH, to be described later, connected from the selected liquid storing containers RS7 through RS8.

In the above described sample supply unit 11, as shown, the above described respective liquid storing containers RS1 through RS8, RR1 through RR9 are connected to raw material storing cells through flow lines composed of tubes, and are connected through lines to the reaction flasks RF1 through RF3 and a PH adjusting flask PH.

The volumetric tubes MT1 and MT2 interposed in the above described flow lines, and photosensors PS8 and PS9, for detecting the gas-liquid boundary level, causes samples to be fed therein via flow lines from the liquid storing containers. When a photosensor detects that the capacity of the samples to be fed to the volumetric tube has reached 10 ml, a switch of the magnetic valve interposed in the above described flow line is operated to open, close the flow passage so that the volumetric samples are fed to a specific reaction flask of the reaction unit. On the liquid storing containers RR1 through RR9 side where the volumetric tubes are not interposed, the entire amount of liquid is fed to the reaction flask while the entire amount of liquid is being detected by the photosensor.

The raw materials are automatically fed from the raw material storing cells (not shown) to each of the above described liquid storing containers. The respective liquid storing containers are connected to raw material storing cells through feed lines and branch lines which connected through electromagnetic valves by the common raw material suction lines are connected to each of the above described liquid storing containers. The above described raw material suction lines are connected to the vacuum pump 110 so as to drive the vacuum pump 110. The switch of the above described electromagnetic valve corresponding to either of the liquid storing containers RS1 through RS8 is operated to automatically feed the raw materials to the liquid storing containers from the raw material storing cells into the liquid storing containers under reduced pressure.

The materials from the respective storing containers to the reaction flasks are fed to the optional flasks by the suction the flow lines under reduced pressure, as described later, after the measuring operation. A plurality of liquid storing containers to be set in the sample supply unit 11 are respectively connected to the flow lines so that an optional feeding operation may be effected even with respect to any flask to a plurality of flasks to be set in the reaction flask unit 12 to be described later.

All the above described liquid storing containers RS1 through RS8, RR1 through RR9 and volumetric tubes MT1 and MT2 are adapted to effect washing operations alternatively with water and methanol. As shown, flow lines connected to the washing unit 18 are provided and flow passage opening and closing electromagnetic valves are interposed even in the flow lines. All of the above described flow lines are provided as a closed system.

Figure 5:
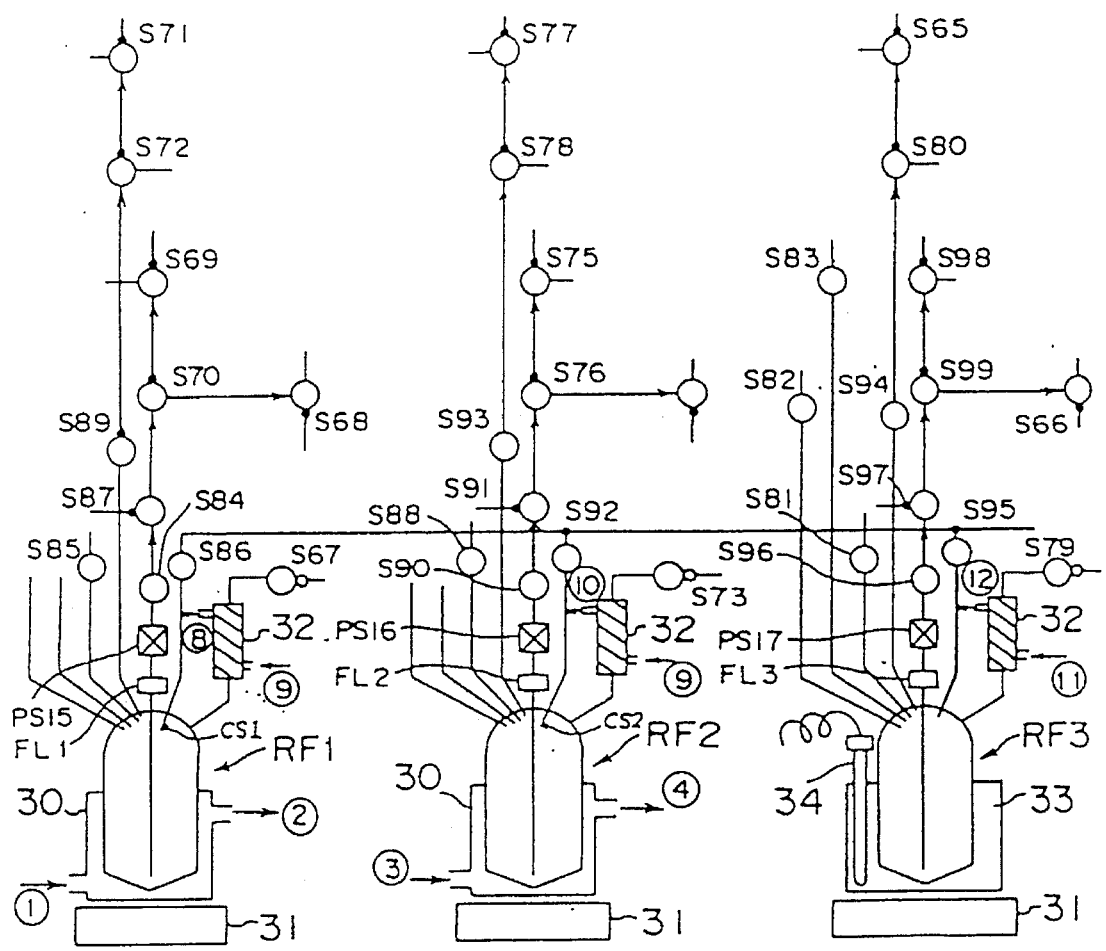
FIG. 5 is a block diagram of a reaction flask unit in the above described automated synthesis apparatus.

The reaction flask unit 12 is composed of the construction shown in FIG. 5. The reaction flask unit 12 is a center of a synthesis processing apparatus and is coupled to of all the other units, with the mutual flask being coupled among them. The reaction flask unit 12 is provided with three reaction flasks RF1 through RF3. The reaction is effected by stirring, heating, refluxing, cooling and also the concentration can be effected within these reaction flasks.

The above described three reaction flasks RF1 through RF3 directly feed raw materials, reagents, solvents and so on through flow lines from the liquid storing containers of the sample supply unit 11. The mutual circulation is effected, as described later, among the three reaction flasks RF1, RF2 and RF3 so that the reaction liquid may be transferred The above described first reaction flask RF1 and the second reaction flask RF2 are the same in construction with a circulating jacket 30 of a hot or a cold medium and an outer stirrer 31 being set on the outer periphery of the flask. A reflux condenser 32 is mounted on the reaction flasks RF1 and RF2 with the reflux condenser communicating with the interior thereof. The third reaction flask RF3 is used when it is desired to heat a material at higher temperatures than that of the above described first and second reaction flasks RF1 and RF2 or when the temperature is to be optionally changed. The reaction flask RF3 is placed in an oil bath 33 with a heater 34 being set in the oil bath 33. Optional heating and controlling operations can be effected up to about 200° C. using the heater 34. A reflux condenser cooling tube 32 and an outer stirrer 31 are set even in the reaction flask RF3. When the reaction is effected at comparatively low temperatures or when the reaction temperature does not have to be optionally changed, the reaction flasks RF1 and RF2 are used. When comparatively high temperatures or reaction temperatures must be optionally changed, the reaction flask RF3 may be used.

In order to increase the efficiency of the mixed stirring, the reaction flasks RF1, RF2 and RF3 are connected to a compressor 116 through flow lines, and communicate with a vacuum pump 110 through flow lines. A bubbling stirring operation is effected through air or inert gases such as air or nitrogen, argon, helium or the like, if necessary, into the reaction flasks RE1, RF2 and RF3. The bubbling stirring operation may be used jointly when the mixed liquid within the reaction flask cannot be easily mixed or stirred by only the outer stirring apparatus 31.

Even in the above described reaction flask unit 12, many flow-passage opening and closing electromagnetic valves shown by ○ signals are provided in the respective flow lines as shown. Photosensors PS15 through PS17 for confirming the transportation of the reaction mixture to each reaction flask, line filters FL1 though FL3 for removing insoluble materials and concentration sensors CS1 and CS2 are interposed.

Figure 6:
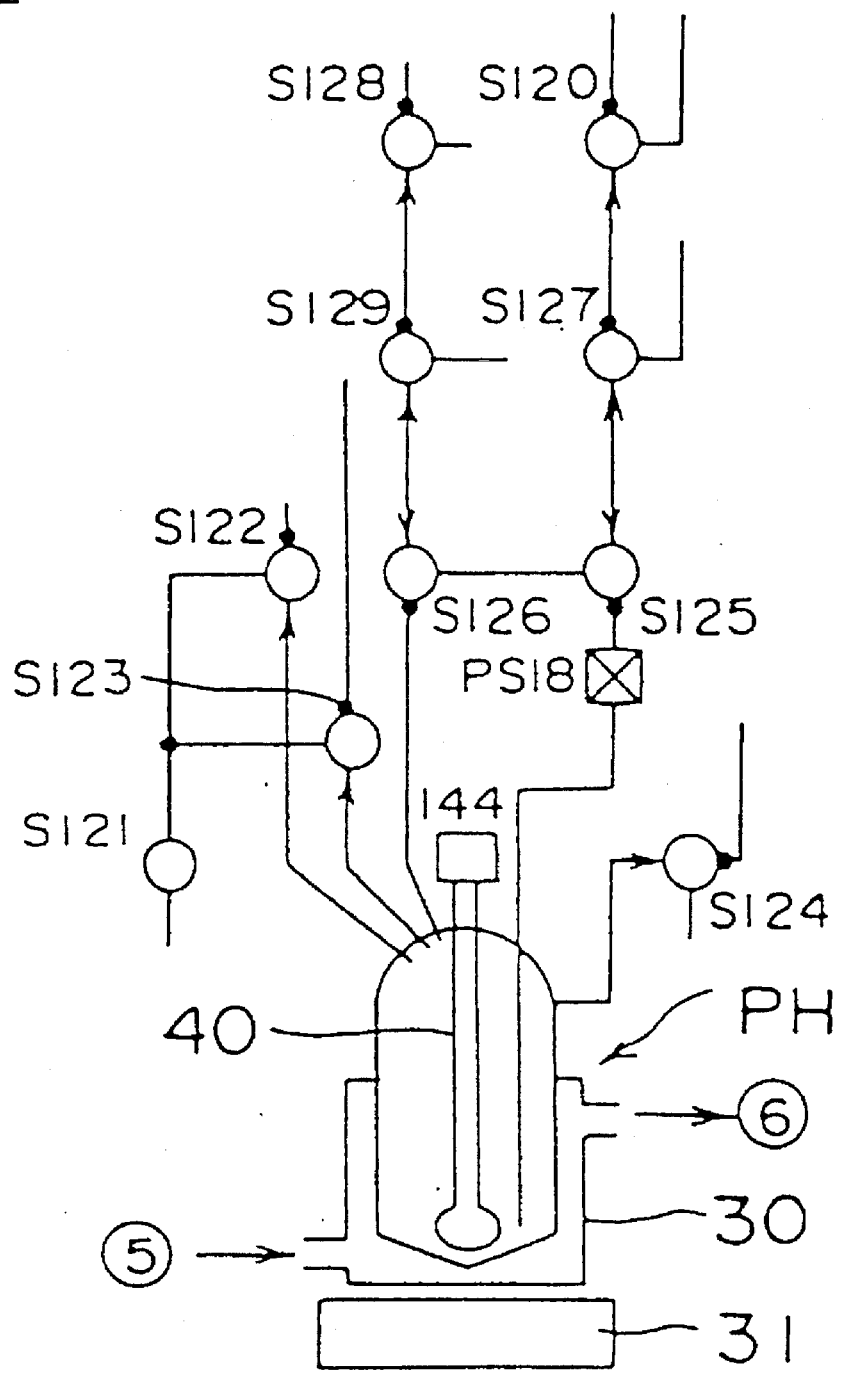
FIG. 6 is a block diagram of a PH adjusting unit in the above described automated synthesis apparatus.

A PH adjusting unit 13 composing one portion of the reaction unit in a broad sense is of the construction shown in FIG. 6. Acid solution is added from the liquid storing container RS7 of the sample supply unit 11 or alkali solution is added from RS8, and respectively so as to adjust to the desired PH.

The above described PH adjusting unit 13 is provided with a PH adjusting flask PH with a built in PH electrode 40 and being provided with in parallel to the reaction flasks RF1 through RF3, can effect mutual circulation of a liquid by the introduction lines from the respective reaction flasks to the PH adjusting flask and by the introduction lines from the PH adjusting flasks to the respective reaction flasks so that the reaction liquid after the PH compensation may be changed in flowing to the optional reaction flask.

Figure 7:
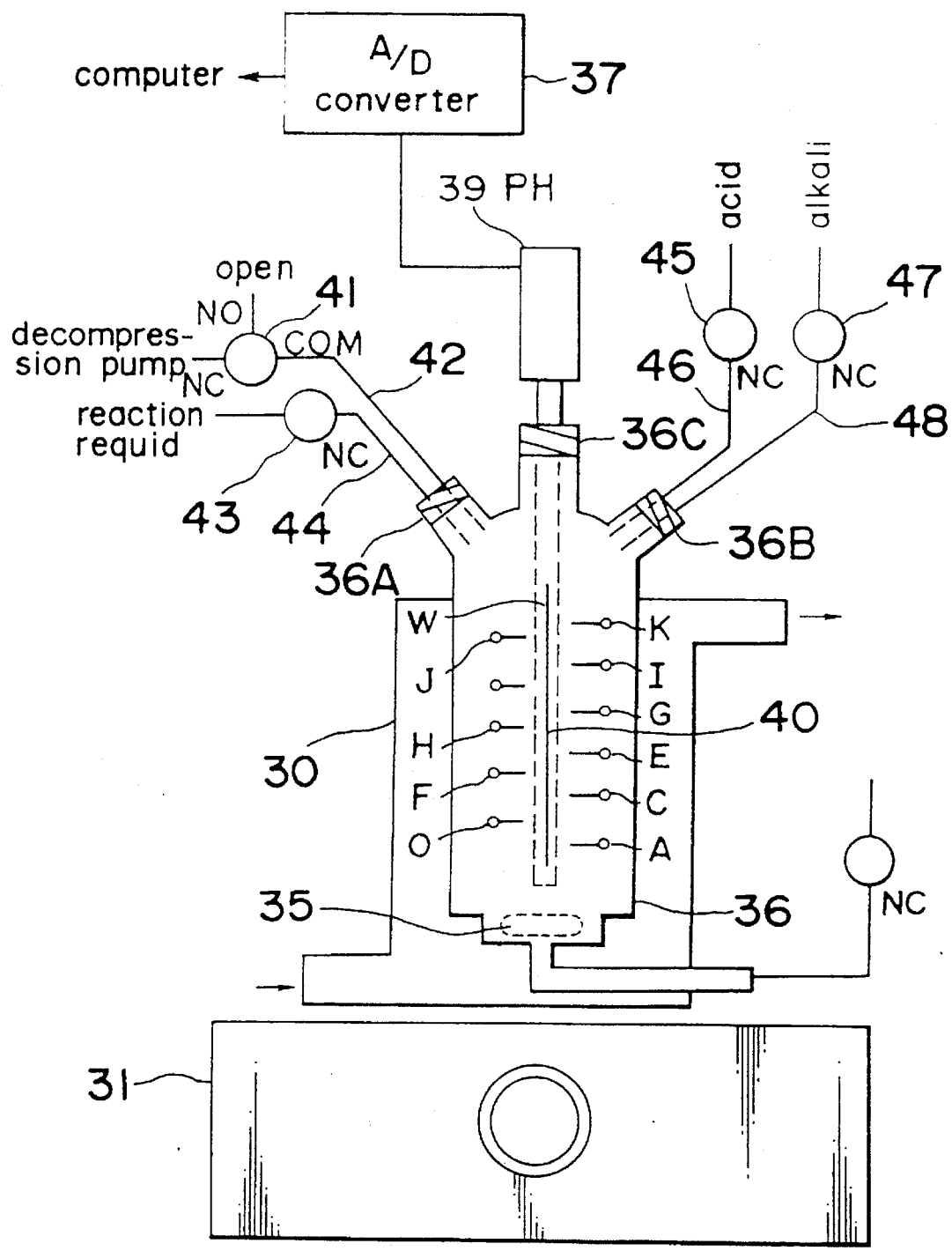
FIG. 7 is a block diagram showing the controlling for the PH adjustment in the separated liquid funnel in the above described automated synthesis apparatus.

FIG. 7 shows an embodiment with the separated detecting apparatus of the present invention being applied to a Ph adjusting cell.

A PH adjusting cell 36 is provided at its top end with three branch openings; a suction tube 42 having one end connected to a pressure reduction pump (not shown) is connected through a switching valve 41 to a branch opening 36A of one side portion, and a reaction liquid supply tube 44 provided with a valve 43 is also connected to opening 36A. A supply tube 46 for supplying acid through a valve 45 and a supply tube 48 for supplying alkali through the valve 47 are connected to a branch opening 36B of another side portion. A PH meter 39 is introduced into a branch opening 36C of the central portion. An A / D converter 37 is connected to the PH meter 39 for converting the detection value from the PH meter 39 into a digital form and the output of the A / D converter 37 is connected to a computer (not shown) having a control function as described hereinafter.

The above described PH adjusting cell 36 is covered with a thermal medium cell 30 so as to retain the internal solution at a constant temperature. Element 35 is a magnet sunken within a separated liquid and element 31 is a stirrer for rotating the magnet 35 for effecting a stirring operation.

A common electrode W and individual electrodes A through K are mounted along the surrounding wall in the separated liquid funnel, on the PH adjusting cell 36, and an electric conduction degree measuring apparatus connected to these electrodes and a computer are provided.

The operation of a PH adjusting apparatus of the above described construction is as follows. First, a constant temperature is maintained by the circulating supply operation of a cold medium to a thermal medium cell 30, and a switching valve 41 is opened and an interior 40 within the cell 30 is reduced in pressure by a reducing pump. Thereafter, the reaction liquid is guided to the PH adjusting cell 30 by the opening of the valve 43. A valve 45 or a valve 47 is opened for given time, while the magnet 35 is rotated by the stirrer 31, so as to drip the acid or alkali.

The magnet 35 is rotated for given time after the dripping operation of the acid or alkali so as to stir the solution of the cell inside portion. The rotation of the magnet 35 is stopped after the passage of the given time. The quieted solution is separated into two layers at the end of the stirring operation. The separation into two layers is determined by the computer by the electric conduction degree respectively caused between the electrode W and the individual electrodes A through K and detected by the electric conduction degree measuring apparatus.

The separation of two layers is judged, and the PH value of the water layer from the division into two layers is measured by a PH meter 39 connected to the computer.

After the measuring operation, a valve 45 or 47 is opened again so as to drip acid or alkali. Then, two layers of liquids separated by the rotation of the magnet 35 are stirred again, then are stopped, the separation of two layers after the operation is judged by the computer so as to measure a PH value by a PH meter.

The above described operation is repeated a plurality of times (three times in the present embodiment) so as to issue instructions from a computer so that the open time of the valve 45 or the valve 47 is shortened in three stages as the measured PH become closer to the desired PH. The correct PH adjustment can be effected, and the required time of the whole operation can be shortened by the control.

In the embodiment of FIG. 7, both the functions can be achieved by one computer although two liquid separation confirmations and the PH adjustment are individually described by of the drawings.

Further, when the present embodiment has been applied to the PH adjusting cell, the crystal to be separated is resolved and also, the organic layer and the water layer are separated as in, for example, the organic synthesis or the like, even when the PH electrode is required to be positioned in the water layer, and the separation of two layers can be positively confirmed, and the correct PH measuring operation can be effected.

Also, in this case, the closer correct PH adjustment can be automatically effected by the addition of the control of shortening the open time of the valve for dripping the acid and the alkali into the liquid funnel as the PH measured by the PH meter is closer to the specified PH.

Figure 8:
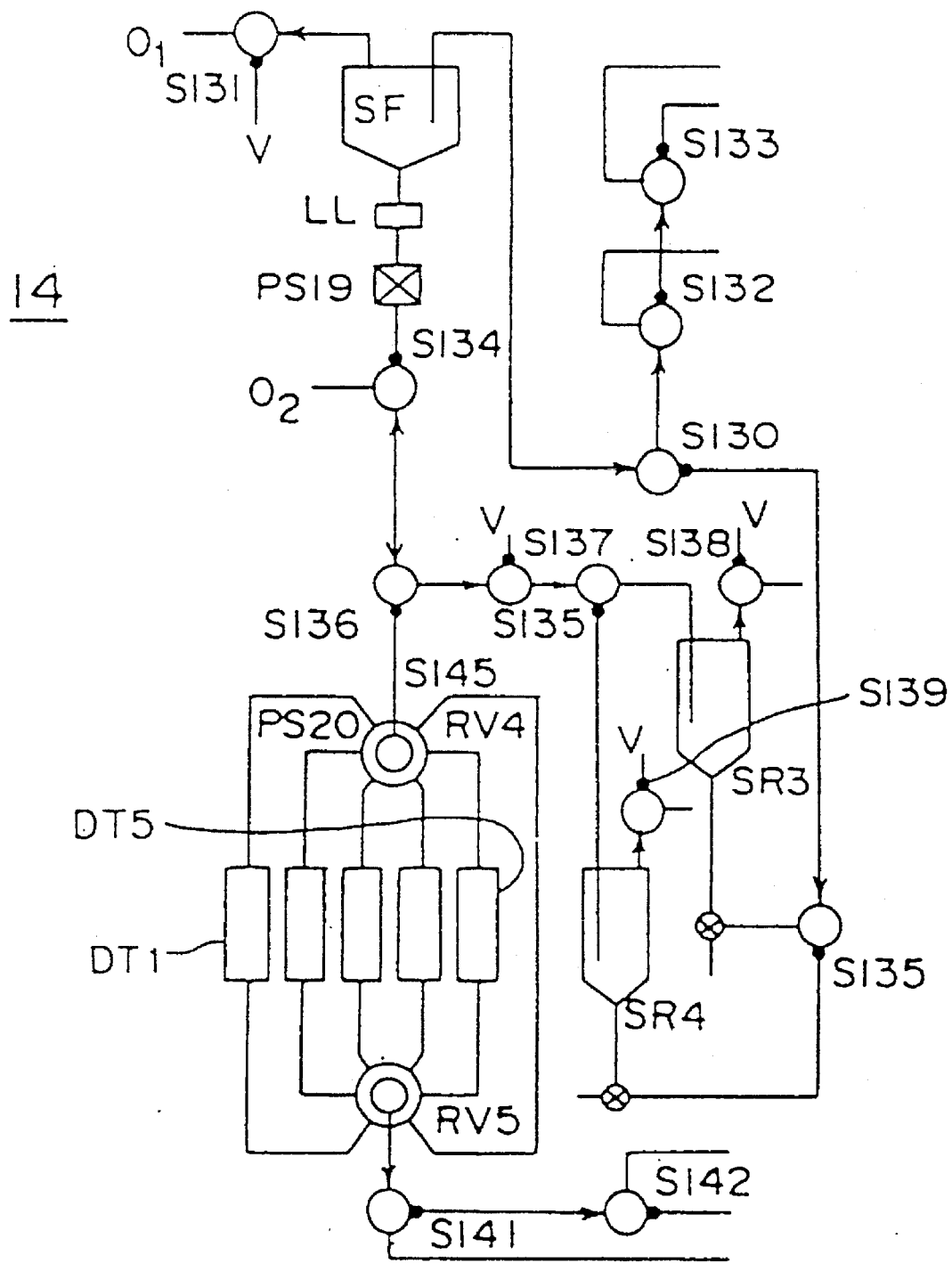
FIG. 8 is a block diagram of an extracting/drying unit in the above described automated synthesis apparatus.

An extracting/dehydrating unit 14 shown in FIG. 8 also constitutes one portion of the reaction unit in a broad sense so that the liquid mixture of the selected reaction flasks RF1 through RF3 is transferred into a separation funnel SF. Then, the liquid of the upper layer or the lower layer is separated by the difference of the electric conductivity resistance so as to be collected in the storing containers SR3 and SR4. The re-extracting operation is effected, the washing operation is effected by the washing liquid/extraction liquid from RS1 through RS6 if necessary, and the dehydrating operation is effected through dehydrating tubes DT1 through DT5 so as to transport the extraction liquid to the selected reaction flask.

The above described separation SF is connected selectively through the reaction flasks RF1 through RF3 and guiding flow lines so as to introduce the reaction mixture within the required reaction flasks RF1 through RF3 into the separation funnel SF. The lower end outlet of the separation funnel SF is connected to the dehydrating tubes DT1 through DT5 through the flow lines by a liquid-liquid boundary sensor (LL) and a PS19 being mounted on it with an organic layer separated by the above described separation funnel SF being fed to the dehydrating tube. In order to effect the bubbling stirring operation within the separation funnel SF, the vacuum pump 110 is connected through flow lines so as to reduce the pressure in the separation funnel SF. Storing bottles SR0 and SR1 for temporarily storing an extracting mother liquid, and an extraction liquid are connected to the separation funnel SF through flow lines.

A plurality of dehydrating tubes DT1 through DT5 are disposed in parallel so as to be selectively communicated with the connection flow lines of the separation funnel SF on the inlet side, and to be selectively connected again with feed lines connecting with the respective reaction flasks RF1 through RF3 on the outlet side. Dehydrating agents such as anhydrous sodium sulfate and so on are fed into each dehydrating tube so as to dehydrate and dry the flowing organic layer. A glass filter is mounted in an exit portion so as to remove the insolvable materials. Also, the water layer is transported to the reaction flasks RF1 through RF3 using the by-pass disposed in parallel.

Figure 9:
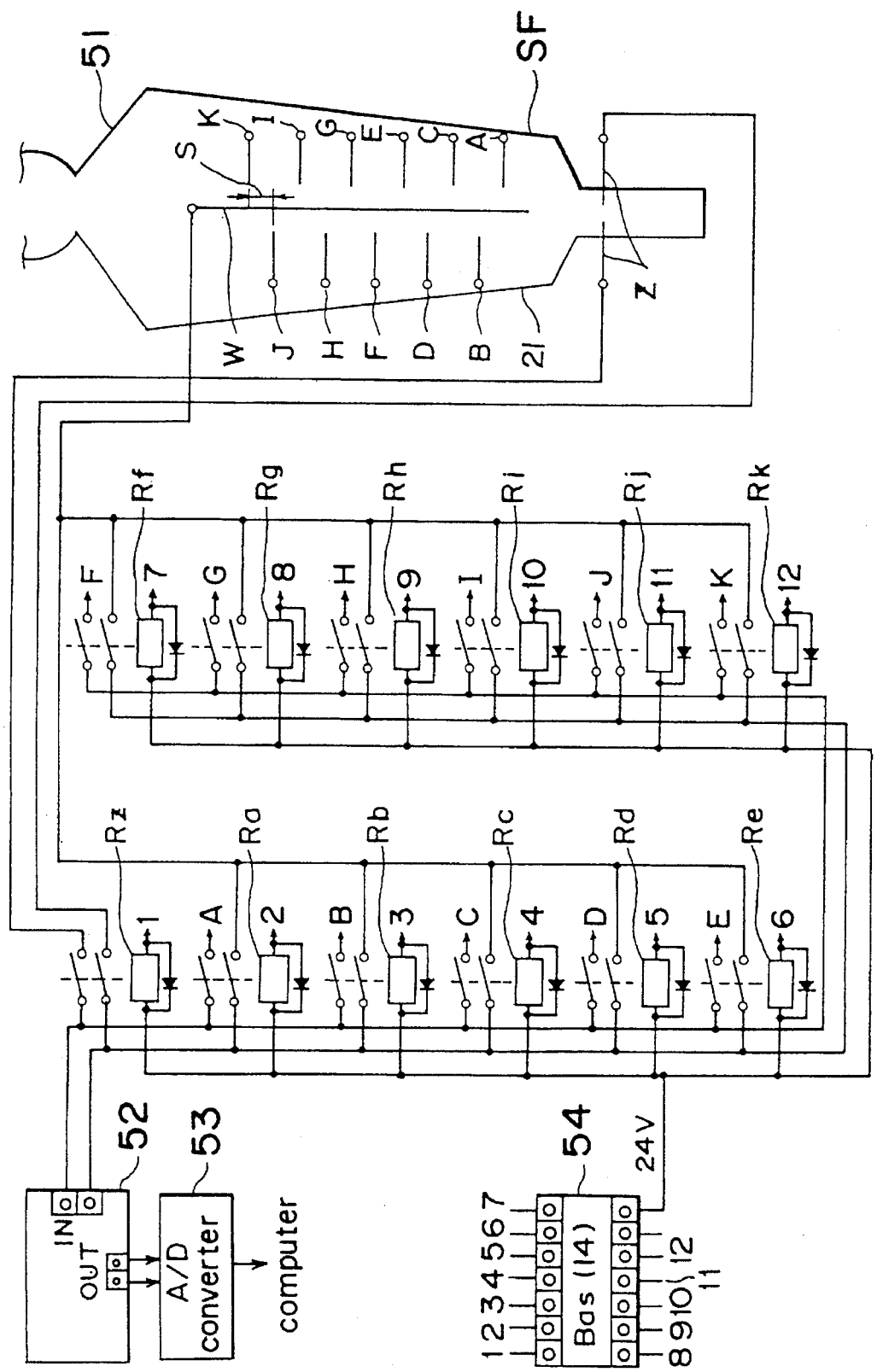
FIG. 9 is a block diagram showing the controlling for two-liquid separation confirmation in the separation liquid funnel of the above described automated synthesis apparatus.
Figure 10:
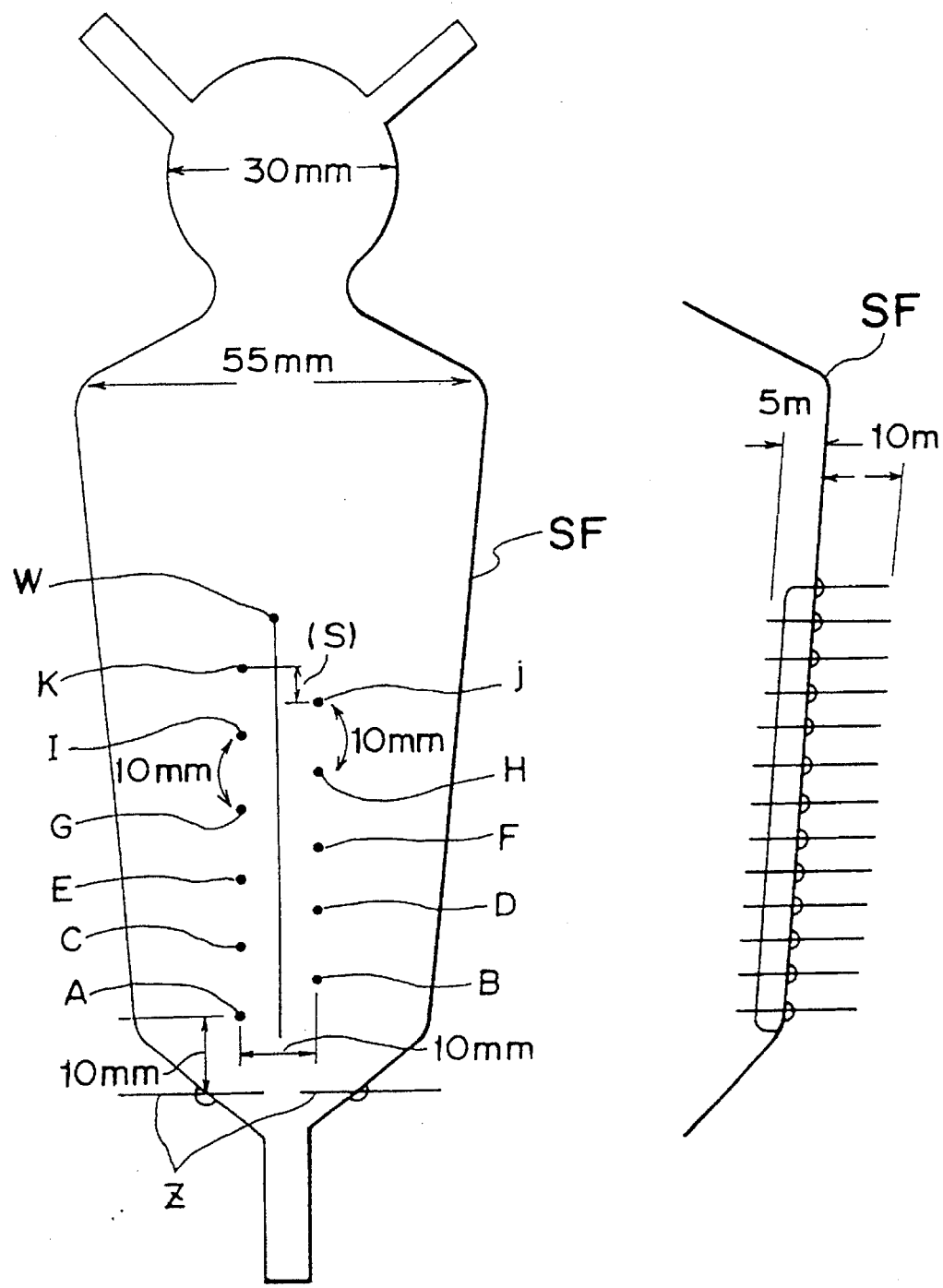
FIG. 10 is a detailed view of a separation liquid in FIG. 9.

As shown in the above described extracting/dehydrating unit 14, many flow passage opening and closing electromagnetic valves are interposed in the flow lines for mutually connecting the separation funnel SF, dehydrating tubes DT1 through DT5, reaction flasks RF1 through RF3, and also, photosensors FS19 and PS20 and rotary valves RV4 and RV5 operated by switches S145 are provided; the reaction flasks and extracting/dehydrating units mutually circulate liquid by the operations of the switches and the rotary valves, so that the extracting operation can be effected repeatedly. FIG. 9 is a control block diagram for confirming the two-liquid separation in the separated liquid funnel of the present invention.

Element 51 is a separation liquid funnel, a common electrode W of one platinum wire W in a vertical direction and platinum wire of individual electrodes A through K having the given length in a horizontal direction are provided at constant intervals on both sides of the common electrode W on the inner wall of the separation liquid funnel 51.

The above described common electrode W and the individual electrodes A through K are mounted on the inner wall of the separation liquid funnel 51 with platinum wires being inserted from holes drilled in the wall face of the separation liquid funnel 51. The respective platinum wires are insulated from the separation liquid funnel in the hole inserting portion, and also, seal the liquid therein.

The above described individual electrodes A through K are disposed in alternate given intervals in the vertical direction on both the sides of the common electrode W, because the mutual intervals are desired to be made narrower. The intervals (s) between these individual electrodes are 1 mm through 10 mm, preferably, 3 mm through 5 mm, with 5 mm in the present embodiment. Also, the respective intervals between the common electrode W and the respective individual electrodes A through K are made 5 mm in the present embodiment.

Opposite electrodes Z of a pair of platinum wires are provided at an interval of a given gap at the lower end discharging portion of the above described separation liquid funnel 51.

These opposite electrodes Z are mounted with the platinum wires being inserted into holes drilled in a wall opposite of the lower end discharging portion.

Element 52 is an electric conduction degree measuring apparatus with conductors connected to the respective electrodes being connected to the electric conduction degree measuring apparatus 52 through the respective contacts of relays Rz and Ra through Rk. Element 53 is an A / D converter for converting from analog to digital form the electric conduction degree measured by the electric conduction degree measuring apparatus. Signals obtained by the A / D converter 53 are inputted into a computer (not shown) having a control function as described hereinafter so as to effect a processing operation. Element 54 is a power supply circuit for each relay R so as to selectively measure the electric conduction degree with respect to a plurality of electrodes by the selective excitation of the relay. The power supply circuit 54 feeds the power with instructions from a computer so as to effect an operation.

In the apparatus described above, a mixed liquid of two liquids is inputted into the separation liquid funnel 51, and is quieted for some time, and thereafter, the electric conduction degree is measured by the electric conduction degree measuring apparatus 52 in the order of a common electrode W—an electrode A, a common electrode W—an electrode B, . . . common electrode W—an electrode K by the sequential excitation of relay Ra through Rk, and is the measured values are stored in a memory (not shown) within the computer. Then, the same measuring operation is effected again, the results are compared with the measuring value at the previous time, and the measuring operation is repeated.

If such measurement result becomes the same as the measurement value at the previous time or is within a predetermined tolerance range, it is decided that the separation of two layers has been completed.

A discharging valve (not shown) interposed in a tube connected to the lower portion discharge opening is opened by the above described decision result, and the liquid separated from the separation liquid funnel 51 is slowly taken out.

When the liquid is discharged from the separation liquid funnel 51 is discharged through the lower portion discharging opening in this manner, the electric conduction degree of the opposite electrode Z is measured by the excitation of the relay Rz. When the measured value has been changed, two liquid are divided by the switching operation of a switching valve (not shown), and are separated, and accommodated individually.

The operation of the above described discharging valve and the switching valve are automated by the instructions from the computer.

Figure 11:
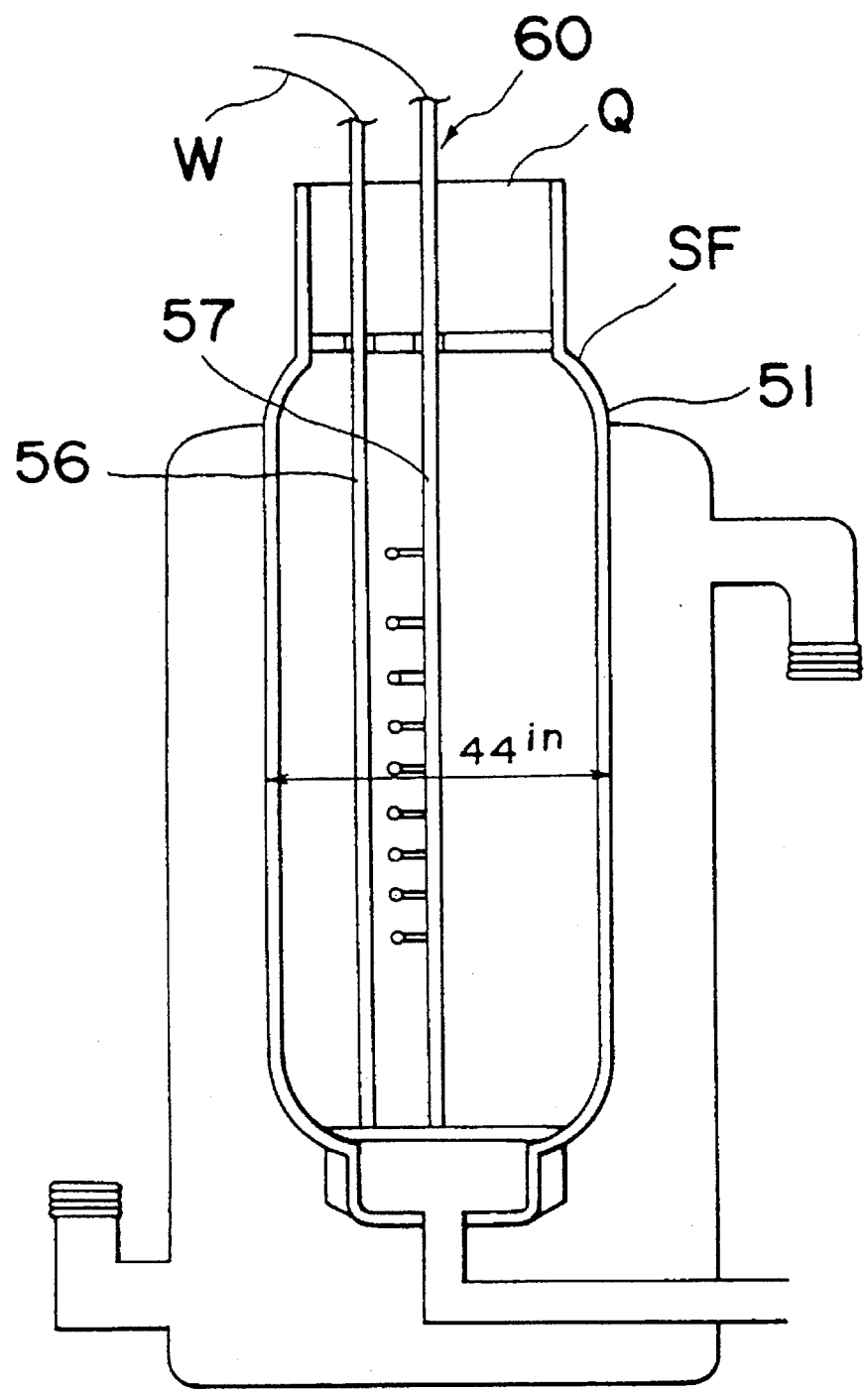
FIG. 11 is a view showing a modified embodiment of the separated liquid funnel in FIG. 9.

Although an electrode is inserted, mounted from a hole drilled in a surrounding wall in the above described separation liquid funnel 51, a detecting appliance mounted integrally with the common electrode W and the individual electrodes A through K being conveniently inserted for its free detachable operation from the opening Q with the common electrode W and the individual electrodes A through K being retained by insulating plates 56 and 57 as shown in FIG. 11.

As described hereinabove, in accordance with the present utility mode, as it is adapted to decide whether or not two liquids are separated in layer by the decision as to whether or not the electric conduction degree detected in a plurality of level positions has become the same as the measured value at the previous time, the layer separation can be precisely decided.

Also, as it is adapted to be decided whether or not the boundary of the layer has passed by the decision as to whether or not variations are caused in the electric conduction degree of the solution measured by the opposite electrode at the discharging time of the solution, the automation of the liquid separation of the different layers can be achieved.

Figure 12:
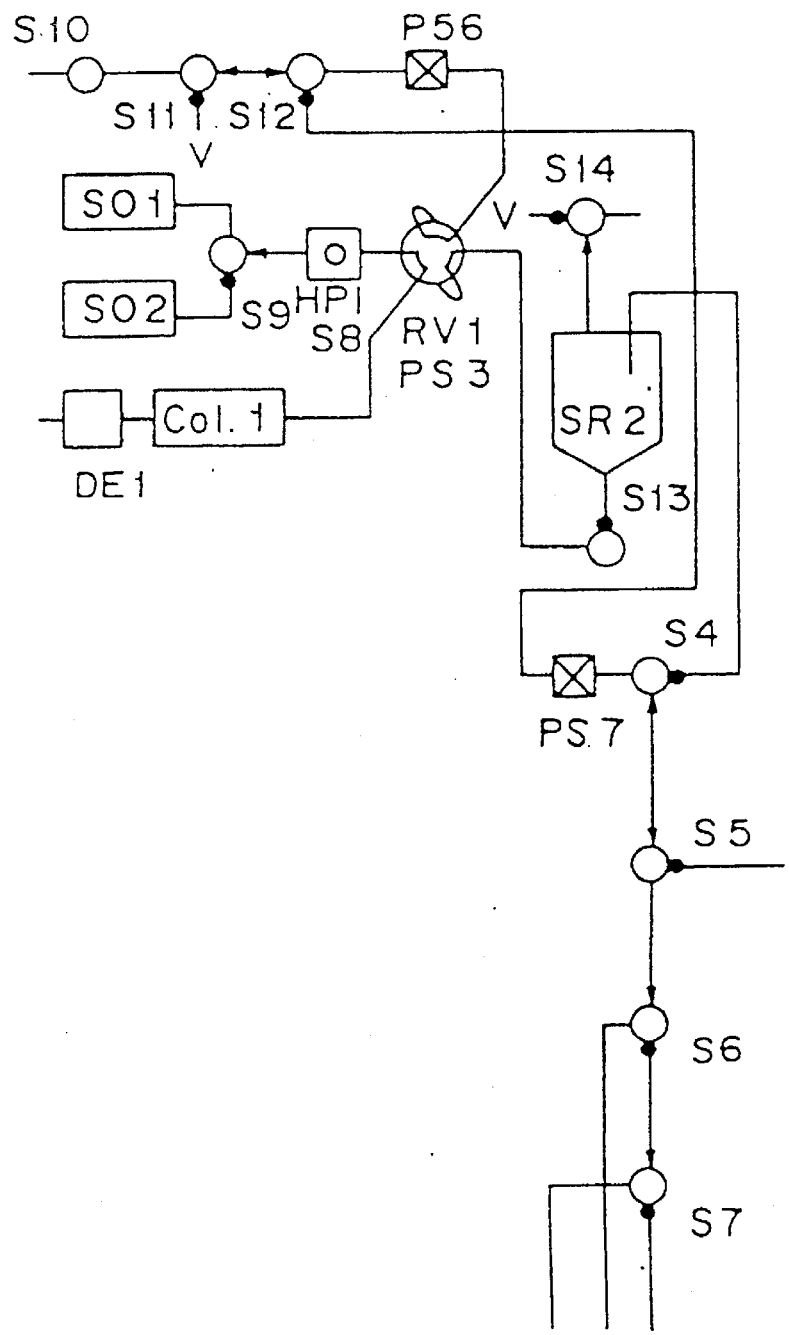
FIG. 12 is a block diagram of an analytical reaction tracing unit in the above described automated synthesis apparatus.

The analytical reaction tracing unit 15 is constructed as shown in FIG. 12, and the unit also constitutes one portion of the reaction unit in a broad sense. The reaction solution of a given amount (for example, 0.1 ml) is sampled using a photosensor PS7 from the selected reaction flask and is diluted with the solvent from the liquid storing container RS6 of the sample supply unit 11. Thereafter, 0.02 ml is separately taken out using the photosensor PS6, and is charged on the analyzing HPLC to be operated by a switch S8 using the selected developing solvent SO1 or SO2 so as to effect an analyzing operation. The obtained analytical results with a chromatographic chart are displayed on the CRT and the results are printed out. The reaction proceeding condition is judged in accordance with the analytical results so as to judge whether or not the reaction is continuously carried out.

In the above described analytical reaction tracing unit 15, the reaction mixture fed from the selected flask is diluted to an optional concentration, and thereafter is stored; many flow passage opening and closing electromagnetic valves are provided in the connection lines, among, for example, a storing bottle SR2 for storing the diluted liquid, the above described HPLC pump HP1, developing solvent feeding portions SO1 and SO2, six-way rotary valve RV1 where a given amount of sample is put into a sample loop from the storing bottle SR2, a column Col.1 and an infrared absorption detector DE1, sensors PS3, PS6 and PS7, further the reaction flask and the reaction tracing unit 15 and the flow lines within the unit 15.

Figure 13:
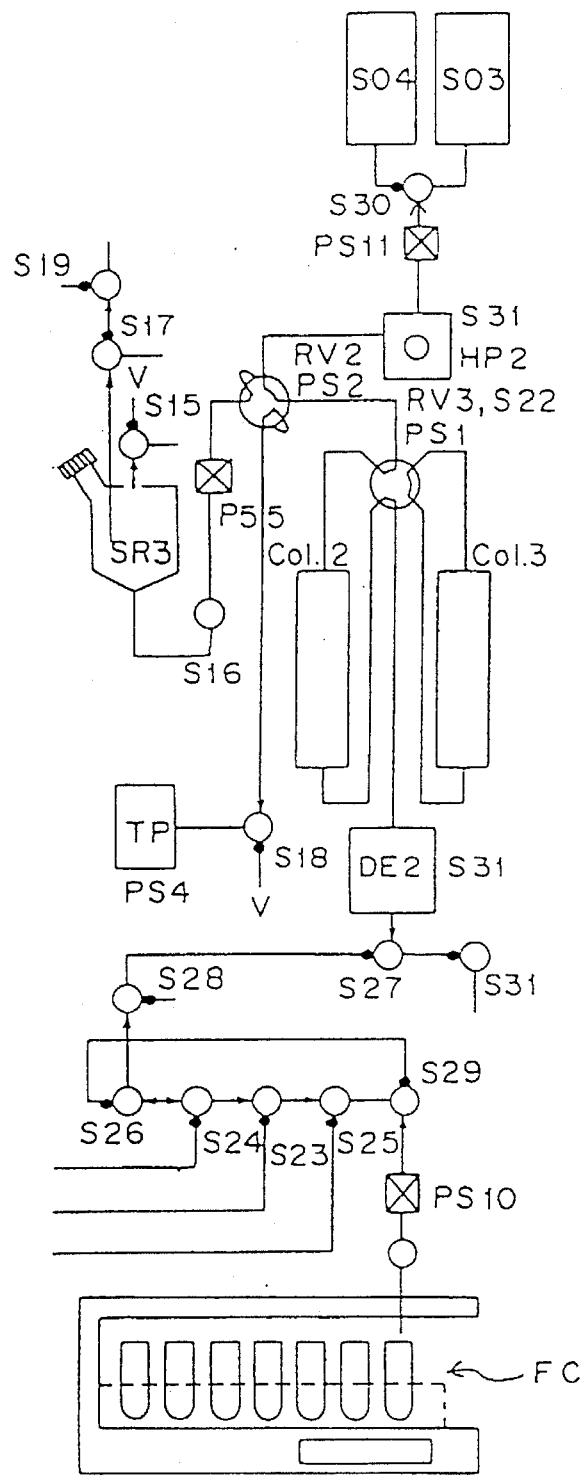
FIG. 13 is a block diagram of a purifying unit in the above described automated synthesis apparatus.

The purifying unit 16 transports the entire contents of the selected reaction flask to a temporarily storing container SR1, charges it on the HP2 of the purifying HPLC with the construction shown in FIG. 13, and purifies it with a column chromatographic method under determined purifying conditions (selection of the column to be used from two types of purifying columns, selection of the solvent to be used from two types of developing solvents or switching by time, purifying time and so on). The purified outflowing liquid is collected in a large-sized fraction collector FC.

The reaction mixture is adapted to be directly fed to the purifying unit 16 from the reaction flasks RF1, RF2 and RF3 by the flow passage opening and closing electromagnetic valves provided in the flow lines and in the respective flow lines. The construction of the present purifying HPLC is similar to that of the tracing HPLC, and is provided with a storing cell SR1 for storing the liquid from the reaction flask, columns Col.2, Col.3, developing solvent feeding cells SO3 and SO4, an HPLC pump HP2, a transportation pump TP for putting the reaction mixture into the sample loop, six-way rotary valves RV2 and RV3 sensors PS1, PS2, PS4, PS5 and PS11, and an infrared absorption detector DE2.

The eluate effluent from above described columns Col.2 and Col.3 has its infrared absorption measured by the detector DE2 and thereafter is taken out, and refined products collected in many containers disposed in the fraction collector FC are fed through flow lines into the fraction collector FC. Flow lines are provided so that the required products may be taken out from the fraction collector FC so as to be fed into optional reaction flasks RF1, RF2 and RF3. Many flow-passage opening and closing electromagnetic valves and sensors PS10 are provided as shown in the flow lines.

The reaction mixture is fed to a purifying HPLC from the reaction flasks RF1, RF2 and RF3. After the purifying operation by the HPLC, the obtained liquid gathered by the fraction collector FC can be fed to the reaction flasks RF1, RF2 and RF3.

Figure 14:
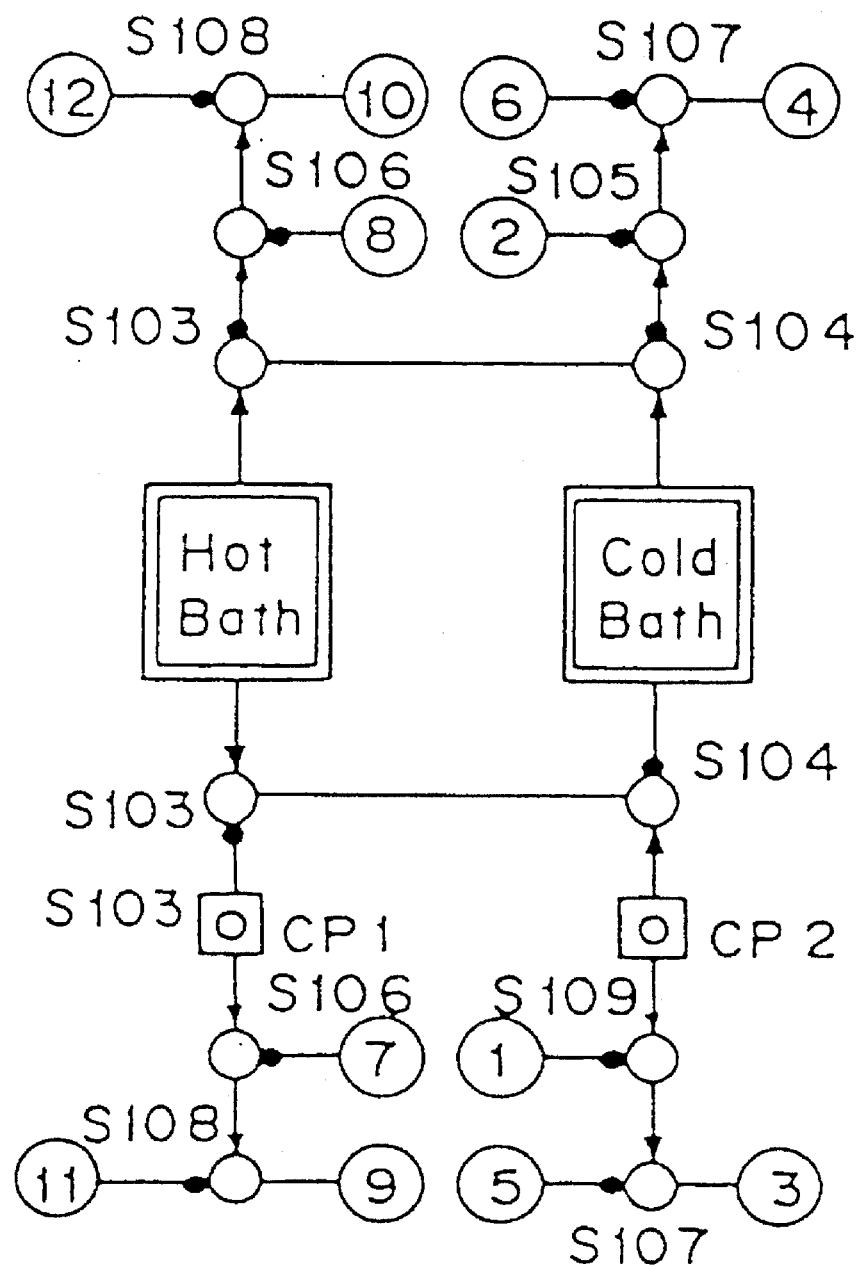
FIG. 14 is a block diagram of a temperature control unit in the above described automated synthesis apparatus.

The temperature control unit 17 is of the construction shown in FIG. 14. Cold temperature media are made to circulate into the reaction flasks RF1 and RF2 of a jacket type and the PH adjusting flask PH through flow lines shown by the tip end designations 1 through 12 so as to control the contents at temperature within the range of −40° C. through 90° C. The reaction flask RF3 of the oil bath type effects the control operation using a heater from a room temperature to about 200° C. The cold media are being circulated into reflux condensers of the respective reaction flasks.

Figure 15:
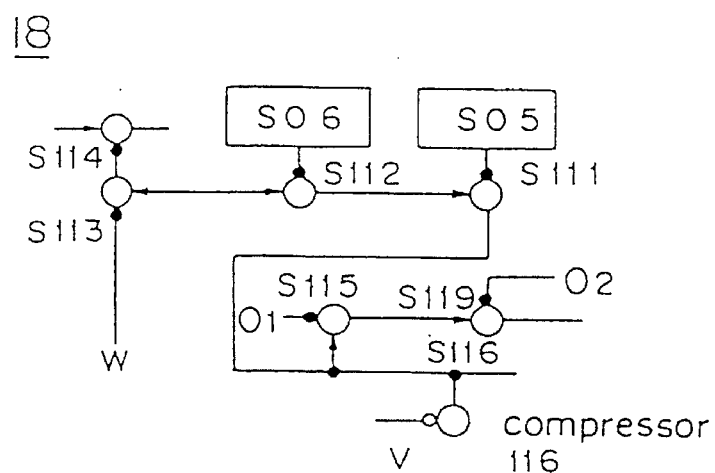
FIG. 15 is a block diagram of a washing unit in the above described automated synthesis apparatus.
Figure 16:
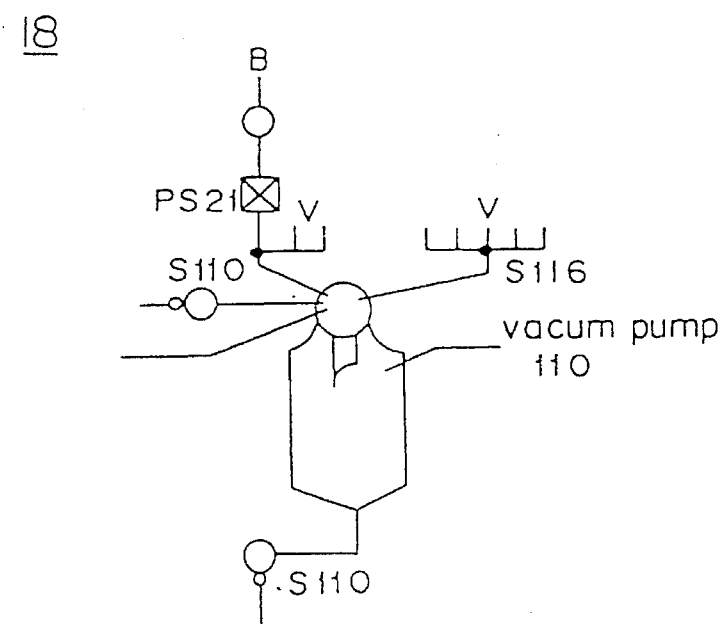
FIG. 16 is a block diagram of a washing unit in the above described automated synthesis apparatus.

The washing unit 18 is of the construction shown in FIG. 15 and FIG. 16. The washing liquids within the washing liquid stores SO5 and SO6 are guided by the vacuum pump 110 into the reaction flask; flow lines are used for synthesizing. The bubbling operation is effected by a compressor 116 to effect a washing operation and then a drying operation is carried out. The washing waste liquid is collected into a waste liquid store, and is discharged after the washing and drying operation. By this operation, the next synthesis preparation is readied.

In the drawing, M1–M8 show manual switches, CP1–CP2 are liquid transporting pumps, LL is a liquid—liquid boundary.

The synthesis processing apparatus (I) composed of the above described construction outputs to a control apparatus (II) the detection signals of the set sensors PS1 through PS21. Operating switches (hereinafter referred to as switches S1–S145) for the above described flow-passage opening and closing electromagnetic valves, the other pumps, an so on are operated in accordance with the synthesis procedure program inputted to the CPU of the control apparatus (II). The apparatus is automatically operated so as to effect an processing operation from a first step of feeding the material into a reaction flask to a final step of the washing of the apparatus after the synthesis completion.

Figure 17:
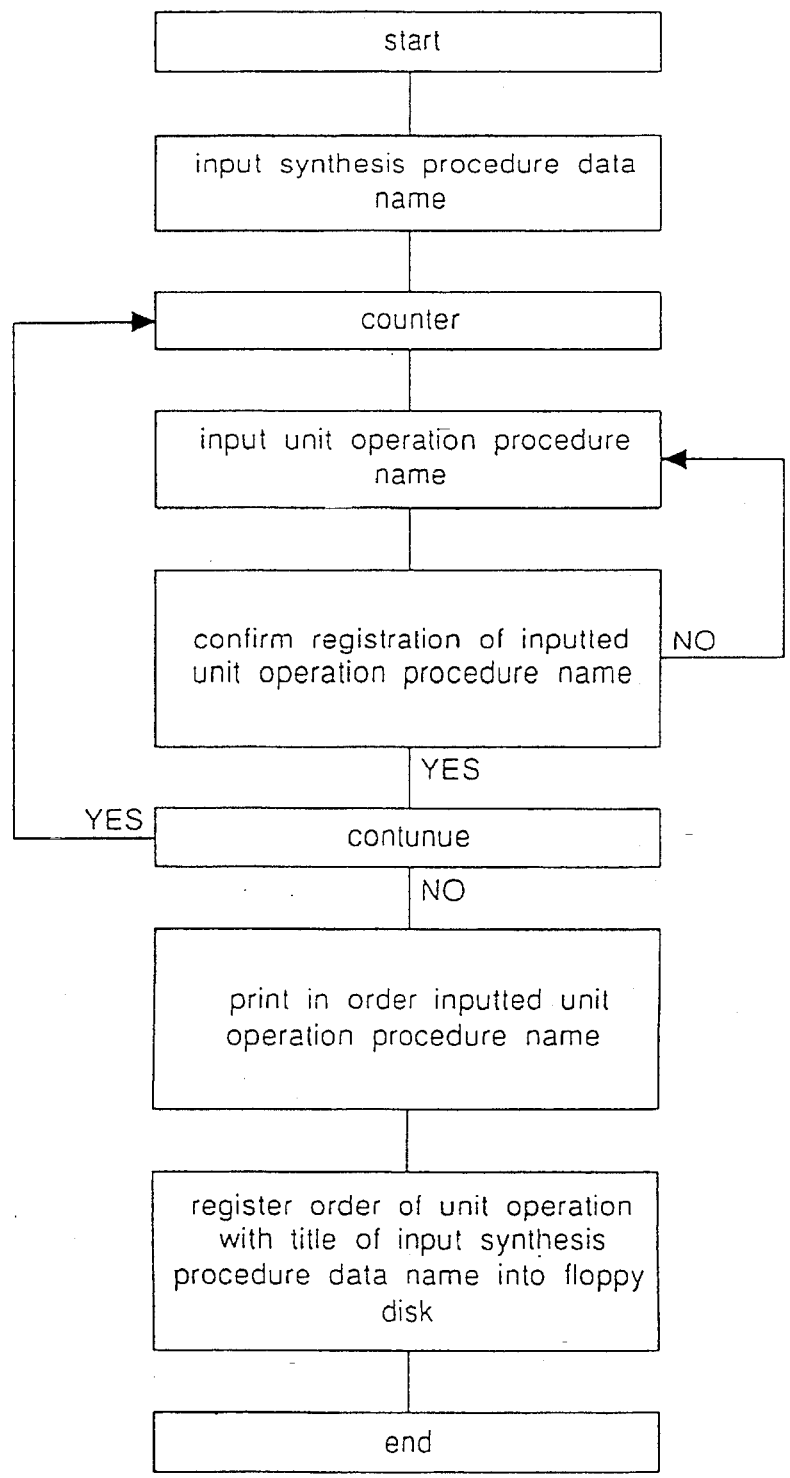
FIG. 17 is a flow chart of a program for making synthesis procedure data.

The synthesis procedure is effected by the CPU in accordance with the order shown in a synthesis procedure data making operation program shown in FIG. 17. "The synthesis procedure data name" composed of a title and so on of a product which is an object is inputted. In a first embodiment of a synthesis procedure to be shown in, for example, Table 1 to be described, the "synthesis procedure data name", namely, the program name is inputted as "PHGL-Z2". The synthesis procedure shows to synthesize N-(carbobenzyloxy)-D-phenylalanine composed of a chemical reaction formula shown in a chemical formula 1.

Then, the operation name of "unit operation procedure" to be performed at the first step is inputted. The "unit operation procedure", composed of a sub-program (subroutine), is a procedure program for setting the operation of the above described electromagnetic valve switches and so on for effecting the unit operation of the synthesis using the above described synthesis processing apparatus. There are about 150 "unit operation procedure" types as described later with one unit operation being registered in one "unit operation name" as the "unit operation procedure". For example, an operation of feeding the material of the given amount to the first reaction flask RF1 of the reaction flask unit 12 from the liquid storing container RS1 of the sample supply unit 11 is registered in the "unit operation name" of "RS1 - RF1". The "unit operation procedure" to be inputted at first is a procedure for inputting, setting the conditions of the synthesis registered under the register name of the "START - 1" to be normally described later.

The above described unit operation procedure is adapted to optionally load under the "unit operation name" using the retaining means, with the storing operation being effected under the title of the "unit operation name" on the retaining means composed of a floppy, hard disk, IC card, magnetic tape, CD and so on.

The "unit operation procedure" registered and stored in the above described retaining means in advance is selected if necessary so as to effect an inputting operation with the "unit operation name." As shown in FIG. 17, after the inputting operation, the registration of the inputted "unit operation name" is confirmed. If the registration is effected, the similar operation is effected sequentially, the "unit operation name" is inputted in accordance with the operation sequence, continues until the input of the "unit operation name" of the final step is completed. If the inputted "unit operation name" is not registered, the "unit operation name" is inputted, the unit operation procedure is inputted so as to register it in the retaining means, thereafter the first operation is continued.

After the last "unit operation name" is inputted, the inputted "unit operation name" is printed in order as shown in FIG. 17. Then, the order of the unit operation procedure is registered with the title of the "synthesis procedure data name" on the retaining means so as to complete the making of the synthesis procedure program.

The synthesis procedure program made in the above described step is shown in Table 1 described hereinafter in the first embodiment. The subroutine No. in the right column corresponds to the subroutine order shown in Table 2. The respective subroutines are registered in advance in the "unit operation name" as shown hereinabove. Namely, the synthesis procedure program is made by the subsequent inputting of the "unit operation name" until No. 1–No. 45 shown in Table 2. Chemical Formula 1 is a chemical formula of compounds considered an object of the synthesis as described hereinabove above, and is desired to be described or accompanied on a form with synthesis procedures being printed on it.

(TABLE 1)

| Program name PHGL - Z2 | |
|---|---|
| Operations | Subroutines No 1 |
| 1 input reaction conditions | 1 |
| 2 (1) 1.8 g (12 mm)/N-NaOH 12 ml (12 mm) is put into a reaction flask. | manual |
| 3 CBZ-Cl 2.1 g (12 mm)/THF 20 ml and N-NaOH 12 ml are added dropwise with stirring for fifteen minutes at 0° C. | 2,3,4, 5,6 |
| 4 Further cooling at 0° C., stirring operations are continued for thirty minutes. | 7 |
| 5 THF is removed at 40° C. | 8 |
| 6 Washing with AcOEt (30 ml) twice | 9,10,11, 12,13 |
| 7 AcOEt 30 ml is added and the mixture is adjusted to PH2 by adding N-HCl with stirring. | 14,15, 16,17 |
| 8 The mixture is extracted with AcOEt, and then dried through the anhydrous sodium sulfate column. | 18,19, 20,21 |
| 9 After removal of AcDAt, white crystals (2) are obtained in a yield of 2.61 g (76.3%) | manual |
| 10 washing of the apparatus | 22,23,45 |

(TABLE 2)

| No. | operation | No. | operation | No. | operation |
|---|---|---|---|---|---|
| 1 | START - 1 | 2 | F1 - STR - ON | 3 | COOL - 1 - ON |
| 4 | R51 - RF1 | 5 | COOL - 1 - OF | 6 | F1 - STA - OF |
| 7 | HF1 - RC - 1 | 8 | RF1 - CONCI | 9 | F1 - STH - ON |
| 10 | RS2 - RF1 | 11 | F1 - STR - OF | 12 | ARI - BUBB |
| 13 | AR1 - L - RF2 | 14 | RS2 - RF2 | 15 | RF2 - PH |
| 16 | PH ADJ | 17 | PH - RF2 | 18 | RS2 - AF3 |
| 19 | RF3 - PH | 20 | PH - AF2 | 21 | RF2 - X - RF3 |
| 22 | ALARM | 23 | WASH | 24 | PS WASH |
| 25 | SR1 - SF - DR | 26 | RF1 - SF | 27 | SF - SR1 |
| 28 | SR1 - SF - DR | 29 | RF2 - SF | 30 | SF - F3 - F2 |
| 31 | RF2 - SF | 32 | SF DRAIN | 33 | RF3 - SF |
| 34 | SF DRAIN | 35 | F1 - STR - ON | 36 | RF1 DRY |
| 37 | F1 - STR - OF | 38 | F2 - STR - ON | 39 | RF2 DRY |
| 40 | F2 - STR - OF | 41 | F3 - STR - PM | 42 | RF3 DRY |
| 43 | F3 - STR - OF | 44 | FINISH | 45 | END |

(Chemical Formula 1)

$$\text{C}_6\text{H}_5\text{—CH(NH}_2\text{)—CO}_2\text{H} + \text{Z—Cl} \longrightarrow \text{C}_6\text{H}_5\text{—CH(NH—Z)—CO}_2\text{H}$$

| 1.8 g(12mM) | 2.1 g(12mM) | 2.6 g(76.3%) |
|---|---|---|
| (1) | | (2) |

Figure 18:
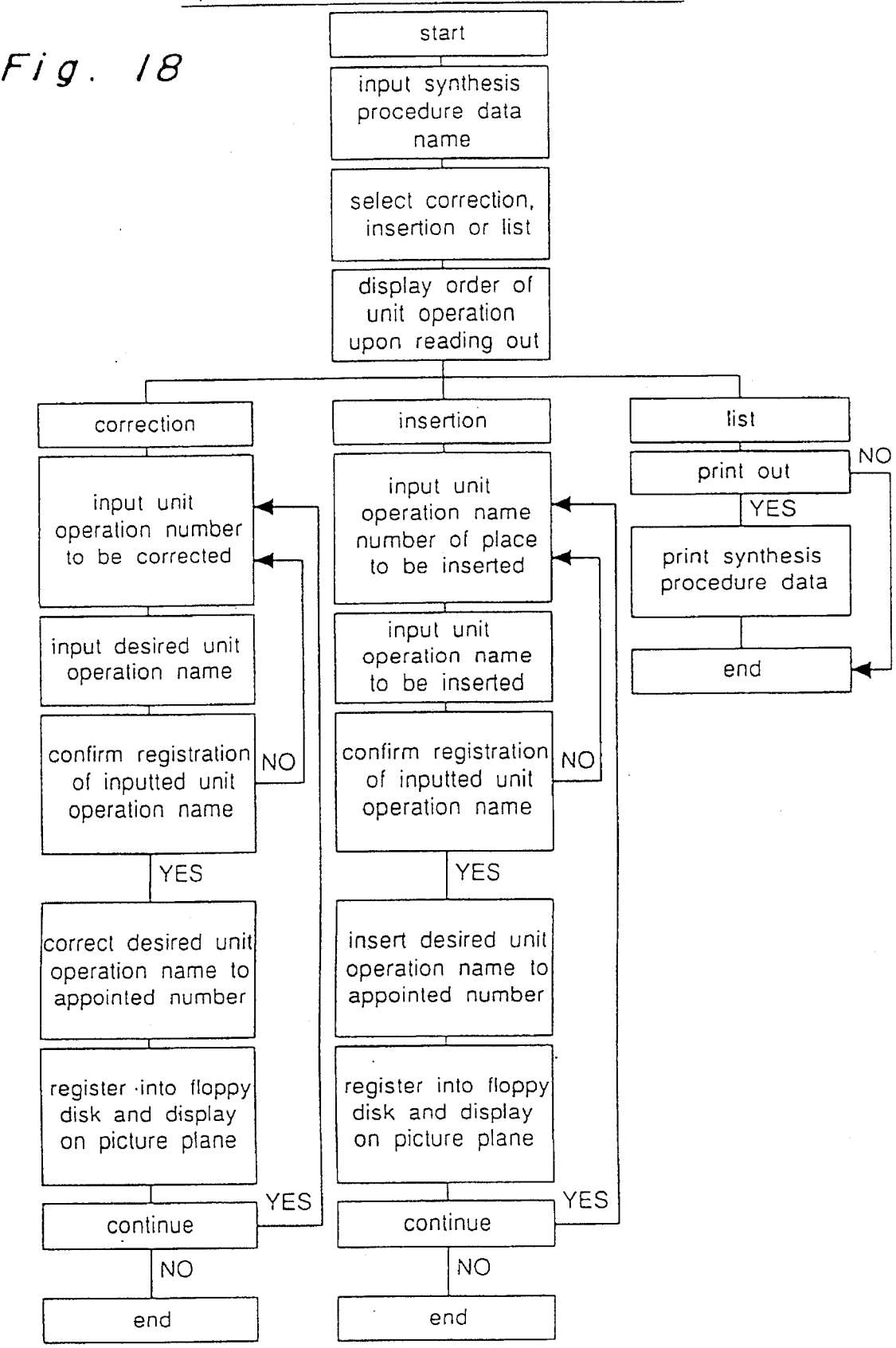
FIG. 18 is a flow chart of a correcting program for synthesis procedure data.

The above described respective synthesis procedures are made in a step showing in the above described FIG. 17, and as shown in a synthesis procedure data correcting program of FIG. 18, are made in a step shown in the above described FIG. 17, can be made by the correction of the synthesis procedure data to be stored, recorded on the retaining means composed of a floppy and so on. When a synthesis procedure program approximate to the registered synthesis procedure program is made, the registered synthesis procedure program is called by a synthesis procedure data name so as to replace the different unit operation procedure with correction, or/and a unit operation procedure necessary for the desired location is inserted and the order of the unit operation procedures is replaced. By such correction, another synthesis procedure many be made with better efficiency.

Figure 19:
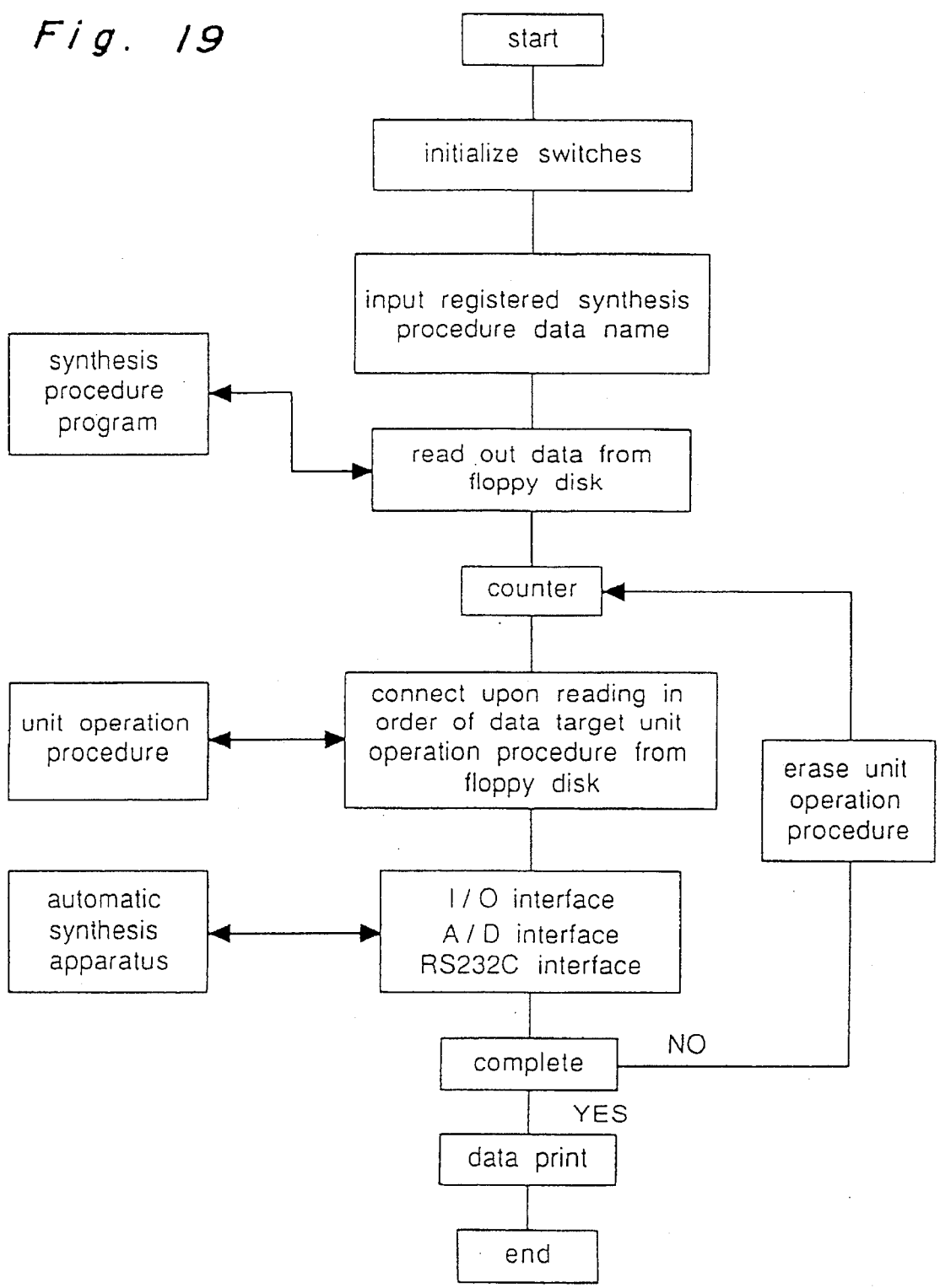
FIG. 19 is a flow chart of an automated synthesis controlling program.

The program for driving and controlling the synthesis processing apparatus is stored in the retaining means as the automated synthesis controlling program shown in FIG. 19 with the use of a synthesis procedure program made in a step shown in the above described FIG. 17 or FIG. 18. When a particular target compound is synthesized in accordance with the synthesis procedure program, first an automated synthesis controlling program is inputted into the computer CPU so as to input the "synthesis procedure data name" of the synthesis procedure program in accordance with the instructions of the program so that the synthesis procedure program is read from the retaining means with the synthesis procedure program being stored in it. The unit operation procedure name is read from the synthesis procedure program so as to read the respective unit operation procedures from the retaining means with the unit operation procedure being stored. The unit operation procedure is coupled in accordance with the operation order set with the synthesis procedure program. The electromagnetic valve switch and so on of the synthesis processing apparatus (I) is sequentially operated and is driven through an I/O interface, an A/D interface and so on in accordance with the unit operation procedure.

The automated synthesis controlling program shown in FIG. 19 set so that the synthesis processing apparatus may be driven in accordance with the above described synthesis procedure program is to operate the synthesis processing apparatus as set in the synthesis procedure program. The automated synthesis controlling program shown in FIG. 20 shows a modified embodiment of an automated synthesis controlling program where an interrupt program can be executed by the manual key operation of the computer during the execution of the synthesis procedure program.

Figure 20:
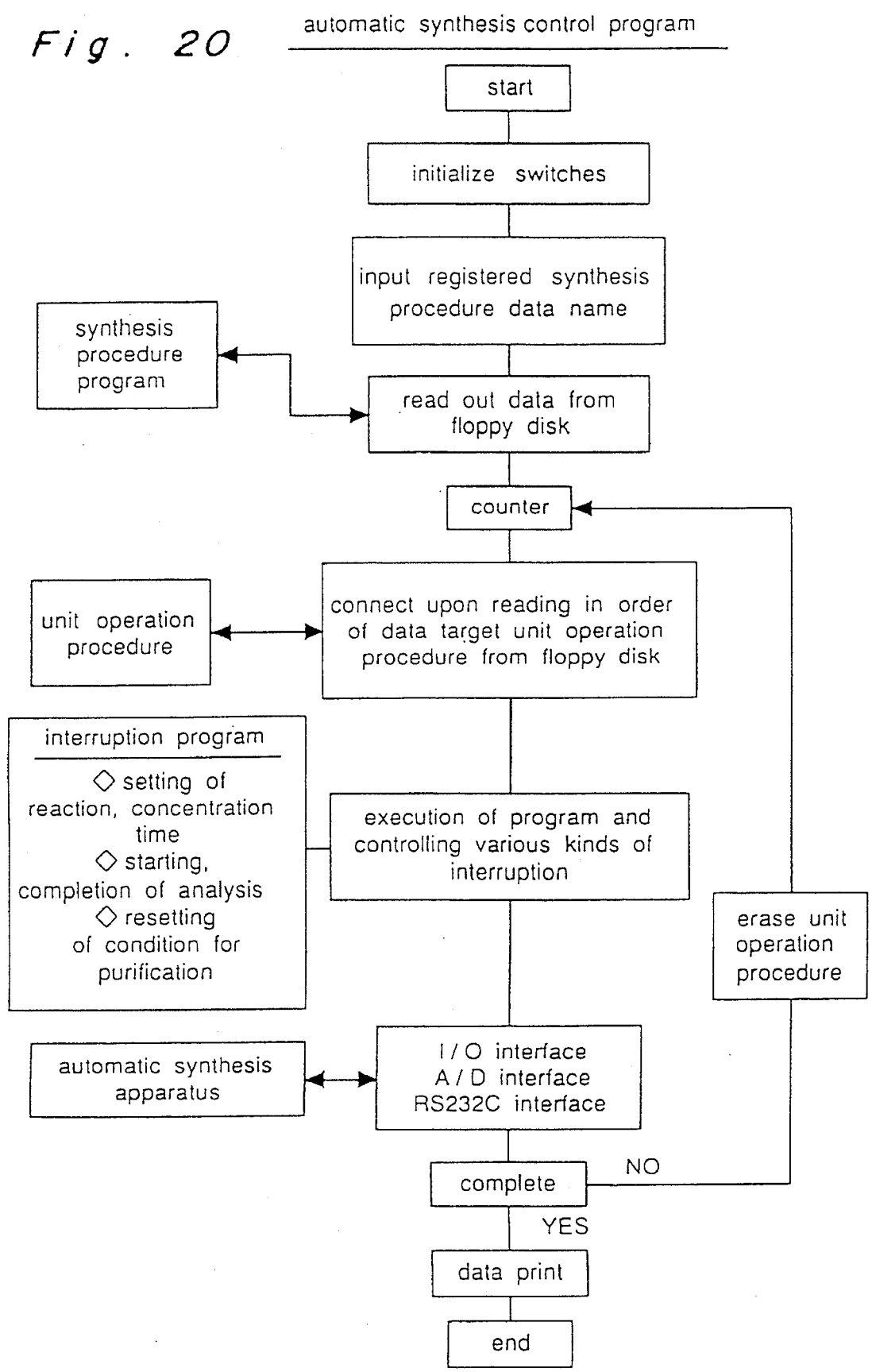
FIG. 20 is a flow chart of the other embodiment of an automated synthesis controlling program.
Figure 21:
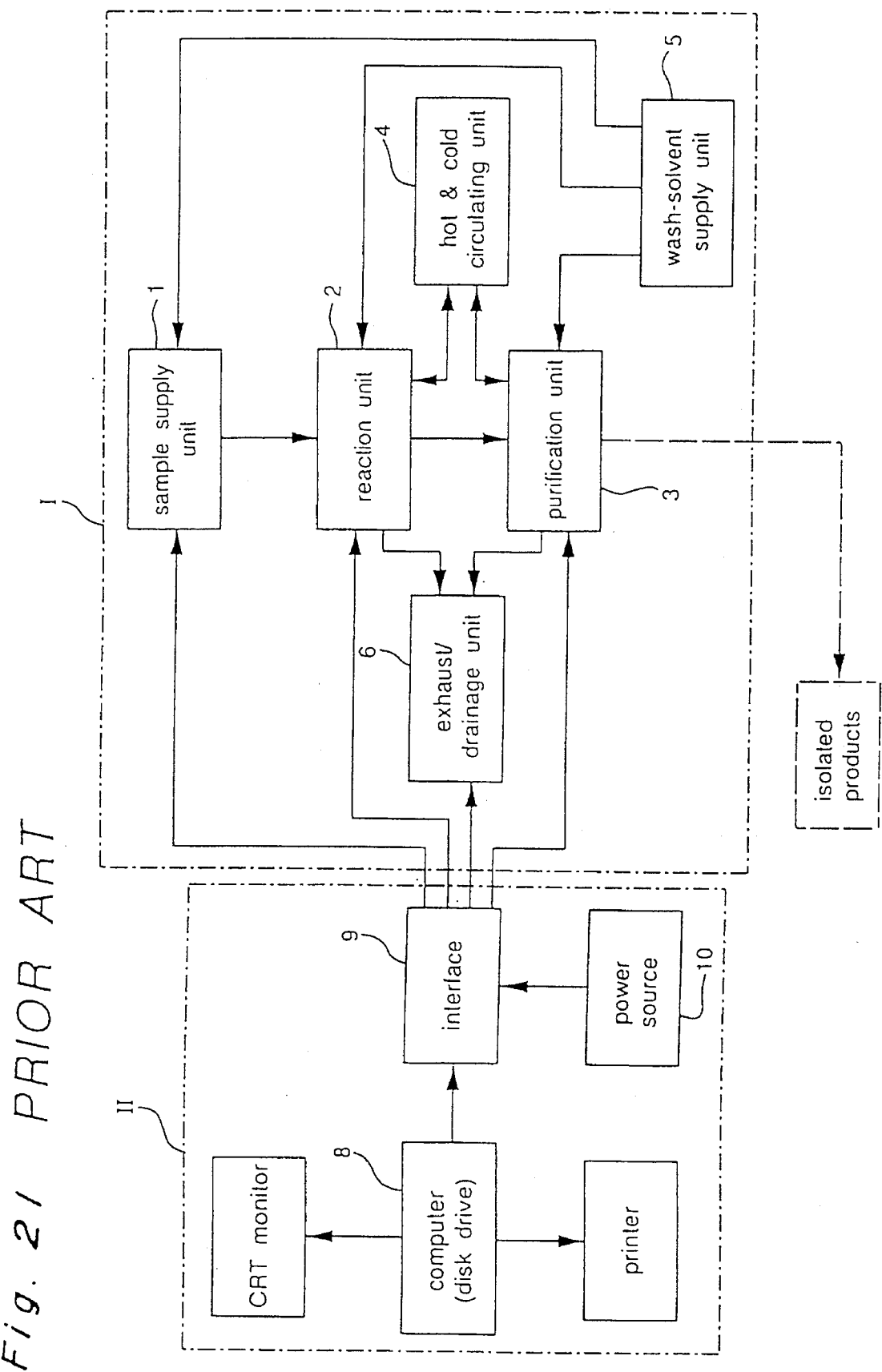
FIG. 21 is a block diagram of the conventional automated synthesis apparatus.

The automated synthetic controlling program shown in FIG. 20 makes it possible to interrupt the various types of interrupt programs during the execution of the synthesis procedure program as shown. The interrupting operation includes an operation of changing the setting of the reaction, concentration time, into an optional time, by key operations from the set time by the synthesis procedure program, an operation of changing the analysis starting and completing time from the set time of the synthesis procedure program to an optional time, an operation of changing the conditions of the purifying time into a set conditions by the program so as to effect re-setting operation, and so on. The illustrated interrupt program is only an example illustration, and is not restricted to the described operation.

Concretely, the time setting of the above described reaction, concentration inputs, sets the synthesis procedure program with the unit operation procedure of the "START-1" at the making time of the synthesis procedure program. When the program is executed so as to effect the actual synthesis processing, there is a case where the reaction, concentration time is obliged to be reduced or extended by the condition of the reaction, concentration. In this case, the time set in program at first by the manual key operation is changed, shortened or extended so that the setting operation may be effected again.

The interruption of the above described analysis start and completion samples one portion of the reaction liquid for an optional time by the key operation during the reaction to measure using the WP so that the progressing condition of the reaction may be investigated. The analysis is adapted to be completed at this time point by the key operation.

The re-setting of the conditions at the purifying time is adapted to re-set the conditions of the purifying set by the synthesis procedure program before the synthesis processing starts, the conditions of the purifying by the key operation when, for example, the conditions have been judged to be desired to be other conditions in accordance with the reaction conditions.

Although it is not described in FIG. 20, the completion judgment of the reaction is effected automatically by the automatic analysis of the reaction liquid so as to stop the reaction processing operation by the completion judgment of the reaction so that such an interrupt program to be advanced to the next step may be interrupted.

As the reaction processing operation is set in time in the synthesis procedure program, there is a case where the reaction continues even if the reaction is completed in reality, and if the reaction is not really complete on the other hand, there is an inconvenience of completing the reaction processing as in the program. In such a case, when an operator can watch the reaction conditions, the reaction can be completed by the above described key operation. When the reaction processing operation is effected in an unmanned condition at night, the reaction processing operation can be stopped automatically in accordance with the judgement by the automated operation of the completion judgment of the above described reaction, and the step can move to the next step.

The completion judgment of the above described reaction is to automatically judge whether the reaction continues further by the analytic results of the reaction liquid, or the reaction stops to move to the next step. For example, the following three methods are provided as a judgment means.

1) The size of the peak of the raw material is inputted in advance. If the peak of the raw material is confirmed to have been reduced by 90% or more as a result of the analysis, the reaction processing operation is stopped.

2) When the remaining ratio of the raw material is the same through the comparison with the previous analysis result, the reaction processing operation is stopped.

3) The size of the peak of the product is inputted in advance. If the peak of the product is confirmed to have been reached by 90% or more as the analysis result, the reaction is stopped.

As described above, when the synthesis processing is executed in accordance with the synthesis procedure program, it is fundamental that the synthesis processing apparatus I is controlled, driven in accordance with the automated synthesis controlling program shown in FIG. 19. In the synthesizing of compounds where elements difficult to predict (the reaction time is difficult to predict correct or the like) are many, synthesis processing can be effected reasonably with better efficiency when the synthesis processing apparatus I is driven and controlled using the automated synthesis controlling program which can be interrupted by the manual operation shown in FIG. 20.

The "unit operation procedure" as a basic unit for constituting the above described "synthesis procedure program" will be described hereinafter. As shown hereinabove, the "unit operation procedure" is composed of one unit of operation procedure of "sample is fed to one specific reaction flask of the reaction flask unit 12 from one specific liquid storing container of the sample supply unit 11," "solution in one specific reaction flask is cooled" or the like as described hereinabove. In the present invention, the subroutine program is made in advance by about approximately 150 types of unit operation procedures to be enumerated hereinafter so as to give them "unit operation names" for storing them in the retaining means.

The contents of the unit operation procedures and their "unit operation names" are shown in Table 3 given hereinafter. The concrete operation contents are given later.

(TABLE 3)

| Unit Operation Names | Operation Contents |
| --- | --- |
| RS1 - RF1 | A reagent in RS1 is quantified in 10 ml units followed by transferring it to RF1. |
| RS1 - RS2 | A reagent in RS1 is quantified in 10 ml units followed by transferring it to RF2. |
| RS1 - RF3 | A reagent in RS1 is quantified in 10 ml units followed by transferring it to RF3. |
| RS2 - RF1 | A reagent in RS2 is quantified in 10 ml units followed by transferring it to RF1. |
| RS2 - RF2 | A reagent in RS2 is quantified in 10 ml units followed by transferring it to RF2. |
| RS2 - RF3 | A reagent in RS2 is quantified in 10 ml units followed by transferring it to RF3. |
| RS3 - RF1 | A reagent in RS3 is quantified in 10 ml units followed by transferring it to RF1. |
| RS3 - RF2 | A reagent in RS3 is quantified in 10 ml units followed by transferring it to RF2. |
| RS3 - RF3 | A reagent in RS3 is quantified in 10 ml units followed by transferring it to RF3. |
| RS4 - RF1 | A reagent in RS4 is quantified in 10 ml units followed by transferring it to RF1. |
| RS4 - RF2 | A reagent in RS4 is quantified in 10 ml units followed by transferring it to RF2. |
| RS4 - RF3 | A reagent in RS4 is quantified in 10 ml units followed by transferring it to RF3. |
| RS5 - RF1 | A reagent in RS5 is quantified in 10 ml units followed by transferring it to RF1. |
| RS5 - RF2 | A reagent in RS5 is quantified in 10 ml units followed by transferring it to RF2. |
| RS5 - RF3 | A reagent in RS5 is quantified in 10 ml units followed by transferring it to RF3. |
| RS6 - RF1 | A reagent in RS6 is quantified in 10 ml units followed by transferring it to RF1. |
| RS6 - RF2 | A reagent in RS6 is quantified in 10 ml units followed by transferring it to RF2. |
| RS6 - RF3 | A reagent in RS6 is quantified in 10 ml units followed by transferring it to RF3. |
| RR1 - RF1 | Total amount of a reagent in RR1 is transported to RF1. (Dropwise addition in the case of RC-1) |
| RR2 - RF1 | Total amount of a reagent in RR2 is transported to RF1. (Dropwise addition in the case of RC-2) |
| RR3 - FR1 | Total amount of a reagent in RR3 is transported to RF1. (Dropwise addition in the case of RC-3) |
| RR4 - FR1 | Total amount of a reagent in RR4 is transported to RF2. (Dropwise addition in the case of RC-1) |
| RR5 - RF1 | Total amount of a reagent in RR5 is transported to RF2. (Dropwise addition in the case of RC-2) |
| RR6 - RF2 | Total amount of a reagent in RR6 is transported to RF2. (Dropwise addition in the case of RC-3) |
| RR7 - RF2 | Total amount of a reagent in RR7 is transported to RF3. (Dropwise addition in the case of RC-1) |
| RR8 - RF3 | Total amount of a reagent in RR8 is transported to RF3. (Dropwise addition in the case of RC-2) |
| RR9 - RF3 | Total amount of a reagent in RR9 is transported to RF3. (Dropwise addition in the case of RC-3) |
| RF1 - RF2 | The solution in RF1 is transported to RF2. |
| RF1 - RF3 | The solution in RF1 is transported to RF3. |
| RF2 - RF1 | The solution in RF2 is transported to RF1. |
| RF2 - RF3 | The solution in RF2 is transported to RF3. |
| RF3 - RF1 | The solution in RF3 is transported to RF1. |
| RF3 - RF2 | The solution in RF3 is transported to RF2. |
| HPLC | A sample from SR3 is charged to HPLC to carry out chromatography. |
| RF1 - BUBB | Bubbling in RF1. |
| RF2 - BUBB | Bubbling in RF1. |
| RF3 - BUBB | Bubbling in RF1. |
| PH - BUBB | Bubbling in RF1. |
| COOL - 1 - ON | Cooling start of RF1 |
| COOL - 1 - OF | Cooling completion of RF1 |
| COOL - 2 - ON | Cooling start of RF2 |
| COOL - 2 - OF | Cooling completion of RF2 |
| RF1 - RC - 1 | First cooling reaction in RF1 |
| RF1 - RC - 2 | Second cooling reaction in RF1 |
| RF1 - RC - 3 | Third cooling reaction in RF1 |
| RF1 - RH - 1 | First heating reaction in RF1 (Room reaction when the temperature setting is RT) |
| RF1 - RH - 2 | Second heating reaction in RF1 (Room reaction when the temperature setting is RT) |
| RF1 - RH - 3 | Third heating reaction in RF1 (Room reaction when the temperature setting is RT) |
| RF2 - RC - 1 | First cooling reaction in RF2 |
| RF2 - RC - 2 | Second cooling reaction in RF2 |
| RF2 - RC - 3 | Third cooling reaction in RF2 |
| RF2 - RH - 1 | First heating reaction in RF2 (Room |

(TABLE 3)-continued

| Unit Operation Names | Operation Contents |
|---|---|
| | temperature reaction when the temperature setting is RT) |
| RF2 - RH - 2 | Second heating reaction in RF2 (Room temperature reaction when the temperature setting is RT) |
| RF2 - RH - 3 | Third heating reaction in RF2 (Room temperature reaction when the temperature setting is RT) |
| RF3 - REA - 1 | First reaction in RF3 |
| RF3 - REA - 2 | Second reaction in RF3 |
| RF3 - REA - 3 | Third reaction in RF3 |
| RF1 - CONC1 | First concentration in RF1 |
| RF1 - CONC2 | Second concentration in RF1 |
| RF1 - CONC3 | Third concentration in RF1 |
| RF2 - CONC1 | First concentration in RF1 |
| RF2 - CONC2 | Second concentration in RF2 |
| RF2 - CONC3 | Third concentration in RF2 |
| RF3 - CONC1 | First concentration in RF3 |
| RF3 - CONC2 | Second concentration in RF3 |
| RF3 - CONC3 | Third concentration in RF3 |
| RF1 - X - RF2 | The reaction mixture in RF1 is extracted, dried to transport upper layer liquid to RF2. |
| RF1 - X - RF3 | The reaction mixture in RF1 is extracted, dried to transport upper layer liquid to RF3. |
| RF2 - X - RF1 | The reaction mixture in RF2 is extracted, dried to transport upper layer liquid to RF1. |
| RF2 - X - RF3 | The reaction mixture in RF2 is extracted, dried to transport upper layer liquid to RF3. |
| RF2 - X - RF1 | The reaction mixture in RF3 is extracted, dried to transport upper layer liquid to RF1. |
| RF3 - X - RF2 | The reaction mixture in RF3 is extracted, dried to transport upper layer liquid to FR2. |
| F1 - XL - F2 | The reaction mixture in RF1 is extracted, dried to transport lower layer liquid to RF2. |
| F1 - XL - F3 | The reaction mixture in RF1 is extracted, dried to transport lower layer liquid to FR3. |
| F2 - XL - F1 | The reaction mixture in RF2 is dried, dried to transport lower layer liquid to RF1. |
| F2 - XL - F3 | The reaction mixture in RF2 is extracted, dried to transport lower layer liquid to RF3. |
| F3 - XL - F1 | The reaction mixture in RF3 is extracted, dried to transport lower layer liquid to RF1. |
| F3 - XL - F2 | The reaction mixture in RF3 is extracted, dried to transport lower layer liquid to RF2. |
| RF1 - L - RF2 | A solution in RF1 is extracted, washed to transport lower layer liquid to RF2. |
| DE - CO ON | Selection of the column for chromatography and stand by a detector. |
| DE - CO OF | Selection of the column for chromatography and reset a detector. |
| RF1 - PH | A solution in RF1 is transported to PH. |
| RF2 - PH | A solution in RF2 is transported to PH. |
| RF3 - PH | A solution in RF2 is transported to PH. |
| PH - RF1 | A solution in PH is transported to RF1. |
| PH - RF2 | A solution in PH is transported to RF2. |
| PH - RF3 | A solution in PH is transported to RF3. |
| PH ADJ | PH adjustment |
| FRACT - RF1 | A liquid is transported from fraction tube to RF1. |
| FRACT - RF2 | A liquid is transported from fraction tube to RF2. |
| FRACT - RF3 | A liquid is transported from fraction tube to RF3. |
| FRACT - RFM | A liquid is transported from fraction tube to desired flask |
| RF1 - SR3 | A solution in RF1 is transported to SR3. |
| RF2 - SR3 | A solution in RF2 is transported to SR3. |
| RF3 - SR3 | A solution in RF3 is transported to SR3. |
| RF1 - SF | A solution in RF1 is transported to SF |
| RF2 - SF | A solution in RF2 is transported to SF |
| RF3 - SF | A solution in RF3 is transported to SF |
| SF DRAIN | A solution in SF is discharged. |
| SR1 - SF - DR | A solution in SR1 is transported to SF and wasted. |
| SR0 - SF - DR | A solution in SR0 is transported to SF and wasted. |

(TABLE 3)-continued

| Unit Operation Names | Operation Contents |
|---|---|
| SR3 DRAIN | A solution in SR3 is transported to SF and wasted. |
| SR2 DRAIN | A solution in SR2 is transported to SF and wasted. |
| SR - SR0 | A solution in SF is transported to SR0. |
| SF - SR1 | A solution in SF is transported to SR1. |
| SF - F1 - F2 | A solution in SF is transported by half to RF1, RF2. |
| SF - F1 - R3 | A solution in SF is transported by half to RF1, RF3. |
| SF - F2 - F3 | A solution in SF is transported by half to RF2, RF3. |
| SF - RF3 | A solution in SF is transported to RF1. |
| SF - RF2 | A solution in SF is transported to RF2. |
| SF - RF3 | A solution in SF is transported to RF3. |
| RF1 - SR2 | A solution in RF1 is transported to SR2. |
| RF2 - SR2 | A solution in RF2 is transported to SR2. |
| RF3 - SR2 | A solution in RF3 is transported to SR2. |
| RF1 DRY | Drying of RF1. |
| RF2 DRY | Drying of RF2. |
| RF3 DRY | Drying of RF3. |
| MR WASH | Washing of MT1, MT2, RR1 - RR9. Washing liquid remains in RF1, RF2, RF3. |
| START - 1 | First subroutine program of reaction three times, concentration three times. |
| START - 2 | Transportation from the flask is also included in the above described program. |
| WS - RF1 | Solvent for washing use is transported to RF1 through PS1. |
| WS - RF2 | Solvent for washing use is transported to RF2 through PS1. |
| WS - RF3 | Solvent for washing use is transported to RF3 through PS1. |
| F1 - STR - ON | Stirring of RF1 starts. |
| F1 - STR - OF | Stirring of RF1 ends. |
| R2 - STR - ON | Stirring of RF2 starts. |
| F2 - STR - OF | Stirring of RF2 ends. |
| F3 - STR - ON | Stirring of RF3 starts. |
| F3 - STR - OF | Stirring of RF3 ends. |
| A - LC ON | Switch on the analytical HPLC |
| A - LC OF | Switch off the analytical HPLC |
| PURY | A reaction mixture in SR3 is purified with HPLC. |
| ANAL1 | A reaction mixture in RF1 is sampled to analyze with HPLC after dilution. |
| ANAL2 | A reaction mixture in RF2 is sampled to analyze with HPLC after dilution. |
| ANAL3 | A reaction mixture in RF3 is sampled to analyze with HPLC after dilution. |
| MATU | Allowed to stand for five minutes. |
| ALARM | input-wait with alarm ringing, moves next with F1 KEY |
| FINISH | final picture plane |
| WASH | washing picture plane |
| DELETE | |
| DELETE | subroutine erasure |

Exclusive extraction subroutines are enumerated in Table 4 given hereinafter.

(TABLE 4)

| Unit Operation Names | Operation Contents. |
|---|---|
| ESF - SR0 | A solution is transported from SF to SR0 |
| ESF - SR1 | A solution is transported from SF to SR1 |
| ESEP - SR0 | Allowed to stand for five minutes, lower layer is transported to SR0. |
| ESEP - SR1 | Allowed to stand for five minutes, lower layer is transported to SR1. |
| ESF - DT - F1 | A solution in SR is transported to RF1 through a drying tube. |
| ESF - DT - F2 | A solution in SF is transported to RF2 through a drying tube. |

(TABLE 4)-continued

| Unit Operation Names | Operation Contents. |
|---|---|
| ESF - DT - F3 | A solution in SF is transported to RF3 through a drying tube. |
| ESF - F1 | A solution in SF is transported to RF1. |
| ESF - F2 | A solution in SF is transported to RF1. |
| ESF - F3 | A solution in SF is transported to RF3. |
| EF1 - SF | A solution in RF1 is transported to SF. |
| EF2 - SF | A solution in RF2 is transported to SF. |
| EF3 - SF | A solution in RF3 is transported to SF. |
| EXSLCT | A solvent for extraction are quantified and transported to RF1, RF2, RF3. |
| EWSSLCT | A solution for washing are quantified and transported to RF1, RF2, RF3. |
| ESF - RUBB | Bubbling in SF. |
| ESR1 - SF | A solution in SR1 is transported to SF. |
| ESR0 - SF | A solution in SR0 is transported SF. |
| ESF DR | A solution in SR is wasted. |
| ESR1 SR | A solution in SR1 is transported to SF, and wasted. |
| ESR0 DR | A solution in SR0 is transported to SF and wasted. |
| EXT - START | Number of extraction operation times is calculated. In the extraction operation, it is arranged at the head. |
| EDT SLCT | A drying tube is set. |
| EDT RST | A drying tube is reset |

The program contents of each of the above described unit operation procedures will be described hereinafter in detail. All the specifications of the respective electromagnetic valves are displayed as switches S1, S100 and so on for operating all the electromagnetic valves.

[RS1 - RF1] Reagents of RS1 are quantified in a given amount (10 ml in the present embodiment) and are transported to RF1.

The titles of the synthesis unit operations to be performed are displayed on the CRT. The switches S118, 35, 55, 114, 116 are turned on for a given time period so as to start the transportation of the solution of the RS1, with an air compressing pump, to the quantifying tube MT1. Switches S114, 116 are turned off to stop the air compressing pump. When the liquid level detector of the photosensor PS8 detects the liquid level, it follows that the required amount (10 ml in the present embodiment) has been quantified so as to output the signal. The output signal is received to turn off the switches S118, 35 to stop the transportation of the MT1 from the RS1. Thereafter, the switch S61 is turned on so as to transport the quantified reagent from the MT1 to RF1. The switches S67, 86, 110 are on for the required time period so as to completely transport the reagents, which remains on the flow line, to RF1 by the pressure reducing pump. The switches S110, 67, 86, 55, 61 are turned off so as to turn off all the electromagnetic valves.

Unit operations for transporting to either of the reaction flasks RF1-RF3 with 10 ml the reagent of the liquid storing containers RS1-RS6 of the sample supply unit 11, "RS1-RF2", "RS1-RF3", "RS2-RF1", "RS2-RF2", "RS2-RF3", "RS3-RF1", "RS3-RF2", "RS4-RF3", "RS5-RF1", "RS5-RF2", "RS5-RF3", "RS6-RF1", "RS6-RF2", "RS6-RF3" are omitted in description as the unit operation procedure of the above described "RS1-RFI" is the same in operation, with the switches, photosensors, volumetric tubes are different from their correspondences.

[RR1-RF1] All amount of the reagent in the RR1 is transported to the RF1.

The titles of the synthesis unit operation to be performed are displayed on the CRT. The switches S118, 53, 43, 85 are on for the required time period so as to start the transportation of RR1 from the RR1. During this period, the transportation start of the solution is confirmed with a photosensor PS12. After the transportation start signal has been confirmed, the switches S67, 86, 110 are on for the required time period, all the solution which remains on the line with the use of the reducing pump is transported to the RF1. The transportation completion of the solution is confirmed by the photosensor PS12. After the confirmation of the transportation completion signal, switches S110, 86, 67, 118, 53, 43, 85 are turned off to turn off all the electromagnetic valves.

The operations of the unit operations "RR2-FR1", "RR3-RF1", "RR4-RF2", "RR5-RF2", "RR6-RF2", "RR7-RF3", "RR8-RF3", "RR9-RF3" for transporting all amount of the reagent in the liquid storing containers of the sample supply unit 11 to the reaction flasks RF1-RF3 are omitted in description as the operation of the above described "RR1-RFI" is the same in operation with the switches, photosensors are different from their correspondences.

[RF1-RF2] The solution is transported from the RF1 to the RF2.

The titles of the synthesis unit operations to be performed are displayed on CRT. The switches S84, 68, 127, 93, 73, 92, 110 are on for the required time period so as to start the transportation of the solution from the RF1 to the RF2 with the use of the pressure reducing pump. During this period, the transportation start and completion of the solution are confirmed by the photosensor PS15. After the confirmation of the transportation start and the completion signal, the switches S84, 68, 127, 93, 73, 110 are turned off so as to turn off all the electromagnetic valves.

The operations of the other unit operations "RF1-RF3", "RF2-RF1", "RF2-RF3", "RF3-RF1", "RF3-RF2" for transporting ting the solution between the flasks of the reaction flask unit 12, the above described "RF1-RF2" is the same in operation are the same in operation as the "RF1-RF2" with the switches and the photosensors being different from the correspondences.

[HPLC] A reaction mixture of SR3 is charged into the HPLC to carry out chromatography.

The titles of the synthesis unit operations to be performed are displayed on the CRT. The switch S21 is on for the required time period so as to switch the injection rotary valve RV2 to the LOAD. After the switch S16 has been turned on, the switches S3, 2 are turned on. Then the piston of the syringe pump is pulled by the required amount so as to slowly introduce the solution of SR3 into the loop of the injection rotary valve. The photosensor PS5 detects the solution so as to repeat the pulling operation of the piston until it runs out. The photosensor PS5 detects the solution and the computer receives the gone signal. The switch S21 is on for the given time period so as to switch the RV2 to an INJECTION from the LOAD for starting the HPLC. The analog output of the detector is converted into digital output so as to successively display the chromatogram on the CRT. The purification is effected by a peak division method. The detection method of the peak is calculated with the size of the slope. The switch S27 is turned on to effect a collecting operation at the fraction collector. At the peak split division completion time, the switch S27 is tuned off so as to switch the outflow liquid to the waste line. Then, the switch S34 is turned on to keep the tube of the fraction collector, by one stroke portion, transported as the preparation of the next peak division. Two types of developing solvents (S03, S04) can be used. To change the developing solvents can be effected by the on, off of the switch S30. If the HPLC purification is completed, the chromatographic chart on the CRT is printed out and the data are registered in the floppy disc. After the purification is completed, the switches S3, 2 are turned off. The picture plane on the CRT is restored to the origin. A position of the piston of the syringe pump is pushed back with the switch S3 being turned on as far as the initial position. All the switches S are turned off with the switches S3, 16 being turned off.

[RF1 - RUBB] Air is bubbled to the RF1 to effect stirring, washing operations.

The titles of the synthesis unit operations to be performed are displayed on the CRT. Switches S87, 84, 67, 86, 110 are on for the given time period. Air is taken in from the outside using the pressure reducing pump, is fed into the solution of the RF1 to effect the bubbling operation. The switches S87, 84, 67, 86, 110 are turned off.

The unit operations "RF2-RUBB", "RF3-RUBB" and "PH-BUBB" of the stirring, washing of the other reaction flask and the PH flask are omitted in description as the operation is the same with the operation of the above described "RF1-RUBB", only with the switches being changed into the correspondences.

[COOL - 1 - ON] Cooling start of the RF1

The titles of the synthesis unit operations to be performed are displayed on the CRT. The switches S109, 105 are on for the given time period. The cold media of the cooling cells are circulated into the RF1 jacket so as to cool the inner solution.

[COOL - 1 - OFF] Cooling completion of the RF1

The titles of the synthesis unit operations for to be performed are displayed on the CRT. The switches S109, 105 are turned off so as to stop the cooling operation.

The unit operation of the cooling start of the RF2 of "COOL - 2 - ON", the operation of the unit operation of the cooling completion of the RF2 of the "COOL - 2 - OFF" are the same in operation only with the above described RF1 and the switches being different. The description thereof is omitted.

[RF1 - RC - 1] The first cooling reaction is effected in the RF1.

The titles of the synthesis unit operations to be performed are displayed on the CRT. The cold media are circuited into the jacket of the RF1, with the switches S109, 105, 100 being on, to rotate a stirrer for stirring the inner solution. When the set completion time has come with the time lapse being displayed, the switches S109, 105, 100 are turned off so as to complete the first cooling reaction. The progressive condition of a temporary change reaction can be confirmed by the analyzing HPLC in the analysis start setting time, the unit operation of the [ANAL-1]. The cooling reaction is carried out even during the analyzing operation.

The unit operation for effecting the second cooling reaction in the RF1 of the "RF1-RC-2", the unit operation for effecting the third cooling reaction in the RF1 of the "RF1-RC-3" have their descriptions omitted hereing, as they are the same in operation as the above described "RF1-RC-2". The unit operation for performing the first cooling reaction on the RF2 of the "RF2-RC-1", and the unit operation for performing the second cooling reaction in the RF2 of the "RF2-RC-2", the unit operation for performing the third cooling reaction in the RF2 of the [RF2-RC-3] are the same in operation as the unit operation of the first, second and third cooling reaction to be performed in the above described RF1 only with the switches being changed to the correspondences. The description thereof has been omitted.

[RF1-RH-1] The first heating reaction is effected in the RF1.

The titles of the synthesis unit operations to be performed are displayed on the CRT. Hot media are circulated into the jackets of the RF1 with the switches S106, 105, 106, 109, 104, 100 being turned on. The stirrer is rotated to stir the inner solution. When the temperature setting of the reaction is at room temperature, only the stirring operation is effected with the switch S100 only being turned on. When the set completion time has come with the time lapse being displayed, the switches S106, 105, 106, 109, 104, 100 are tuned off so as to complete the first heating reaction. When the temperature setting of the reaction is at room temperature, only the switch S100 is turned off. The progress condition of the temporary change reaction can be confirmed by the analytical HPLC in the analysis start setting time, the unit operation of the [ANAL-1]. The heating reaction is effected even during the analyzing operation.

The unit operation for effecting the second heating reaction in the RF1 of the "RF1-RH-2", the unit operation for effecting the third heating reaction in the RF1 of the "RF1-RH-3"are the same in operation as the unit operation for performing the first heating reaction in the RF1. The description thereof has according been omitted. The unit operation for effecting the first heating reaction in the RF2 of the "RF2-RH-1", the unit operation for effecting the second heating reaction in the RF2 of the "RF2-RH-2" the unit operation for the third heating reaction in the "RF2-RH-3" are the same in operation as the first, second, third unit operations in the RF1, only with the switches being changed to the correspondences. The description thereof has accordingly been omitted.

[RF3-REA-1] The first heating reaction is effected in the RF3.

The titles of the synthesis unit operations to be effected are displayed on the CRT. A set temperature is input to a temperature controller from computers so as to effect a heating operation to a set temperature with a heater of the oil bath of the RF3 with the switches S1, 103, 108 being on for rotating the stirrer so as to stir the inner solution. When the set completion time has come with a time lapse being displayed, switches S1, 103, 108 are turned off so as to complete the first heating reaction. The progress condition of the temporary change reaction in the analysis start setting time, the unit operation of the [ANAL-3] can be confirmed with the analytical HPLC. The heating reaction is effected even during the analytical operation.

The unit operation for effecting the second heating reaction in the RF3 of the "RF3-REA-2", the unit operation for effecting the third heating reaction in the RF3 of the "RF3-REA-3"are the same as the unit operation for effecting the first heating reaction in the above described RF3. The description thereof has accordingly been omitted.

[RF1-CONC1] The first concentration is effected in the RF1.

The titles of the synthesis unit operations to be effected are displayed on the CRT. Air is taken in from the outside with the use of the pressure reducing pump while the hot media are being circulated in the jacket of RF1 and being stirred by the switches S84, 87, 67, 86, 110, 104, 109, 105, 100 being on so as to effect the bubbling operation so as to concentrate the contents. The concentration completion setting time with the time lapse being displayed, the concentration sensor (temperature change of the inner solution is analyzed to detect the completion time of the concentration) are judged so as to turn off the switches S84, 87, 67, 86, 110, 104, 109, 105, 100 for completing the first concentration.

The unit operation for effecting the second concentration in the RF1 of the "RF1-CONC2", the unit operation for effecting the third concentration in the RF1 of the "RF1-CONC3" are the same in operation as the unit operation for effecting the first concentration in the RF1. The description thereof has accordingly been omitted. The unit operation for effecting the first, second and third concentration are the same in operation as the unit operation of the concentration in the above described RF1 only with the switches being changed.

[RF3-CONC1] The first concentration is effected in the RF3.

The titles of the synthesis unit operations to be effected are displayed on the CRT. A set temperature is instructed to the temperature controller from the computer. While the heating, stirring operations are being effected with the use of the heater of the oil bath of the RF3 with the switches S79, 97, 96, 110, 95, 102, and 1 being on, air is taken in from the outside with the use of the pressure reducing pump so as to effect the bubbling operation for concentrating the contents. The concentration completion setting time, the switches S79, 97, 96, 110, 95, 102, and 1 are turned off with the time lapse being displayed so as to complete the first concentration.

The unit operation for effecting the second concentration in the RF3 of "RF3-CONC2" the unit operation for effecting the third concentration in the RF3 of the "RF3-CONC3" are the same in operation as the unit operation for effecting the first concentration in the above described RF3. The description thereof has accordingly been omitted.

[RF1-X-RF3] The solution of the RF1 is extracted, washed and is transported to the RF3 while extracted upper layer liquid is being dried.

The titles of the synthesis unit operation to effecting are displayed on the CRT. How many times the extracting operation has been effected is judged to turn the switch S145 on and off in accordance of the number of the extractions for setting the dehydration tubes. The switches S84, 70, 131, 110, and 100 are on for the required time period. The inner solution of the RF1 is transported to the separation funnel SF using a pressure reducing pump during the stirring operation of the RF1. The switches S84, 70, 131, 110, and 100 are turned off. After the inner solution of the SF has been still for the required time period, the switches S115 and 134 are turned on so as to start the transportation of the SF solution to the SR1. During this period, the change in the electric conductivity in the boundary level of the solution is detected by the computer so as to turn off the switches S115 and 134 for transporting only the lower layer to the SR1. The switches S115, 134,110, and 135 are on for the required time period so as to transport the upper layer of the SF to the SR0. During this period, the transportation of the solution is confirmed by the photosensor PS19. The switches S115, 134, 110, and 135 are turned off so as to complete the transportation of the SR0 from the SF. The switches S130, 131, and 110 are turned on to transport the extraction mother liquor of the SR1 to the SF. The capacity set from the set extraction solvent is quantified and is transported to the RF1. The switches S84, 70, 131, 110, and 100 are on for the required time period so as to transport the inner liquid of the RF1 to the separation funnel SF using the pressure reducing pump while the RF1 is being stirred. During this period, the transportation of the solution is confirmed by the photosensor RS15. The switches S84,70, 131, 110, and 100 are turned off. The switches S110, 131, and 134 are on for the required time period so as to feed air to the SF using the pressure producing pump to perform the bubbling operation. The switches S110, 131, and 134 are turned off. After the inner solution of the SF has been stood for the required time period, the switches S115 and 134 are turned on so as to start the transportation of the SF solution to the SR1. During this operation, the change in the conductivity in the boundary level of the solution is detected by the computer to turn off the switches S115 and 134 for transporting the lower layer only to the SR1. The switches S130, 131, 110, and 135 are on for the required time period so as to transport the extraction liquid of the SR0 to the SF. Switches S130, 131, 110, and 135 are turned off. The capacity set from the set extraction liquid washing solvent is quantified and is transported to the RF1. The switches S84, 70, 131, 110, and 100 are on for the required time period so as to transport the inner liquid of the RF1 to the separation funnel of the SF with a pressure reducing pump while the RF1 is being stirred. During this operation, the transportation of the solution is confirmed by the photosensor PS15. The switches S84,70, 131, 110, and 100 are turned off. The switches S110, 131, and 134 are on for the required time period, the air is fed to the SF using the reducing pump so as to effect the washing operation with the bubbling. The switches S110, 131, and 134 are turned off. After the inner solution of the SF has stood for the required time period, the switches S115 and 134 are turned on so as to start the transportation of the SF solution to the SR1. During this period, the change in the electric conductivity in the boundary level of the solution is detected by the computer to turn of the switches S115 and 134 for transporting the lower layer only to the SR1. The switches S115, 134,136, 80, 94, 79, 141, and 142 are turned on. The pressure reducing pump of the switch S110 is intermittently turned on and off repeatedly for the required time period, so that the extraction liquid is made to pass a little quantity by a little quantity through either of the selected dehydration tube DT1 through DT5 so as to dry the extraction liquid and is transported to the RF3. During this operation, the transportation tation of the solution is confirmed by the photosensor PS19. Switches S115, 134, 136, 80, 94, 79, 95, 141, and 142 are turned off. The capacity set from the set extraction liquid washing solvent is quantified and is transported to the RF1. The switches S84, 70, 131, 110, and 100 are on for the required time period so as to transport the inner solution of the RF1 to the separation funnel of the SF using the pressure reducing pump while the RF1 is being stirred. During this operation, the transportation of the solution is confirmed by the photosensor PS15. The switches S115, 134, 136, 80, 94, 79, 95, 141, and 142 are turned on. The pressure reducing pump of the switch S110 is repeatedly turned on and off intermittently for the required time period so as to pass the extraction liquid in a small amounts through either of the selected hydration tubes DT1 through DT5 to dry the extraction liquid and is transported to the RF3. During the operation, the transportation of the solution is confirmed by the photosensor PS19. The witches S115, 134, 136, 80, 94, 79, 95, 141, and 142 are turned off. The switches S130, 131, and 110 are on for the required time period to transport to the SF the extraction mother liquor of the SR1 using the pressure reducing pump. After the switches S130 and 131 are turned off, the switches S115, 134, and 137 are on for the required time period, the extraction mother liquor is transported from the SF to the drain tank and is wasted. The switches S115, 134, 137, and 110 are turned off. How many times the extraction operation has been effected is judged. The switch S145 is turned on and off in accordance with the number of the extractions so as to set the dehydration tube in the initial position.

The operations of the unit operation procedures of the "RF1-X-RF2", "RF2-X-RF1", "RF2-X-RF1", "RF2-X-RF3", "RF3-X-RF1" and "RF3-X-RF2" are similar to the procedure of the above described "RF1-X-RF3" only with switches, photosensors and so on to be used being changed. The description thereof has accordingly been omitted.

[F1-XL-F2] The solution of the RF1 is extracted, washed and is transported to the RF2 while the lower extracted layer liquid is being dried.

The titles of the synthesis unit operations to be effected are displayed on the CRT. How often the extracting operation have been effected is judged so as to turn on and off with the valve switch S145 in accordance with the number of the extractions so as to set the dehydration tube. The switches S84, 70, 131, 110, and 100 are on for the required time period so as to transport the inner solution of the RF1 to the separation liquid funnel of the SF with the pressure reducing pump while the RF1 is being stirred. During the operation, the transportation of the solution is confirmed with the photosensor PS15. The switches S84, 70, 131, 110, and 100 are turned off. After the inner solution of the SF has been still for the required time period, the switches S115, and 134 are turned on so as to start the transportation of the SF solution to the SR1. During this operation, the change in the electric conductivity on the boundary level of the solution is detected by the computer to turn off the switches S115 and 134 so as to transport the lower layer only to the SR1. The capacity set from the set extraction solvent is quantified and is transported to the RF1. The switches S84, 70, 131, 110, and 100 are on for the required time period, the inner solution of the RF1 is transported to the separation funnel of SF using the pressure reducing pump while the RF1 is being stirred. During this operation, the transportation of the liquid is confirmed by the photosensor PS15. The switches S84, 70, 131, 110, and 100 are turned off. The switches S110, 131, and 134 are on for the required time period so as to feed air to the SF using the pressure reducing pump so as to effect the washing with the bubbling. The switches S110, 131, and 134 are turned off. After the inner solution of the SF has stood for the required time period, the switches S115 and 134 are turned on so as to start the transportation of the SF solution to the SR1. During the operation, the change in the electric conductivity on the boundary level of the solution is detected so as to turn off the switches S115 and 134 for transporting the lower layer only to the SR1. The washing liquid of the SF is wasted to the drain tank with the switches S115, 134,137, and 110 being on for the required time period. The switches S130, 131, and 110 are on for the required time period so as to transport the extraction liquid of the SR1 to the SF. Switches S115, 134, 136, 78, 93, 73, 92, and 141 are turned on so as to turn on and off the reducing pump of the switch S110 intermittently for the required time period for passing the extraction liquid a small amount at a time through either of the selected dehydration tubes DT1 through DT5 so as to dry the extraction liquid, and transport it to the RF2. During this operation, the transportation of the solution is confirmed by the photosensor PS19. The switches S115, 134, 136, 78, 93, 73, 92, and 141 are turned off. The capacity set from the set extraction solvent is quantified, and is transported to the RF1. The switches S84, 70, 131, 110, and 100 are on for the required time period to transport the inner solution of the RF1 to the separation funnel using the reducing pump while the RF1 is being stirred. During the operation, the transportation of the solution is confirmed by the photosensor PS15. The switches S115, 134, 136, 78, 93, 73, 92, and 141 are turned on so as to repeatedly turn on and off the pressure reducing pump of the switch S110 intermittently for the required time period for passing the extraction liquid a small amount at a time through either of the selected dehydration tubes DT1 through DT5 for drying the extracted liquid to transport it to the RF2. During this period, the transportation of the solution is confirmed by the photosensor PS19. The switches S115, 134,136, 78, 93, 73, 92, and 141 are tuned off. The switches S130, 131, 110, and 135 are on for the required time period so as to transport the extraction mother liquor of the SR0 to the SF with the use of the reducing pump. After the switches S130, 131, and 135 have been turned off, the switches S115, 134, and 137 are on for the required time period. The extraction mother liquor is transported to the drain tank form the SF to waste it. Switches S115, 134, 137, and 110 are turned off. How often the extraction operations have been effected is judged, and the switch S145 is turned on and off in accordance with the number of the extractions so as to set the dehydration tubes in their initial position.

The operations of the unit operation procedures of the "F1-XL-F3", "F2-XL-F1", "F2-XL-F3", "F3-XL-F1" and "F3-XL-F2" are the same as the operation of the unit operation procedure of the above described "F1-XL-F2" only with the switches and photosensors and so on being changed to the correspondences. The description thereof has accordingly been omitted.

[DE-CO ON] The preparation of the purification operation is effected with the selection of the column for chromatography and the power supply of the detector being on.

The titles of the synthesis unit operations to be effected are displayed on the CRT. The switch S31 is turned on in advance so as to turn on the power supply of the detector to stabilize it. If the set column for chromatography is in the Col. 3 for the given time, the switch S22 is on for the required time period so as to switch to the Col. 3 from the initial set Col. 2 to turn off the change-over switch S22.

[DE-CO OF] The initial setting of the column for chromatography and the power supply of the detector are turned off.

The titles of the synthesis unit operations to be effected are displayed on the CRT. Switch S31 is turned off to turn off the detector. If the set column for chromagraphy is in Col. 3, the switch S22 is on for the required time period so as to switch to the Col. 2 from the initial set Col. 3 to turn off the switch S22.

[RF2-PH] The solution of the RF2 is transported to the PH.

The titles of the synthesis unit operations to be effected are displayed on the CRT. The switches S90, 74, 129, 126, 124, and 110 are on for the required time period so as to transport the solution of the RF2 to the PH with the use of the reducing pump. The switches S90, 74, 129, 126, 124, and 110 are tuned off.

The operations of the unit operations of the "RF1-PH", "RF3-PH" of the transportation procedure of the solution to the PH from the other reaction flasks RF1, RF3 are also the same as the above described "RF2-PH" only with the switches being changed. The description thereof has accordingly been omitted.

[PH-RF2 ] The solution of the PH is transported to the RF2.

The titles of the synthesis unit operations to be effected are displayed on the CRT. The switches S125, 127, 93, 73, 92, and 110 are on for the required time period, and the solution of the PH is transported to RF2 using the reducing pump. The switches S125, 127, 93, 73, 92, and 110 are turned off.

The operations of the unit operation procedures of the "PH-RF3" and "RH-RF1" for transporting the PH solution to the other reaction flask are also the same as the above described "PH-RF2" only with the switches being respectively changed. The description thereof has accordingly been omitted.

[PH ADJ] The PH of the solution is adjusted.

The titles of the synthesis unit operations to be effected are titled on the CRT. The switches S107, 109, 144 are turned on to turn on the power supply of the PH measuring apparatus and also, the cold media is circulated through the jacket of the PH flask to effect the cooling operation. After the given time period, the computer calculates the value of the PH of the present solution from the AD output of the PH measuring apparatus. When the set PH value is lower than the measured value, the switches S122, 143, 42, 118, 114, and and and 116 are turned on to add a constant amount of acid solution of the RS7 while being stirred. After the switches S122, 143, 42, 118, 114, and 116 are turned off, the PH is measured so as to compare the value with the set value. When the set PH value is higher than the measured value, the constant amount of alkali solution of the RS8 is added during the stirring operation with switches S123, 143, 42,118, 114, 116 being turned on. After the switches S123, 143, 42, 118, 114, 116 are turned off, the PH is measured so as to compare the value with the set value.

[FRACT-RF1] The solution is transported to the RF1 from the separate tubes of the fraction collector specified by the computer.

The titles of the synthesis unit operation to be effected are displayed on the CRT. The switch S33 is turned on for the given time period, the separate tubes are set in the initial position. The switch S33 is turned off. The switch S34 is repeatedly turned on off by the number specified in the purifying step so as to move, set the separate tubes of the object till the position of the suction nozzle. The switch S32 is turned on to effect the suction so as to lower the nozzle to the bottom of the separate tube. After the given time period, the switches S29, 26, 25, 89, 67, 86, 71, 110, and 72 are turned on to start the transportation of the solution to the RF1 from the separate tube using the reducing pump. From the given time period, the transportation of the solution is confirmed with the photosensor PS10. When the transportation has been completed, the signal is outputted to the computer. The signal is received to turn off the switches S32, 29, 26, 25, 89, 67, 86, 71, 110, and 72.

The actions of the unit operations "FRACT-RF2" and "FRACT-RF3-" for transporting to the other reaction flasks RF2, RF3 from the fraction collector are also the same as the above described "FRACT-RF1" only with the operating switches and the detecting photosensors being different. The description thereof has accordingly been omitted.

[FRACT-RFM] The solution from the separate tube of the optionally specified fraction collector is transported to an optional flask.

The titles of the synthesis unit operations to be effected are displayed on the CRT. The number of the separate tubes to be transported is inputted. Then, the flask names RF1, RF2, and RF3 of the transfer destination are inputted. The switch S33 is on for the required time period so as to set the separate tubes in their initial positions. The switch S33 is turned off. The switch S34 is repeatedly turned on and off by the inputted number to move, set the separate tubes of the object till the position of the suction nozzle. If the transportation destination is RF1, the switch S32 is turned on so as to lower the suction nozzle to the bottom of the separate tube. The required time switches S29, 26, 25, 89, 67, 86, 71, 110, and 72 are turned on so as to start the transportation of the solution to the RF1 from the separate tubes using the reducing pump. The transportation of the solution by the photosensor PS10 is confirmed from after the required time period so as to output to the computer the signal when the transportation has been completed. The signals are received to turn off the switches S32, 29, 26, 25, 89, 67, 86, 71, 110, and 72. Even when the transfer destination is RF2 or RF3, the same can be said only with the switches being changed.

[RF2-SR3] The solution of the RF2 is transported to the SR3.

The titles of the synthesis unit operations to be effected are displayed on the CRT. The switches S76, 75, 17, 15, 110, 101, and 90 are turned on for the required time period so as to transport the solution of the RF2 to the SR3 with the use of the reduction pump. During the operation, the transportation of the solution is confirmed with the photosensor PS16. The switches S76, 75, 17, 15, 110, 101, and 90 are turned off.

The "RF3-SR3" and "RF1-SR3" for transporting to the SR3 the solution from the other reaction flask are also the same in operation only with the switches being changed. The description thereof has accordingly been omitted.

[RF1-SF] The solution of the RF1 is transported to the SF.

The titles of the synthesis unit operations to be effected are displayed on the CRT. The switches S84, 70, 131, and 110 are on for the required time period so as to transport the solution of the RF1 to the SF using the reducing pump. During the operation, the transportation of the solution is confirmed by the photosensor PS15. The switches S84, 70, 131, and 110 are turned off.

The operations of the "RF2-SF" and "RF3-SF" for transporting the solution of the other reaction flask to the SF are also the same only with the switches and the photosensors being changed. The description thereof has accordingly been omitted.

[SF DRAIN] The solution of the SF is transported to the drain tank to waste.

The titles of the synthesis unit operations to be effected are displayed on the CRT. The switches S134, 137, 110, and 115 are on for the required time period so as to transport the solution of the SF to the drain tank with the use of the reducing pump. The switches S134, 137, 110, 115 are turned off.

The operations of the unit operations "SR3 DRAIN" and "SR2 DRAIN" for transferring, wasting the solutions of the SR3 and SR2 to the drain tank are also the same as the described "SF DRAIN" only with the switches being changed. The description thereof has accordingly been omitted.

[SR1-SF-DR] After the solution of the SR1 has been transported to the SF, it is transported and wasted to the drain tank.

The titles of the synthesis unit operations to be effected are displayed on the CRT. The switches 130, 131, and 110 are on for the required time period so as to transport the solution of the SR1 to the SF with the use of the reducing pump. The switches S130, 131, and 110 are turned off, the switches S134, 137, 110, and 115 are on for the required time period. The solution is transported and wasted from the SF to the drain tank. The switches S134, 137, 110, and 115 are turned off.

After the solution of the SR0 in the "SR0-SF-DR" has been transported to the SF, the operation of transporting it to the drain tank to waste it is the same as the above described "SR1-SF-DR" only the switches being changed. The description thereof has accordingly been omitted.

[SF-SR0] The solution of the SF is transported to the SR0.

The titles of the synthesis unit operations to be effected are displayed on the CRT. The switches S115, 134, 138, 110, and 135 are on for the required time period so as to transport the solution of the SF to the SR0 using the reducing pump. The switches S115, 134, 110, and 135 are turned off.

[SF-SR1] The operation of transporting to the SR1 the solution of the SF is similar to the above described "SF-SR0" only the switches being changed. The description thereof has accordingly been omitted.

[SF-F1-F2] The solution of the SF is divided by half to transport to RF1 and RF2.

The titles of the synthesis unit operations to be effected are displayed on the CRT. The switches S134, 136, 67, 115, 72, 86, 110, and 89 are on for the required time period, and the solution of the SF is transported to the RF1 without passing it through a drying tube using the reducing pump. After the switches S134, 136, 67, 115, 72, 86, 110, and 89 have been continuously turned off, the switches S134, 136, 73, 141, 142, 115, 78, 92, 110, and 93 are on for the required time period so as to transport the solution of the SF to the RF2 without passing it through the drying tube. Switches S134, 136, 73, 141, 142, 115, 78, 92, 110, and 93 are turned off. The operation is repeated for the required number of time.

The operation of transporting the solution of the SF in the "SF-F1-F3" by half to RF1 and RF3, and the operation of dividing by half the solution of the SF in the "SF-F2-F3" to transport it is the same as the above described "SF-F1-F2" only with the switches being changed. The description thereof has accordingly been omitted.

[SF-RF1] The solution of the SF is transported to the RF1.

The titles of the synthesis unit operations to be effected are displayed on the CRT. The switches S115, 134, 136, 72, 89, 67, 86, and 110 are on for the required time period so as to transport the solution of the SF to the RF1 without passing it through the drying tube using the reducing pump. The switches S115, 134, 136, 72, 89, 67, 86, and 110 are turned off.

The operation of the transporting the solution of SF in the "SF-RF2" to the RF2, and the operation of transporting the solution of the SF in the "SF-RF3" to the RF3 are the same as the above described "SF-RF1" only with the switches being changed. The description thereof has accordingly been omitted.

[RF1-SR2] The flow line of the photosensor PS7 and the SR2 are washed with the solution of the RF1.

The titles of the synthesis unit operations to be effected are displayed on the CRT. The switches S84, 12, 11, and 110 are on for the required time period so as to transport the solution of the RF1 to the drain tank through the flow line of the photosensor PS7 using the reducing pump. The switches S12 and 11 are turned off. The switches S4, 14, and 13 are on for the required time period. The entire amount of the solution the remaining RF1 is transported to the SR2. After the switches S4, 14, and 13 have been turned off, the switches S12 and 12 are on for the required time so as to waste the solution remaining in the flow line of the photosensor PS7. The switches S84, 12, 11, and 110 are turned off.

The operation of washing the flow lines and the SR2 of the photosensor PS7 with the solution of the RF2 in the "RF2-SR2" and the operation of washing the flow lines and the SR2 of the photosensor PS7 with the solution of the RF3 in the "RF3-SR2" are the same as the above described RF1-SR2" only with the switches being changed. The description thereof has accordingly been omitted.

"RF1 DRY" The flask of the RF1 is dried.

The titles of the synthesis unit operations to be effected are displayed on the CRT. The switches S61, 63, 85, 89, 72, 71, 25, 28, 100, 67, 110, and 86 are on for the required time period so as to transport and dry using the reducing pump the liquid within the tube coupled to the flask of the RF1 completely into the flask. After the switches S61, 63, 85, 89, 72, 71, 25, and 28 are tuned off, the switches S87, 84, 106, 109, and 107 are on for the required time period so as to circulate the hot media into the jacket to blow in air from the outside, thereby heating for drying the RF1. The switches S87, 84, 67, 86, 110, 107, 106, 109, and 100 are turned off.

The operation of drying the flask of the RF2 in the "RF2 DRY" and the operation of drying the flask of the RF3 in the "RF3 DRY" are the same in operation as the above described "F1 DRY" only with the switches are changed. The description thereof has accordingly been omitted.

[MR WASH] The MT1, MT2, RR1-RR9 are washed using the washing liquid in the S05 and S06. The washed liquids are transported to RF1, RF2, and RF3.

The titles of the synthesis unit operations to be effected are displayed on the CRT. The switches S112, 114, 61, 86, 110, and 67 are on for the required time period so as to guide the washing liquid in the S06 to a volumetric device of the MT1 using the reducing pump, and is further transported to RF1. After the switch S112 has been turned off, the switch S111 is on for the required time period. The washing liquid in the S05, in addition to the washing operation of the S06, is caused to flow so as to effect the washing operation. The feeding operation of the washing liquid from the S05 is stopped with the switch S111 being turned off to transport to the MT1 the washing liquid remaining on the flow line for the required time period so as to feed air instead to dry the flow line. The switches S114, 61, 86, 110, and 67 are turned off. The switches S112, 114, 57, 63, 86, 110, and 67 are on for the required time period so as to guide the washing liquid in the S06 to the volumetric device of the MT2 using the reducing pump for further transporting it to the RF1. After the switch S112 has been turned off, the switch S111 is on for the required time period. Followed by washing of the S06, the washing liquid in the S05 is caused to flow to effect the washing operation. The feeding operation of the washing liquid from the S05 with the switch S111 being turned off continues so as to transport to the MT1 the washing liquid remaining in the flow line for the required time period. Then, air is fed to dry the flow line. The switches S114, 57, 63, 86, 110, and 67 are turned off. The switches S111, 113, 58, 43, 52, and and 110 are on for the required time period so as to transport to the RR1 the washing liquid of the S05. After the switch S43 has been turned off, the switch S44 is on for the required time period so as to transport the washing liquid of the S05 to the RR2. After the switch S44 has been turned off, the switch S45 is on for the required time period, the washing liquid of the S05 is transported to the RR3. The switch S111 is turned off to transport to the RR3 the washing liquid remaining on the line of the RR3 from the S05 for the required time period so as to feed the air to dry the line. The switches S111, 113, 58, 45, 52, and 110 are turned off. The switches S111, 113, 59, 46, 52, and 110 are on for the required time period so as to transport the washing liquid of the S05 to the RR4. After the switch S46 is turned off, the switch S47 is on for twenty seconds to transport the washing liquid of the S05 to the RR5. After the switch S47 has been turned off, the switch S48 is on for the required time period so as to transport the washing liquid of the S05 to the RR6. The switch S111 is turned off so as to transport to the RR6 the washing liquid remaining in the line of the RR6 from the S05 for the required time period for feeding the air to dry the line. The switches S111, 113, 58, 48, 52, and 110 are turned off. The switches S111, 113, 60, 49, 52, and 110 are on for the required time period so as to feed to the RR6 the washing liquid from the S05. The switch S49 is turned off to turn on the switch S50 for the required time period to transport the washing liquid to the RR7. The switch S50 is turned off to turn on the switch S51 for the required time period for transporting the washing liquid to the RR9. The switch S51 is turned off to transport to the RR6 the solution remaining in the line for the required time period to feed the air to dry the line. The switches S113, 111, 114, 118, 53, 51, 81, 79, 95, 110 are turned on for the required time period so as to the RF3 the washing liquid from the RR9. The switch S111 is on for the required time period to dry the line, thereafter the switch S51 is turned off to turn on the switch S50 for the required time period. After the solution of the RR8 has been transported to the RF3, the switch S111 is off for the required time period so as to dry the line. The switch S50 is turned off so as to turn on the switches S111, 49 for the required time period. After the solution of the RR7 has been transported to the RF3, the switch S111 has been off for the required time period so as to dry the line. The switches S114, 118, 53, 49, 81, 79, 95, 110 are turned off. The switches S111, 114, 118, 53, 48, 88, 73, 92, 110 are on for the required time period, the washing liquid is transported to the RF2 from the RR6. The switch S111 is off for the required time period so as to dry the lines. After the drying operation of the lines, the switch S48 is turned off, the switch S47 is on for the required time period. After the solution of the RR5 is transported to the RF2, the switch S111 is off for the required time period so as to dry the lines. The switch S47 is turned off so as to turn on the switches S111 and 46 for the required time period. After the solution of the RR4 has been transported to the RF2, the switch S111 is off for the required time period to dry the lines. The switches S114, 118, 53, 46, 88, 73, 92, and 110 are turned off. The switches S111, 114, 118, 53, 45, 85, 67, 86, and 110 are on for the required time period so as to transport the washing liquid from the RR36 to the RF1. The switch S111 is off for the required time period to dry the lines. After the switch S45 is turned off to turn on the switch S44 for the required time period. After the solution of the RR2 has been transported to the RF1, the switch S111 is off for the required time period so as to dry the lines. The switch S44 is turned off to have the switches S111 and 43 on for the required time period. The solution of the RR1 has been transported to the RF1, the switch S111 is off for the required time period to as to dry the lines. The switches 114, 118, 53, 43, 85, 67, 86, and 110 are turned off.

[START-1] The conditions of the synthesis are inputted, set.

The reaction name of the synthesis to be effected the reaction time, the reaction temperature, the concentration time, the names of the reagents and the amount, a PH adjusting value, a column name to be used for purification, the name and switching time of the purifying solvents, purifying completion time, the tube number of the fraction collector, the flow speed of the purification on HPLC, extraction solvent name, the name of the washing solvent, the number of the drying tube, name of the developing solvent to be used for HPLC analysis and so on are sequentially inputted in accordance with the plane face of CRT.

[START-2] The conditions of the synthesis is inputted, set.

The next items are added to the above described conditions Transportation is effected to the reaction flask set from the tube of the reaction collector automatically selected during the purification.

[WS-RF1] The washing solvent is passed through the volumetric tube of the MT1 and is transported to the RF1.

The titles of the synthesis unit operations to be effected are displayed on the CRT. The switches S112, 114, 61, 86, 110, and 67 are on for the required time period so as to guide the solvent of the S06 to the RF1 through the MTI. After the switch S112 has been turned off, the switch S111 is turned on for the required time period. At this time, the solvent of the S05 is guided to the same line. The switch S111 is turned off so as to stop the feeding operation of the solvent of the S05. All the solvents remaining in the line for the required time period is transported to the RF1 while the air is being fed so as to effect the drying operation. The switches S114, 61, 86, 110, and 67 are turned off.

The operation of passing the washing solvent of the "WS-RF2" through the volumetric tube of the MT1 to transport it to the RF2 and the operation of the passing the washing solvent of the "WS-RF3" through the volumetric tube of the MT1 to transport it to the RF3 are the same as the operation of the above described "WS-RF1" only with the switches being changed. The description thereof has accordingly been omitted.

[F1-STR-ON] The stirring operation of the RF1 starts.

That titles of the synthesis unit operations to be effected are displayed on the CRT. The power of the stirrer is turned on with the switch S100 being on. The stirring operation of the RE1 starts.

[F1-STR-OF] The stirring operation of the RF1 is stopped.

The titles of the synthesis unit operations to be effected are displayed on the CRT. The switch S100 is turned off to cut the power of the stirrer so as to stop the stirring of the RF1.

The operation for starting the stirring operation of the RF2 in the "F2-STR-ON" the operation for stopping the stirring of the RF2 in "F2-STR-OFF" the operation for starting the stirring of the RF3 in the "F3-STR-ON" and the operation for stopping the stirring of the RF3 in the "R3-STR-OFF" are the same as the operations of the above described "F1-STA-ON" and "F1-STR-OFF" only with the switches being changed. The description thereof has accordingly been omitted.

The power of the analytical HPLC in the "A-LC ON" is turned on to select the developing solvents of the S01, S02.

The titles of the synthesis unit operations to be effected are displayed on the CRT. The S8 is on, the power supply of the analytical HPLC is turned on so as to effect the stabilizing operation so as to provide the analysis start. If the selected solvent is S02, the switch S9 is turned on.

[A-LC OFF] The power of the analytical HPLC is turned off to effect the initial setting of the developing solvent.

The titles of the synthesis unit operations to be effected are displayed on the CRT. The switch S8 is turned off so as to turn off the power of the analytical HPLC. If the selected solvent is S02, the switch S9 is turned off.

The reaction liquid of the RF1 in the ANAL1" is partially sampled so as to effect a diluting operation using the solvent in the RS6. One portion thereof is charged on the analytical HPLC to effect a chromatographic operation for investigating the reaction conditions.

The titles of the synthesis unit operations to be effected are displayed on the CRT. The switch S100 is turned off to stop the stirring operation so as to have the switches S87, 84, 67, 86, and 110 on for the required time period. Air is guided to the RF1 using the reducing pump to effect a bubbling operation. The switches S87, 84, 67, 86, and 110 are tuned off. After the required time period, the switches S84, 12, 110, and 11 are turned on to suck the reaction liquid of the RF1 into the line of the photosensor PS7. After the photosensor PS7 has detected the reaction liquid, the signal is fed to the computer. By the confirmation of the signal, the sampling of the reaction liquid has been completed. After the switches Sll and 110 are turned off, the switches S4, 5, 118, 114, 116, 40, and 55 are turned on for the required time period so as to start feeding to the MT1 the solvent of the RS6 using the compressed air pump. The photosensor PS8 detects the liquid level to quantify the given amount of the solvent in the PS6. Then, the S118 and 40 are turned off to turn on the switches S54, 14, 13, and 110 for the required time period. The sampled solution is diluted while the solvent quantified by the MT1 is being transported to the flask of the RS2. The switches S54, 14, 13, 110, 55, 4, and 5 are turned off. The switches S67, 86, 110, and 10 are on for the required time period so as to return to the RF1 the reaction liquid remaining on the line of the photosensor PS7. After the switches S110, 86, 67, 12, 84, and 10 have been turned off, the switch S100 is turned on so as to resume the stirring operation of the RF1. The S20 is on for the required time period so as to switch the analytical sample injector RV1 to the LOAD. After the switch S20 has been turned off, the switches S11 and 110 are turned on so as to guide the diluted sample of the RS2 to the line of the photosensor PS6. After the photosensor PS6 has detected the liquid, the switches S11 and 110 are turned off to stop the transportation. The switch S20 is on for the required time period to switch the RV1 to the INJECTION. The switch S20 is turned off so as to change the CRT picture plane to the chart of the analytical HPLC. The output of the analytic detector is calculated so as to display the chromatographic chart. After the lapse of the required time, the chromatography is completed so as to print out the chromatographic chart. The CRT picture plane is restored to the former state to have the switches S11 and 110 on for the required time period to transport, waste the drain tank the diluted sample remaining in the SR2. The switches S11 and 110 are turned off.

The operation of partially sampling the reaction liquid of the RF2 in the "ANAL2" diluting with the use of the RS6 solvent, charging on the analytical HPLC one portion thereof to effect the chromatography, investigating the reaction condition, and partially sampling the reaction liquid of the RF3 in the "ANALS3" diluting it using the solvent of the RS6, charging one portion on the analytical HPLC to effect the chromatography, investigating the reaction condition are the same as the above described "ANAL1" only with the switches, photosensors and so on being changed. The description thereof has accordingly been omitted.

[F2-L-F2] The solution of the RF2 is extracted, washed so as to transport the lower extracted liquid layer to the RF2.

The titles of the synthesis unit operations to be effected are displayed on the CRT. The switches 76, 90, 131, 132, 110, and 101 are on for the required time period so as to transport the separatory funnel of the SF the inner solution of the RF2. During this operation, the transportation of the solution is confirmed by the photosensor PS16. The switches 76, 90, 131, 132, and 110 are turned off. The switch S115 is on for the required time period. After standing, the switch S134 is turned on so as to start the transportation of the SF solution to the SRI. During this period, the change in the electric conductivity on the boundary level of the solution is detected by the computer so as to have the switches S137 and 110 on for the required time period for transporting and wasting the upper layer only to the drain tank. After the switches S137, 115, and 134 has been turned off, the switches S131, 139, and 119 are on for the required time period so as to transport the solution of the SR1 to the SF. The switches S110, 131, 119, and 130 are turned off. After the extraction solvent set by the unit operation in the "RS6-RF2" has been quantified, the switches S79, 90, 131, 132, 110, and 101 are turned off. The switches S134, 131 and 110 are on for the required time period so as to start the transportation of the SF solution to the SR1. During this operation, the change in the electric conductivity on the boundary level of the solution is detected by the computer so as to have the switches S137 and 110 on for the required time period so as to transport the upper layer only to the drain tank to waste it. After the switches S137, 115 and 134 have been turned off, the switches S131, 130, and 119 are on for the required time period so as to transport the SR1 solution to the SF. The switches S110, 131, 119, and 130 are turned off. The switches S134, 136, 141, 142, 78, 93, 73, 92, 110, and 115 are on for the required time period so as to transport the solution to the RF2 from the SF.

[RF1-L-RF2] The solution of the RF1 is extracted, washed so as to transport the lower extracted liquid layer to the RF2.

The titles of the synthesis unit operations to be effected are displayed on the CRT. The switches S84, 70, 131, 110, and 100 are on for the required time period so as to transport to the separation funnel of the SF the inner solution of the RF1 using the reducing pump while the RF1 is being stirred. During this period, the transportation of the solution is confirmed by the photosensor PS15. The switches S84, 70, 131, 110, and 100 are turned off. After the inner solution of the SF has been placed for the required time period, the switches S115 and 134 are turned on so as to start the transportation of the solution of the SF to the SR1. During this operation, the change in the electric conductivity on the boundary level of the solution is detected by the computer so as to turn off the switches S115 and 134 for transporting the lower layer only to the SR1. The capacity set from the set extraction solvents is quantified so as to transport it to the RF1. The switches S84, 70, 131, 110, and 100 are on for the required time period so as to transport the inner solution of the RF1 to the separation funnel of the SF using the reducing pump while the RF1 is being stirred. During this period, the transportation of the solution is confirmed by the photosensor PS15. The switches S84, 70, 131, 110, and 100 are turned off. The switches S110, 131, and 134 are on for the required time period so as to feed the air to the SF using the reducing pump for effecting the extracting with the bubbling. The switches S110, 131, and 134 are turned off. After the inner solution of the SF has been still for the required time period, the switches 115 and 134 are turned on so as to start the transportation the solution of the SF to the SR1. During the operation, the change in the electric conductivity on the boundary level of the solution is detected by the computer so as to turn off the switches S115 and 134 for transporting the lower layer only to the SR1. The switches S115, 134, 138, 110, and 135 are on for the required time period so as to transport the extraction mother liquor to the SR0 from the SF. The switches S115, 134, 138, 110, and 135 are turned off. The switches S130, 131, and 110 are on for the required time period so as to transport the extracted liquid from the SR1 to the SF. The capacity set from the set extracted liquid washing solvent is quantified and is transported to the RF1. The switches S84, 70, 131, 110, and 100 are on for the required time period so as to transport to the separation funnel of the SF the inner liquid of the RF1 using the reducing pump, while the RF1 is being stirred. During the period, the transportation of the solution is confirmed by the photosensor PS15. The switches S84, 70, 131, 110, and 100 are turned off. The switches S110, 131, and 134 are on for the required time period so as to feed air into the SF using the reducing pump for effecting the washing operation with the bubbling. The switches S110, 131, and 134 are turned off. After the inner solution of the SF has been placed for the required time period, the switches S115 and 134 are turned on so as to start the transportation of the SF solution to the SR1. During this operation, the change in the electric conductivity on the boundary level of the solution is detected by the computer to turn off the switches S115 and 134 for transporting the lower layer only to the SR1. The switches S115, 134,137, and 110 are on for the required time period so as to waste the SF washing liquid into the drain tank. The switches S130, 131, and 110 are on for the required time period so as to transport the extraction liquid of the SR1 to the SF. The switches S115, 134, 136, 78, 93, 73, 92, and 141 are turned on so as to repeatedly turn on and off the reducing pump of the switch S110 intermittently for the required time period. The extracted liquid is passed through either of the selected dehydrating tubes DT1 through DT5 a small amount at a time to dehydrate the extracted liquid and transport it to the RF2. During this operation, the transportation of the liquid is confirmed by the photosensor PS19. The switches S115, 134, 136, 78, 93, 73, 92, and 141 are turned off. The capacity set from the set extraction solvents is quantified and is transported to the RF1. The switches S84, 70, 131, 110, and 100 are on for the required time period so as to transport the inner solution of the RF1 to the separation funnel of the SF using the reducing pump while the RF1 is being stirred. During this operation, the transportation of the solution is confirmed by the photosensor PS15. The switches S115, 134, 136, 78, 93, 73, 92, and 141 are turned on so as to repeatedly turn on and off intermittently the reducing pump of the switch SI10 for the required time period so as to pass either of the selected dehydrating tubes DT1 through DT5 a small amount at a time. The extracted liquid is dehydrated, and is transported to the RF2. During this period, the transportation of the solution is confirmed by the photosensor PS19. The switches S115, 134, 136, 78, 93, 73, 92, and 141 are turned off. The switches S130, 131, 110, and 135 are on for the required time period so as to transport the extraction mother liquor of the SR0 to the SF using the reducing pump. The switches S130, 131, and 135 are turned off and thereafter, the switches S115, 134, and 137 are on for the required time period so as to transport the extraction mother liquor to the drain tank from the SF to waste. The switches S115, 134, 137, and 110 are turned off.

[ESF-SR0] Exclusive extraction unit operation. The solution is transported from the SF to the SR0.

The switches S115, 134, 138, 110, and 135 are on for the required time period so as to transport the solution using the reducing pump from the SF to the SR0.

[ESF-SR1] Exclusive extraction unit operation. The solution is transported from the SF to the SR1.

The switches S115, 134, 138, and 110 are on for the required time period so as to transport the solution using the reducing pump from the SF to the SR1. The switches S115, 134, 138, and 110 are turned off.

[ESEP-SR0] Exclusive extraction unit operation. Only the lower layer of the solution separated into two layers from the SF is transported to the SR0.

After the solution has stood for the required time period, the switches S115, 134, and 135 are turned on so as to start the transportation of the SF solution to the SR0. During the operation, change in the electric conductivity on the boundary level of the solution is detected by the computer to turn off the switches S115, 134, and 135 for transporting the lower layer only to the SR0.

[ESEP-SR1] Exclusive extraction unit operation. Only the lower layer of the solution separated from the SF into two layers are transported to the SR1.

After the solution has stood for the required time period, the switches S11 and 134 are turned on to start the transportation of the SF solution to the SR1. During the operation, the change in the electric conductivity on the boundary level of the solution is detected by the computer to turn off the switches S115 and 134 so as to transport the lower layer only to the SR1.

[ESF-DT-F1] Exclusive extraction unit operation. The solution is transported to the RF1 through the dehydration tube DT from the SF, thereby being dehydrating.

Switches S115, 134, 136, 72, 89, 67, and 86 are on so as to repeatedly turn on and off the reducing pump by operating the switch S110 intermittently for the required time period for dehydrating the extracted liquid through the passing of the SF extracted liquid a small amount at a time through either of the selected dehydrating tubes DT1 through DT5 for transporting it to the RF1. During this operation, the transportation of the solution is confirmed by the photosensor PS19. The switches S115, 134, 136, 72, 89, 67, and 86 are turned off.

The operation of transporting the solution to the RF2 through the dehydrating tube DT from the SF in the "ESF-DT-F2" while the solution is being dehydrated, the operation for transporting the solution while dehydrating the solution through the dehydrating tube DT from the SF in the "ESF-DT-F3" are the same as the above described "EST-DT-RF1" only with the switches and photosensors being changed. The description thereof has accordingly been accordingly been omitted.

[ESF-F1] Exclusive extraction unit operation. The solution of the SF is transported to the RF1 without passing through the dehydrating tubes DT.

The switches S115, 134, 136, 72, 89, 67, 86, and 110 are turned on so as to transport the solution of the SF to the RF1 using the reducing pump. During this operation, the transportation of the solution is confirmed by the photosensor PS19. The switches S115, 134, 136, 72, 89, 67, 86, and 110 are turned off.

The operation for transporting the solution of the SF in the "ESF-F2" to the RF2 without passing through the dehydrating tubes DT, and the operation for transporting to the RF3 the solution of the SF in the "ESF-F3" without passing through the dehydrating tubes DT are the same as in the above described "EST-F1" only with the switches and the photosensors changed. The description thereof has accordingly been omitted.

[EF1-SF] Exclusive extraction unit operation. The solution of the RF1 is transported to the SF.

The switches S84, 70, 131, 110, and 100 are on for the required time period so as to transport to the SF the solution of the RF1 using the reducing pump. During this operation, the transportation of the solution is confirmed by the photosensor PS15. The switches S84, 70, 131, 110, and 100 are turned off.

The operation for transporting the solution of the RF2 in the "EF2-SF" to the SF and the operation for transporting to the SF the solution of the RF3 in the "EF3-SF" are the same as in the above described "EF1-SF" only with the switches and the photosensors being changed. The description thereof has accordingly been omitted.

[EXSLCT] Exclusive extraction unit operation. The extraction solvents are selected and quantified and are guided to the reaction flask.

The set extraction solvents (RS1, RS2, RS3, RS4, RS5, RS6) are selected to quantify the set amount for transporting the extraction solvent to the set reaction flasks (RF1, RF2, RF3).

[EWSSLCT] Exclusive extraction unit operation. The extraction solvents are selected and quantified and are guided to the reaction flask.

The set extraction solvents (RS1, RS2, RS3, RS4, RS5, RS6) are selected to quantify the set amount for transporting the washing solvent to the set reaction flasks (RF1, RF2, RF3).

[ESF-BUBB] Exclusive extraction unit operation. Air is blown into the SF so as to bubble the solution.

The switches S110, 131, and 134 are on for the required time period so as to blow the air into the SF using the reducing pump. The solution is stirred, extracted by the bubbling operation. The switches S110, 131, and 134 are turned off.

[ESR1-SF] Exclusive extraction unit operation. The solution of the SR1 is transported to the SF.

The switches S130, 131, and 110 are on for the required time period so as to transport the solution of the SR1 to the SF using the reducing pump. The switches S130, 131, and 110 are turned off.

[ESR0-SF] Exclusive extraction unit operation. The solution of the SR0 is transported to the SF.

The switches S130, 131, 110, and 135 are on for the required time period so as to transport the solution of the SR0 to the SF using the reducing pump. The switches S130, 131, 110, and 135 are tuned off.

[ESF DR] Exclusive extraction unit operation. The solution of the SF is transported to the drain tank and is wasted. The switches S115, 134, 137, and 110 are on for the required time period so as to transport to the drain tank the solution of the SF using the reducing pump to waste. The switches S115, 134, 137, and 110 are turned off.

[ESR1 DR] Exclusive extraction unit operation. The solution of the SR1 is transported to the SF and thereafter, is transported to the drain tank to waste.

The switches S130, 131, and 110 are on for the required time period to transport the solution of the SR1 to the SF. After the switches S130, 131, and 110 have been turned off, the switches S115, 134, 137, and 110 are on for the required time period so as to transport the solution of the SF to the drain tank, and is wasted. The switches S115, 134, 137, and 110 are turned off.

[ESR0 DR] Exclusive extraction unit operation. The solution of the SR0 is transported to the SF and thereafter, is further transported to the drain tank to waste.

The switches S130, 131, 110, and 135 are on for the required time period so as to transport the solution of the SR0 to the SF. After the switches S130, 131, 110, and 135 have been turned off, the switches S115, 134, 137, and 110 are on for the required time period so as to transport the solution of the SF to the drain tank and is wasted. The switches S115, 134, 137, and 110 are turned off.

[EXT-START] Exclusive extraction unit operation. The titles of the extraction operations are displayed on the CRT, and the number of the extraction operations are counted.

[EDT SLCT] Exclusive extraction unit operation. Dehydrating tubes are set.

An switching operation is effected to the lines of the specified dehydrating tubes, or the number of the dehydrating operations effected is calculated so as to repeatedly turn on and off the switch S145 by that number. The next new dehydrating tube used is selected so as to effect the switching operation to the line.

[EDT RST] Exclusive extraction unit operation. The lines of the dehydrating tubes are returned to their initial positions The lines of the dehydrating tubes to be used at the present time are calculated so as to turn on and off the switch S145 by the number thereof for switching the lines of the dehydrating tubes to the initial positions.

The unit operation procedure is composed of the above enumerated contents. As described hereinabove, the synthesis procedure program is made through inputting of the "unit operation names" of these unit procedure procedures in accordance with the operation sequence. In a case where the synthesis processing apparatus (I) is operated with an automated synthesis controlling program shown in FIG. 16 with the insertion of the above described interruption program being allowed when the synthesis of the particular target compound is effected in accordance with the synthesis procedure program, the operation of the synthesis processing apparatus can be instructed by manual key operations in the optional locations of the operation contents of the above described respective unit operation procedures.

In a case where the moving start of the solution cannot be confirmed by the photosensor within the required time period when reagent is transported to the reaction flask from the liquid storing container of the sample supply unit in, for example, the "RR1-RF1" the instructions can not be displayed on the CRT with the key operations. In the "RF1-RC-1", cold media is circulated into the jacket. While the inner solution of the reaction flask is stirred by stirring of the stirrer, the switch is turned off by the key operation so that the stirring reaction can be completed.

The synthesis processing operation in the above described first embodiment will be described hereinafter.

In the first embodiment, in accordance with the synthesis procedure program shown in the above described Table 1, the synthesis processing apparatus (I) is controlled by the order of the unit operation procedure (subroutine) shown in Table 2 so as to synthesize N-(carbobenzyloxy)-D-phenylalanine shown in a chemical formula 1 as described hereinabove. The operation of the synthesis processing apparatus couples the above described operation contents of the unit operation procedure shown in the Table 2 in the numerical order, and is described hereinafter roughly.

In a first step, the reaction conditions are sequentially inputted in accordance with the picture plane of the CRT in accordance with the unit operation procedure of the "START-1". Namely, reaction time, reaction temperatures, concentration time, names and amounts of the reagents, PH adjustment values, names of columns to be used for purification and so on are inputted.

At a second step, 1.8 g (12 mM)/N-NaOH 12 ml (12 mM) is inputted manually into the first reaction flask RF1.

At a third step, No. 2 through No. 6 of the unit operation procedures are sequentially effected. Namely, an external stirrer 31 of the first reaction flask RF1 of the "F1-STR-ON" is operated so as to start the stirring of the first reaction flask. Then, the cold media are circulated into the jacket 30 of the first reaction flask RF1 with the "COOL-1-ON" so as to start the cooling operation. The above described solution within the first reaction flask RF1 is cooled, stirred at 0° C. by the stirring and cooling operations. CBZ-C1 2.1 g(12 mM) THF 20 ml and N-NaOH 12 ml are dripped to the above described first reaction flask RF1 for fifteen minutes from the liquid storing containers RR1 and RR5 in accordance with the operation procedure of the "RR1-RF1". After the dropping operation, the cooling of the first reaction flask RF1 is stopped by the "COOL-1-OF" and the stirring of the RF1 is stopped with the "F1-STR-OF".

At a fourth step, the unit operation procedure of the "RF1-RC-1" of No. 7 is effected so as to effect the first cooling reacting operation at the first reaction flask RF1 and the cooling stirring operation at 0° C. is continued for thirty minutes. Concretely, the cold media are circulated to the jacket of the first reaction flask RF1 and the solution within the first reaction flask is stirred by the rotation of the external stirrer so as to continue it for thirty minutes.

At a fifth step, the unit operation procedure of the "FR1-CONC1" of No. 8 is effected so as to effect the first concentration operation of the solution in the RF1 so that the solvent THF is run out at 40° C. Concretely, the hot media is stirred by the rotation of the external stirrer into the jacket of the first reaction flask RF1 while the hot media is being circulated. In this condition, air is brought from the output using the reducing pump and the contents are concentrated with the first reaction flask interiors being bubbling.

At a sixth step, the unit operation procedures of the No. 9 through No. 13 are effected, the stirring operation of the RF1 is started in the "F1-STR-ON", reagent 10 ml of the liquid storing container RS2 is transported to the RF1 in the "RS2-RF1". Thereafter, the stirring operation of the RF1 is stopped in the "F1-STR-OF", the RF1 is being bubbled in the "RF1-BUBB", the solution of the RF1 in the "RF1-L-RF2" is extracted, washed, the lower extracted liquid layer is transported, and the washing operation is effected twice with AcOEt 30 ml.

At a seventh step, the unit operation procedures of the No. 14 through No. 17 are effected, the reagent AcOEt (10 ml) in the liquid storing container RS2 is transported to the reaction flask RF2 three times in the "RS2-RF2" and the AcOEt of the 30 ml is added to the solution of the second reaction flask RF2. Then, the solution of the second reaction flask RF2 is transported to the PH adjusting flask in the "RF2-PH", is adjusted into the PH2 with N-HCl in the "PH ADJ" in the PH adjusting flask, the PH-adjusted solution in "PH-RF2" is transported to the second reaction flask RF2 again.

At an eighth step, the unit operating procedures of the No. 18 through No. 21 are effected, the extraction solution (AcOEt) of the liquid storing container RS2 is transported with the "RS2-RF3" to the third reaction flask RF3. The extracted liquid of the third reaction flask transported is transported to the PH adjusting flask with "RF3-PH". Furthermore, the extracted liquid of the PH adjusting flask is transported to the second reaction flask RF2 with the "PH-RF2". The extracted liquid within the second reaction flask is extracted and dehydrated with the "RF2-X-RF3" so as to transport the upper liquid to the RF3.

Concretely, the reaction mixture of the second reaction flask RF2 is transferred to the separation funnel SF using the reducing pump. After standing in the separation funnel SF for the required time period, only the lower layer is transported to the storing container SR1 so as to transport the upper layer to the storing container SR0. The extraction mother liquor of the storing container SR1 is transported to the separation funnel SF. The capacity set from the set extraction solvent is quantified, and is transported to the second reaction flask RF2, and is transported to the separation funnel using the reducing pump, while being stirred within the second reaction flask. The air is fed to the SF using the reducing pump so as to effect an extracting operation with the bubbling. After letting the inner solution stand in the SF for the required time period, the lower layer only is transported to the SR1. The extracted liquid is passed a small amount at a time through either of the selected dehydrating tubes DT1 through DT5 so as to dehydrate the extracted liquid for transporting it to the third reaction flask RF3.

At a ninth step, the AcOEt is manually removed out so as to obtain 2.61 g(76.3%) white crystals of the chemical formula (2). Concretely, the extracted liquid is taken out from the RF2, is concentrated so as to obtain white crystals as residues.

At a tenth step, the unit operation procedures of the No. 22 through No. 45 are effected so as to wash the apparatus.

Concretely, in the "ALARM", an alarm goes off to effect the input wait. The step advances to the next step by the key operations so as to have the washing picture plane in the next "WASH" for washing the MT1, MT2, MT3 in the "MR WASH" Then, in the "SR1-SF-DR" the solution of the storing container SR1 is transported to the separation funnel SF and is wasted In the "RF1-SF" the solution of the first reaction flask RF1 is transported to the separation funnel SF, the solution transported to the separation funnel are transported to the storing container SR1 in the "SF-SR1" the solution transferred to the SR1 in the "SR1-SF-DR" is transported to the SF, is wasted. Similarly, the solution of the second reaction flask is also processed. In the "RF2-SF", the solution of the second reaction flask RF2 is transported to the separation funnel SF In the "SF-F2-F3" the solution transported to the separation funnel SF is transported by half to the second reaction flask RF2 and the third reaction flask RF3. In the "RF2-SF", the solution transported to the second reaction flask RF2 is transported to the separation funnel SF. In the "SF DRAIN" the solution transported to the separation SF is wasted Similarly in the "RF3-SF" the solution transported to the third reaction flask RF3 is transported to the separation funnel SF. In the "SF DRAIN", the solution transported to the separation liquid funnel SF is wasted. Then, in the "F1-STR-ON", the stirring of the first reaction flask RF1 starts and in the "RF1 DRY" the drying of the first reaction flask RF1 is effected. Thereafter, in the "F1-STR-OF", the stirring of the first reaction flask RF1 is stopped Similarly, in the "F2-STR-ON" the stirring of the second reaction flask RF2 starts. In the "RF2 DRY", the RF2 is dried. In the "F2-STR-OF", the stirring of the RF2 is stopped. Similarly, even in the third reaction flask, the stirring of the RF3 starts in the "RF3-STR-ON". In the "RF3 DRY" the RF3 is dried, in the "F3-STR-OF" the drying of the RF3 is stopped. In the "FINISH", the picture plane becomes an ended one.

In the second embodiment, as shown in Table 5, the synthesis procedure data name (program name) synthesizes N-carbobenzyloxy-D-phenylalanyl-L-alanine as shown in the chemical formula 2 in the "AA-CON4". The synthesis procedures are sequentially effected, in accordance with the unit operation procedure (subroutine) shown in Table 6, in a procedures shown in Table 3. The detailed operation description has been omitted, because the operation contents of the unit operation procedures shown in Table 6 are described hereinabove.

(Chemical Formula 2)

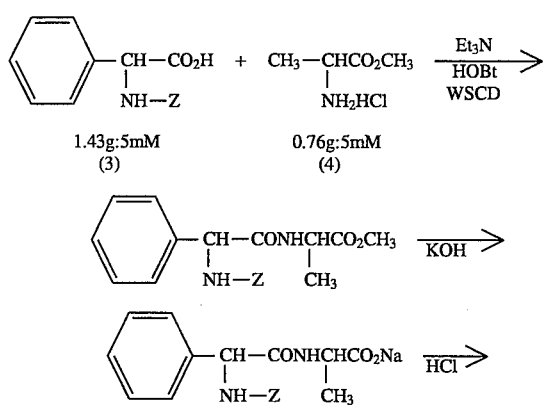

-continued
(Chemical Formula 2)

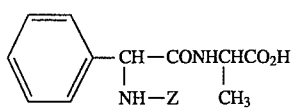

1.31g:74.3%
(5)

(TABLE 5)

Program Name AA-Con4

| No. | Operations | Subroutine No. |
|---|---|---|
| 1 | Input reaction conditions | 1 |
| 2 | (3), 1.43 g (5 mm) is dissolved in $CHCl_3$ (20 ml), is put into RF1. (4) 0.76 g (5 mm) is added to it. | manual |
| 3 | $Et_3N$ [0.5 g (5 mm)/$CHCl_3$, 10 ml] is added while stirring under a cooling operation. | 2,3,4 |
| 4 | HOBt [0.8 g (6 mM)/DMF 10 ml] is added. | 5 |
| 5 | Stirring operation under cooling for five minutes | 6 |
| 6 | Water-Soluble Carboiimide (WSCD) [1.7 g (5.5 mM)/$CHCl_3$, 10 ml] is added. | 7 |
| 7 | Stirring under cooling for thirty minutes | 8,9,10 |
| 8 | Stirring at room temperature for ninety minutes | 11 |
| 9 | Under cooling, 0.5N-HCl (30 ml) is added and stirred. | 12,13,14,15 |
| 10 | A $CHCl_3$ layer is separately obtained, washed, thereafter is dried. | 16,17,18 |
| 11 | M-$NaHCO_3$ (20 ml) is added, stirred. | 19,20,21,22 |
| 12 | $CHCl_3$ is separately obtained, washed, thereafter is dried. | 23 |
| 13 | DMF (10 ml) is added, $CHCl_3$ is removed at 40° C. | 24,25 |
| 14 | N-KOH (7.5 ml) is added with stirring under cooling. | 26–32 |
| 15 | Stirring at room temperature for ninety minutes | 33,34,35,36 |
| 16 | Water (20 ml) and AcOEt (30 ml) are added, stirred. | 37,38,39 |
| 17 | The water layer is separately obtained, is washed again with AcOEt. | 40,41 |
| 18 | $CHCl_3$ (40 ml) is added, while being stirred under cooling, thereafter N-HCl (8 ml) is added to acidity. | 42–50 |
| 19 | RF1 and the separation funnel are washed for the next operation. | 51–55 |
| 20 | The $CHCl_3$ layer separately obtained runs washed with water. | 56,57 |
| 21 | Synthesizing is completed. When $CHCl_3$ solution is taken out from the reaction flask (RF1), is concentrated to obtain white crystals 1.31 g (74.3%) of (5). | manual |
| 22 | Washing of all synthesis lines | 58–86 |

(TABLE 6)

Order of Subroutines

| 1 START-1 | 2 FL-STR-ON | 3 COOL-1-ON |
|---|---|---|
| 4 RR1-RF2 | 5 RR2-RF1 | 6 MATU |
| 7 HR3-RF1 | 8 F1-STR-OF | 9 COOL-1-OF |
| 10 RF1-RC-1 | 11 RF1-RH-2 | 12 F1-STR-ON |
| 13 COOL-1-ON | 14 RS4-RF1 | 15 MATU |
| 16 F1-STR-OF | 17 COOL-1-OF | 18 F1-XL-F3 |
| 19 F3-STR-ON | 20 RS1-RF3 | 21 F3-STR-OF |
| 22 RF3-BUBB | 23 F3-XL-F2 | 24 RS5-HF2 |
| 25 RF2-CONC1 | 26 DELETE | 27 DELETE |
| 28 DELETE | 29 DELETE | 30 F2-STR-ON |
| 31 COOL-2-ON | 3z RR4-RF2 | 33 COOL-2-OF |

(TABLE 6)-continued

Order of Subroutines

| 34 F2-STR-OF | 35 RF2-BUBB | 36 RF2-RH-8 |
|---|---|---|
| 37 F2-STR-ON | 38 RS2-RF2 | 39 RS8-RF2 |
| 40 F2-STR-OF | 41 F2-L-F2 | 42 COOL-2-ON |
| 43 F2-STR-ON | 44 HS3-HF2 | 45 RS9-RF2 |
| 46 RR6-RF2 | 47 COOL-2-OF | 40 DELETE |
| 49 RF2-BUBB | 50 RF2-BUBB | 51 WS-RF1 |
| 52 HF1-BUBB | 53 RF1-SF | 54 SF-SR1 |
| 56 SR1-SF-DR | 5G F2-STR-OF | 57 F2-XL-F1 |
| 58 ALARM | 59 WASH | 60 PS WASH |
| 61 RF1-BUBB | 62 RF2-BUBB | 63 RF3-BUBB |
| 64 RFL-SF | 65 SF-SR1 | 66 SR1-SF-DR |
| 67 RF2-SF | 68 SF-F1-F2 | 69 RF1-SF |
| 70 RF2-SF | 71 SF-F3-F2 | 72 RF2-SF |
| 73 SF DRAIN | 74 RF3-SF | 75 SF DRAIN |
| 76 F1-STR-ON | 77 RF1 DRY | 78 F1-STR-OF |
| 79 F2-STR-ON | 80 RF2 DRY | 81 F2-STR-OF |
| 82 F3-STR-ON | 83 RF3 DRY | 84 F3-STR-OF |
| 85 FINISH | 86 END | |

In a third embodiment, as shown in Table 7, the program name synthesizes 7-(m-methoxyl benzyl)-9-phenylpyrimid (6, 1-b) (1,3)thiazine-6,8(7H)dion-1-oxide as shown in the chemical formula 3 with the "NAKA-1". The synthesis procedures are sequentially effected, in accordance with the subroutine shown in Table 8, in the order shown in Table 7.

(Chemical Formula 3)

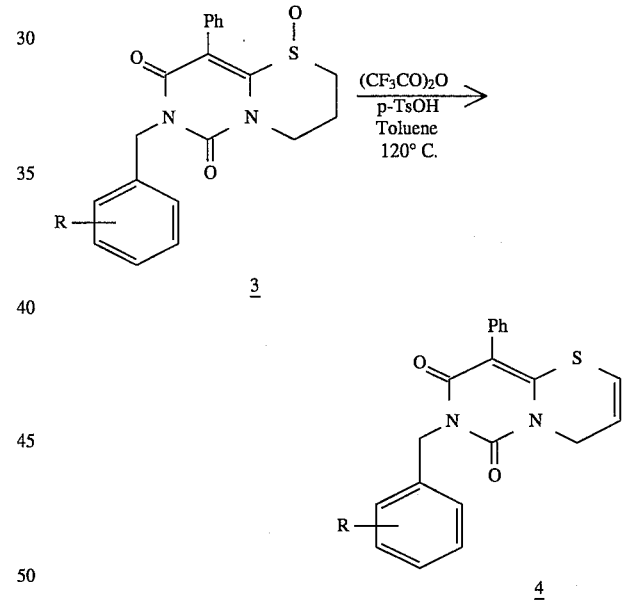

(TABLE 7)

Program Name NAKA-1

| No. | Operations | Subroutines |
|---|---|---|
| 1 | Input reaction conditions | 1 |
| 2 | 3 (1 mmol) is put into a reaction flask. | manual |
| 3 | Toluene (20 ml) is added, stirred. | 2,3 |
| 4 | The toluene solution (5 ml) of trifluoroacetic anhydride (2.1 g, 10 mmol) is added. | 4,5 |
| 5 | p-toluene sulfonic acid (40 mg) is added. | manual |
| 6 | Refluxing at 130° C. overnight. | 6–8 |
| 7 | Toluene is removed out under reduced pressure. | 9 |
| 8 | The resulting residue is effected to cool | 10,11 |

51

(TABLE 7)-continued
Program Name NAKA-1

| No. | Operations | Sub-routines |
|---|---|---|
| | with stirring. | |
| 9 | Separation using a separatory funnel is effected after addition of chloroform (30 ml) and water (20 ml). After drying ($Na_2SO_4$) of organic layers, solvent is removed out under reduced pressure. | 12–17 |
| 10 | The crude product is dissolved in chloroform (10 ml) so as to effect a purification operation with silica gel column chromatography (AcOEt-n-Hexane 1:4). | 18–25 |
| 11 | Washing of the apparatus | 26–43 |

(TABLE 8)
Order of Subroutines

| | | |
|---|---|---|
| 1 START-1 | 2 RR8-RF3 | 3 F3-STR-ON |
| 4 RR9-RF3 | 5 F3-STR-OF | 6 A-LC ON |
| 7 RF3-REA-1 | 8 A-LC OF | 9 RF3-CONC1 |
| 10 F3-STR-ON | 11 MATU | 12 RS3-RF3 |
| 13 RS2-RF3 | 14 F3-STR-OF | 15 RF3-BUBB |
| 16 F3-XL-F2 | 17 RF2-CONC2 | 18 F2-STR-ON |
| 19 RS4-RF2 | 20 F2-STR-OF | 21 RF2-BUBB |
| 22 DE-CO ON | 23 RF2-SR3 | 24 HPLC |
| 25 DE-CO OF | 26 WASH | 27 PS WASH |
| 28 RF1-BUBB | 29 RF2-BUBB | 30 RF3-SUUB |
| 31 RF3-SF | 32 SF-F3-F2 | 33 RF3-SR2 |
| 34 SR2 DRAIN | 35 RF2-SR3 | 36 SR3 DRAIN |
| 37 RF1-SF | 38 SF DRAIN | 9g RF1 DRY |
| 40 RF2 DRY | 41 RF3 DRY | 42 FINISH |
| 43 END | | |

In a fourth embodiment, as shown in Table 9, the program name synthesizes 7-(m-methoxylbenzyl)-9-phenyl-2H-pyrimid (6, 1-b) (1,3)-thizine-6, 8(7H)-dione as shown in the chemical formula 4 with the "NAKA-3". The synthesis procedures are suquentially effected, in accordance with the subroutines of Table 10, in the order shown in Table 7.

(Chemical Formula 4)

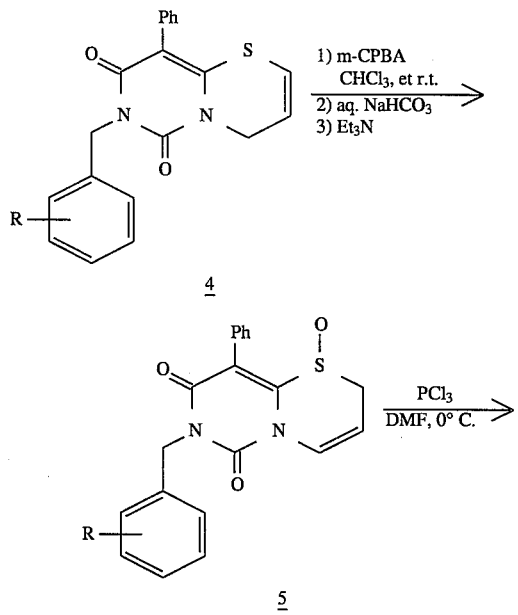

52

-continued
(Chemical Formula 4)

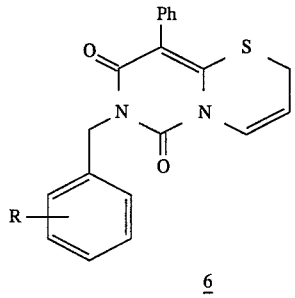

(TABLE 9)
Program Name NAKA-3

| No. | Operations | Sub-routines |
|---|---|---|
| 1) | Input reaction conditions | 1 |
| 2) | 4 (1 mmol) is put into a reaction flask. | manual |
| 3) | Chloroform (20 ml) is added, with stirring under cooling. | 2–4 |
| 4) | Chloroform solution (5 ml) of m-CPBA (196 mg, 1.1 mmol) is added. | 5–7 |
| 5) | Stirring at room temperature for 2 hours | 8–10 |
| 6) | Washing operation is effected with aq. $NaHCO_3$ (30 ml). The organic layers are dried ($Na_2SO_4$). | 11–16 |
| 7) | Chloroform solution (5 ml) of $Et_3N$ (0.05 ml) is added with stirring at room temperature. | 17–22 |
| 8) | Solvents are removed out under reduce pressure. | 23 |
| 9) | Residues are dissolved in DMF (5 ml). | 24,25 |
| 10) | Washing of other reaction containers | 26–30 |
| 11) | DMF solution (5 ml) of $PCl_3$ (412 mg, 3 mmol) is added with stirred for thirty minutes to the reaction solution of the 9). | 31–37 |
| 12) | Aqueous $NaHCO_3$ (30 ml) is added, an extraction operation is effected with AcOEt (30 ml). After organic layers are dried ($Na_2SO_4$) solvents are removed out under reduced pressured. | 38–44 |
| 13) | Crude products dissolved in chloroform (20 ml) are purified with silica gel column chromatography (AcOEt-n-Hexane 1:4 through 1:2). | 45–52 |
| 14) | Washing of the apparatus | 53–84 |

(TABLE 10)
Order of Subroutines

| | | |
|---|---|---|
| 1 START-1 | 2 COOL-2-ON | 3 F2-STK-ON |
| 4 RS4-RF2 | 5 RR6-RF2 | 6 F2-STR-OF |
| 7 COOL-2-OF | 8 A-LC ON | 9 RF2-RH-1 |
| 10 A-LC OF | 11 F2-STR-ON | 12 DELETE |
| 13 RS2-RF2 | 14 F2-STR-OF | 15 RF2-BUBB |
| 16 F2-XL-F1 | 17 F1-STR-ON | 18 RR2-RF1 |
| 19 A-LC ON | 20 ALARM | 21 A-LC OF |
| 22 F1-STR-OF | 23 RF1-CONC1 | 24 F1-STR-ON |
| 25 RR1-RF1 | 26 WS-RF2 | 27 RF2-BUBB |
| 28 RF2-SF | 29 SF DRAIN | 30 RF2 DRY |
| 31 COOL-1-ON | 32 RR5-RF1 | 33 COOL-1-017 |
| 34 F1-STR-OF | 35 A-LC ON | 36 RF1-KC-2 |
| 37 A-LC OF | 38 F1-STR-ON | 39 RS2-RF1 |
| 40 HSG-RF1 | 41 F1-STR-OF | 42 RF1-BUBB |
| 43 RF1-X-RF2 | 44 RF2-CONC2 | 45 F2-STR-ON |
| 46 RS4-RF2 | 47 F2-STR-OF | 48 RF2-BUBB |
| 49 DE-CO ON | 50 RF2-SR0 | 51 HPLC |
| 52 DE-CO OF | 53 WASH | 54 PS WASH |
| 55 RF1-BUBB | 56 RF2-BUBB | 57 RF3-BUBB |
| 56 RF1-SR2 | 59 SR2 DRAIN | 60 RF2-SR0 |

53

(TABLE 10)-continued

| Order of Subroutines | | |
|---|---|---|
| 61 SR3 DRAIN | 62 RF3-SF | 63 SF-F1-F2 |
| 64 RF1-SF | 65 RF2-SF | 66 SF-SR1 |
| 67 SR1-SF-DR | 68 WS-RF2 | 69 WS-RF3 |
| 70 RF2-SR2 | 71 SR2 DRAIN | 72 RF3-SR2 |
| 73 SR2 DRAIN | 74 F1-STH-ON | 75 RF1 DRY |
| 76 F1-STR-OF | 77 F2-STR-ON | 78 SF2 DRY |
| 79 F2-STR-OF | 80 F3-STR-ON | 81 SF3 DRY |
| 82 F3-STR-OF | 83 FINISH | 84 END |

In a fifth embodiment, as shown in Table 11, the program names synthesizes 6-[3-(N-(methylsulfamoyl) propylthio]-imidazo (1, 2-b)pyridazine as shown in the chemical formula 5 with the "AA-SERIES". The synthesis procedures are sequentially effected, in accordance with the subroutines of Table 12, in the order shown in Table 11.

(Chemical Formula 5)

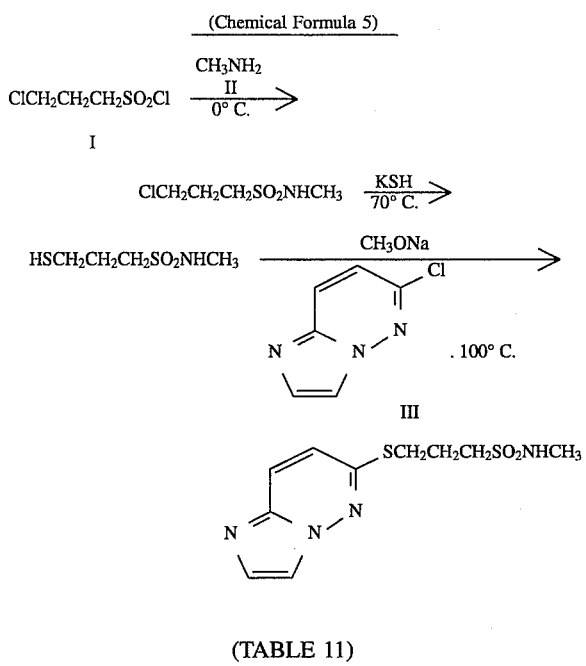

(TABLE 11)

Program Name AA-SERIES

| No. | Operations | Sub-routines |
|---|---|---|
| 1 | Input reaction conditions | |
| 2 | The solution of I [2.655 g (15 mmol)/ether 15 ml] is putted into the vessel under stirring. | 2,3 |
| 3 | II [0.930 g (30 mmol)/ether 15 ml] is added dropwise under cooling at 0° C. | 4,5,6,7,8 |
| 4 | Thirty minutes Stirring is effected at 0° C. for 30 minutes. | 9 |
| 5 | Water (30 ml) is added with stirring. | 10,11,12 |
| 6 | Organic layers are separated and water layers are extracted with ethyl acetate (30 ml). The combined organic layers are washed with water (30 ml). An drying operation is effected with anhydrous sodium sulfate. | 13 |
| 7 | Organic layers are concentrated. | 14 |
| 8 | Methanol (10 ml) and potassium thiosulfate [1.08 g (15 mmol)/ethanol 20 ml] are added, and heated with stirring for one hour at 70° C. | 15,16,17, 18,19 |
| 9 | Sodium methylate [20 ml (0.81 g 15 mmol)] and III [2.3 g (15 mmol)/methanol 20 ml] are added with stirring at 100° C. for ninety minutes. | 20,21,22, 23,24,25 |
| 10 | Concentration is effected. | 26,27 |

54

(TABLE 11)-continued

Program Name AA-SERIES

| No. | Operations | Sub-routines |
|---|---|---|
| 11 | Water (30 ml) and ethyl acetate (30 ml) are added, with stirring. | 28,29,30 |
| 12 | Organic layers are separated and water layers are extracted with ethyl acetate 30 ml. The combined organic layers are washed with water (30 ml). An drying operation is effected with anhydrous sodium sulfate. | 31 |
| 13 | Concentration is effected. | 32 |
| 14 | Chloroform (20 ml) is added to dissolve the residues. | 33,34 |
| 15 | Chromatographic purification (silica gel SI-60, column 20 × 500 mm) is effected. After twenty minutes, a developing solvent is changed from chloroform to chloroform:methanol (45:1). | 35,36,37 38,39 |
| 16 | Purified elute is concentrated, followed by recrystalization with methanol and ether to give the desired compound (613 mg, 15%). | manual |
| 17 | Washing of the apparatus | 40–65 |
| 18 | Completion | 66 |

(TABLE 12)

| Order of Subroutines | | |
|---|---|---|
| 1 START-1 | 2 F1-STR-ON | 3 RR1-RF1 |
| 4 COOL-1-ON | 5 RR2-RF1 | 6 COOL-1-OF |
| 7 A-LC ON | 8 F1-STR-OF | 9 RF1-RC-1 |
| 10 A-LC OF | 11 RS1-RF1 | 12 RF1-BUBB |
| 13 RF1-X-RF3 | 14 RF3-CONC1 | 15 F3-STR-ON |
| 16 RS2-RF3 | 17 RR7-RF3 | 18 F3-STR-OF |
| 19 RF3-REA-2 | 20 F3-STR-ON | 21 RR8-RF3 |
| 22 RR9-RF3 | 23 A-LC ON | 24 F3-STR-OF |
| 25 RF3-REA-3 | 26 A-LC OF | 27 RF3-CONC2 |
| 28 RS1-RF3 | 29 RS3-RF3 | 30 RF3-BUBB |
| 31 RF3-X-RF2 | 32 RF2-CONC3 | 33 F2-STR-ON |
| 34 RS4-RF2 | 35 RF2-SR3 | 36 F2-STR-OF |
| 37 DE-CO ON | 38 HPLC | 39 DE-CO OF |
| 40 WASH | 41 MR WASH | 42 F1-STR-ON |
| 43 F2-STR-ON | 44 F3-STR-ON | 45 RF1-BUBB |
| 46 RF2-BUBB | 47 RF3-BUBB | 48 RF1-SF |
| 49 SF-F3-F2 | 50 RF3-SF | 51 SF-SR0 |
| 52 SR0-SF-DR | 53 RF2-SF | 54 SF-SR1 |
| 55 SR1-SF-DR | 56 WS-RF2 | 57 RF2-SR3 |
| 58 SR3 DRAIN | 59 RF1 DRY | 60 RF2 DRY |
| 61 RF3 DRY | 62 F1-STR-OF | 63 F2-STR-OF |
| 64 F2-STR-OF | 65 FINISH | 66 END |

In a sixth embodiment, as shown in Table 13, the program names synthesizes allyloxycalbonylization of 3-(1-hydroxyethyl)- 4-acetoxyazetidine-2-one, as shown in the chemical formula 6 with the "VACOS:NG1". The synthesis procedures are sequentially effected, in accordance with the subroutines of Table 14, in the order shown in Table 13.

(Chemical formula 6)

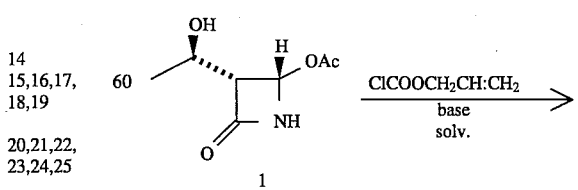

-continued
(Chemical formula 6)

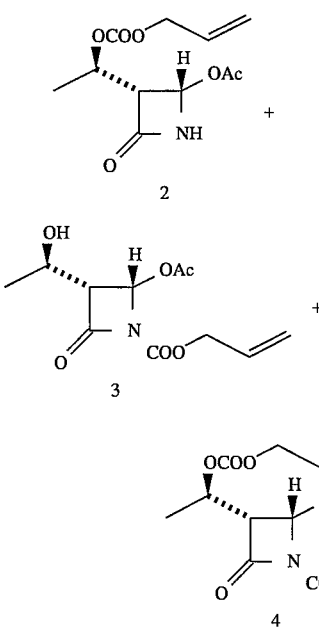

(TABLE 13)
Program Names VACOS:NG1

| No. | Operations | Sub-routines |
|---|---|---|
| 1 | Input reaction conditions. | 1 manual |
| 2 | 1 (1 mmol) is put into a reaction flask (RF3). | 2-3 |
| 3 | Under stirring, reaction solvent, for instance, THF (10 ml in RS2) is added. | |
| 4 | Base, for instance, DMAP, Py (2 mmol/THF 2.5 ml in RR8) is added at room temperature. | 5 |
| 5 | Reaction solvent, for instance, THF (2 ml in RR9) is applied to wash lines. | 6 |
| 6 | Chloroallylester formate (2 mmol/THF, 2.5 ml in RR7) is added dropwise for about one hour at room temperature. | 7 |
| 7 | Stirring is stopped. | 8 |
| 8 | Stirring is effected for about 120 minutes at room temperature (RF3 first reaction). | 9 |
| 9 | RF1 is cooled. AcOEt (20 ml in RS3) and N-HCl (10 ml in RS4) is added under keeping | 10-12 |
| 10 | Under reduced pressure, solvent is removed at 40° C. (RF3). | 13 |
| 11 | RF1 cooling is stopped. | 14 |
| 12 | AcOEt and N HCl having been cooled in RF1 is transferred to RF3. | 15 |
| 13 | bubbling in RF3. | 16 |
| 14 | Organic layer of RF3 (AcOEt layer) is washed with hydrochloric acid and transferred to RF3 without drying. | 17 |
| 15 | Analytical HPLC apparatus is ON. | 20 |
| 16 | Organic layer of RF3 (AcOEt layer) is washed with water including copper sulfate (10 ml each in RR1, RR2) and is dried by Na₂SO₄ and, then, is transferred to RF2. | 18,19,21 |
| 17 | Under reduced, solvent is removed at 60° C. (RF2). | 22 |

(TABLE 13)-continued
Program Names VACOS:NG1

| No. | Operations | Sub-routines |
|---|---|---|
| 18 | Acetonitrile (lo ml in RS6) is added, and solvent is again removed. | 23-25 |
| 19 | Acetonitrile (10 ml in RS6) is added, and the solution is bubbling. | 26-27 |
| 20 | Second reaction in RF2 is effected. (for 2 minutes for HPLC measuring.) | 28 |
| 21 | Analytical HPLC apparatus is OFF. | 29 |
| 22 | The obtained crude products in RF2 is transferred to SR3 (under washing by Acetonitrile). | 30-33 |
| 23 | Apparatus is washed. | 34-65 |

(TABLE 14)

| | | | | | |
|---|---|---|---|---|---|
| Order of Subroutines | | | | | |
| No. 1 | START-1 | No. 2 | F0-STR-ON | No. 3 | RS2-RF3 |
| No. 4 | DELETE | No. 5 | RR8-RF3 | No. 6 | RR9-RF3 |
| No. 7 | RR7-RF3D | No. 8 | F0-STR-OF | No. 9 | RF3-REA-1 |
| No. 10 | COOL-1-ON | No. 11 | RS3-RF1 | No. 12 | RS4-RF1 |
| No. 13 | RF3-CONC1 | No. 14 | COOL-1-OF | No. 15 | RF2-RF3 |
| No. 16 | RF3-BUBB | No. 17 | F3-EA-F3 | No. 18 | RR1-RF1 |
| No. 19 | RF1-RF3 | No. 20 | A-LC ON | No. 21 | F3-XW-F2 |
| No. 22 | RF2-CONC2 | No. 23 | RS6-RS2 | No. 24 | RF2-BUBB |
| No. 25 | RF2-CONC3 | No. 26 | RS6-RF2 | No. 27 | RF2-BUBB |
| No. 28 | RS2-RH-2 | No. 29 | A-LC OF | No. 30 | RF2-SR3 |
| No. 31 | RS6-RF2 | No. 32 | RF2-BUBB | No. 33 | RF2-SR3 |
| No. 34 | WASH | No. 35 | RR3-RF1 | No. 36 | RF1-RF3 |
| No. 37 | RF3-BUBB | No. 38 | RR7-WASH | No. 39 | RF3-SF |
| No. 40 | SF-SR1 | No. 41 | SR1-SF-DR | No. 42 | RR8-WASH |
| No. 43 | RF3-BUBB | No. 44 | RF3-SF | No. 45 | SF-RF2 |
| No. 46 | RF2-BUBB | No. 47 | RF2-SR2 | No. 48 | SR2 DRAIN |
| No. 49 | RS2-RF3 | No. 50 | RS2-RF3 | No. 51 | RF3-BUBB |
| No. 52 | RF3-BUBB | No. 53 | RF3-SF | No. 54 | SF DRAIN |
| No. 55 | RS6-RF2 | No. 56 | RS6-RF2 | No. 57 | RF2-BUBB |
| No. 58 | RF2-BUBB | No. 59 | RF2-SR2 | No. 60 | SR2 DRAIN |
| No. 61 | MATU | No. 62 | RF2 DRY | No. 63 | RF3 DRY |
| No. 64 | FINISH | No. 65 | END | | |

As the synthesis processing apparatus (I) is of the above described construction in the synthesizing the target compounds in the above described respective embodiment, the advantages on the operation to be enumerated hereinafter are provided.

Firstly, the target sample is selected, when the sample is added to the reaction flask and so on from the sample supply unit, so that the volumetric amount or the entire amount can be transported to the desired reaction flask. In this case, the samples set at the desired time can be added at any time. The volumetric amount and the dropping speed are correct and reproducible. Therefore, the loss of the valuable sample can be reduced. In accordance with the temperature conditions, the transportation can be effected at a time and the slow transportation can be effected by the dropping at the cooling time.

Secondly, between the reaction flasks, between the reaction flask and the PH adjusting flask, between the reaction flask and the separation funnel, the solution can be transported optionally even to each trap, thus making it possible to effect the various operations. As the transportation is mainly effected under reduced pressure, harmful vapor is not leaked externally. As all the flow lines are closed, there is no danger of leaking the contents.

Thirdly, at the purifying time, the whole amount of the solution of the respective reaction flasks is injected into the HPLC column so as to effect a purifying operation by the chromatographic method. At this time, a column to be used is selected from two types of columns, and the solvents to be used from two types of developing solvents are elected. Further, the types of the solvents can be switched with time. The various purifying operations in accordance with such target compounds can be effected like this. The division method of the outflowing liquid from the fraction collector is effected by the peak division so as to collect at the large-sized fraction collector. Therefore, the later processing is simplified. A step gradient method, instead of the peak division method, can be used.

At the above described purifying time, the time of the chromatography can be freely selected. If anything unusual is detected, for example, when the developing solvents have run out on the way to the chromatography, the column pressure has become abnormally high, the tube of the fraction collector has become run out, and so on, the chromatographic operation at that time can be stopped, thus preventing the chromatography from being prevented so that the samples are not be wasted. Further, as the data of the chromatography can be preserved, the arrangement is simplified. As the peak circulation can be effected, the ratio of the respective peak can be easily understood.

Fourthly, the bubbling can be effected by the air blowing into the respective reaction flasks, PH adjustment flasks, and the stirring operation can be effected with an external stirrer composed of stirrers and so on, so that the stirring performance can be improved. When necessary in accordance with the reaction, the stirring operation can be effected even at any time.

Fifthly, the cooling, heating operations of the reaction flasks, PH adjusting flasks of the jacket type can be controlled in the wide range of 90° C. from −40° C. Also, in the reaction flask of an oil bath type, the controlling operation can be effected from the room temperature to 200° C. In such a wide range, the temperature can be controlled, and also, the temperature controlling operation can be correctly effected. Further, temperature rising, falling can be effected with better reproducibility, and the boiling reflux operation can be effected in terms of time during the reacting operation.

Sixthly, the concentration and drying of the solution are effected by a bubbling method within the respective reaction flasks. At this time, the end of the concentration is judged using the concentration sensor in the reaction flask of the jacket type, the decomposition of the compounds by the excessive concentration can be controlled. As the concentration is effected by reduced pressure, the vapor of the solvent can be prevented from being diffused.

Seventhly, the contents of the respective reaction flasks are transported to the separation funnels, and are extracted. Thereafter, the solution of the upper layer is separately obtained, is washed when necessary, is dehydrated through the tube and is transported to the respective reaction flask, thus resulting in no waste. As the above described separate liquid is effected with the sensor, dispersion is not caused and the reproducibility is better.

Eighthly, acid or alkali solution can be automatically selected, added while the heating, cooling operations are effected by the PH adjusting flasks, can be easily adjusted to the desired PH. If the PH adjustment can be effected if the organic solvents can coexist at the PH adjusting time.

Ninthly, at the transporting time to the respective reaction flasks from the fraction collector, the purified solution can be transported from the desired fraction tube to the desired reaction fraction collector. In this manner, the yield ratio is improved, because a plurality of reactions can be effected while being purified.

Tenthly, the solution of the separation funnels, the respective traps are once transported to the waste liquid trap. Thereafter, it is wasted out of the system of the apparatus. As all the waste solution is collected once to the waste trap, the processing is simplified. As it is wasted each time, the speed of the transportation liquid is stable as the capacity of the waste trap is always the same.

Eleventhly, the washing liquid to be desired is transported from the two types of washing liquids to the reaction flasks while being washed through each volumetric tube the sample stock tube. Even either of water soluble, organic solvent soluble washing liquids can be washed.

Twelfthly, the analytical reaction tracing samples the solution of a fixed amount from each reaction flask so as to effect a diluting operation. Thereafter, the fixed amount is injected into an analytical HPLC so as to start the analysis. The chromatographic chart is displayed on the CRT. The results are printed out. The progress condition of the reaction can be investigated correctly at the desired time.

Thirteenthly, the conditions of the synthesis to be effected by the use of the automated synthesis apparatus are inputted. In the conditions, the apparatus is controlled, the synthesis recording notes can be simultaneously made as the conditions are printed out. As the synthesis recording notes of the similar types can be provided, the arrangement becomes simplified.

Fourteenth, when the operation control of the synthesis processing apparatus is effected by the automated synthesis controlling program which has make it possible to interrupt of the interrupt program, the predetermined program is changed in accordance with the progress situation so that the operation can be effected with a faster step. Therefore, the synthesis processing operation can be effected efficiently.

As is clear from the foregoing description, according to the automated synthesis apparatus of the present invention. Many types of products can be automatically made through the combination of the substitution values of the different materials of many types by the synthesis processing apparatus. As programs for controlling the operations of the synthesis processing apparatus can be extremely made easily, the utility of the synthesis processing apparatus can be improved.

Namely, many (approximately 150 types or so) unit operation procedures assumed necessary in the various types of synthesis processing operations are made in advance and are stored in retaining means such as a floppy disc, hard disc, IC card, magnetic tape, CD and so on. The synthesis procedure program may be made simply by the inputting operation of only the unit operations names of the above described unit operation procedures in accordance with the operation order when the synthesis procedure program of the particular target compound is made. Therefore, the synthesis procedure program can be made easily even if the synthesizing person is not familiar with the knowledge of the hardware mechanism of the synthesis processing apparatus and the program for making the synthesis procedures.

Even when the synthesis procedure program of the target compound is made as an original from the first step, it can be easily made simply by the inputting of the unit operation names. In addition, when the synthesis procedure program similar to the synthesis procedure program made like this, it can be made more easily with application of corrections addition and so on upon the above described synthesis procedure program. Even those who do not familiar sufficiently with the knowledge of the program can make easily the operation program of the synthesis processing operation which has approximately one hundred and fifty switches, approximately twenty sensors, and so on, thus resulting in considerable advantages. As the synthesis processing apparatus can be operated in accordance with the program by the making of the program to be desired by the synthesizing person with the advantages, the automatic synthesizing apparatus can cope with many syntheses by the sufficient exhibition of the intrinsic performance.

Easier production of the various syntheses makes it possible to produce small amount and many types under the different reaction conditions. In the automation in the conventional factory plant, the simple type may be produced in large quantities by the repetition control of the fixed reaction conditions. The epoch-making effects can be produced in the new drug development and so on. Especially, as the present apparatus is a fully automated apparatus, an operation can be effected for twenty four hours a day, compounds can be produced with better efficiency without assistance. The present apparatus is extremely high in value when many derivatives of one specific compound structure is synthesized.

In the automated synthesis control in accordance with the conventional general program, the operation of the synthesizing apparatus is effected in accordance with the time, conditions and so on set by the program. Even when the reaction has been completed earlier than the set conditions, the reaction processing can be continued, stopped until the set time is completed, thus resulting in inconveniences such as excessive concentration and so on. Even when the progressing condition of the reaction is to be watched, the analysis of the reaction condition cannot be effected by the optional supply of reaction liquid to the analysis reaction tracing unit.

In the present invention, when the synthesis processing operation is effected by the synthesis processing apparatus with the synthesis procedure program being put into the automated synthesis controlling program, the operation set by the program is stopped or the insertion of the operation except for the operation set by the program can be effected through the manual key operation in a case where the interruption of the interrupt program is allowed. For example, when an operator detected with his naked eyes the earlier completion of the reaction than the setting time of the program.

The synthesizing operation is basically effected with an automated control in accordance with the setting of the program, with an advantage that the synthesis processing operation can be effected in a manless condition at night or the like. In the synthesizing operation to be effected when the operator can watch, the manual operation is inserted at any time during the execution of the practice of the program so as to have a faster speed, rationalization of the synthesis processing operation. It is possible to effect the synthesis operation efficiently than when the operation is effected as in the program.

In the apparatus of the present invention, many stages of reactions can be coped with by the free transportation of the reaction liquid among the respective reaction flasks, so that the compounds of many types can be effected. As the reaction tracing HPLC is provided, the progressing condition of the reaction can be automatically judged, the waste of the reaction time or the like can be reduced.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An automated synthesis apparatus comprising;
   a synthesis processing apparatus including;
      a means for shifting contents of at least one container selected from a plurality of storing containers including reaction vessels to another container;
      a reaction means for reacting the contents of selected reaction vessels;
      an analyzing means for analyzing with analyzers at least one portion of the contents taken out from the reaction vessels;
      a purifier means for separating and purifying with purifiers at least one material from the contents of the reaction vessels; and
      a restoring means for restoring each of said means of said synthesis processing apparatus to their initial conditions; and
   a control apparatus including:
      a storing means for storing in advance a plurality of unit operating procedures, each of said unit operating procedures operating one of said means of said synthesis processing apparatus;
      a compiler means for compiling at least one unit operating procedure selected by said storing means for setting up an operating procedure for synthesizing a specific target compound;
      an organizing means for selecting from and connecting together each means of said synthesis processing apparatus in accordance with the operating procedure of the compiler means to set up control procedures for operating all of the selected means of the synthesis processing apparatus in sequence; and
      an operating means of a computer for actuating the control procedures to operate each means of said synthesis processing apparatus for synthesizing the specific target compound.

2. The automated synthesis apparatus in accordance with claim 1, wherein the shifting means is provided for moving the contents to another container from one container in said synthesis processing apparatus and for circulating the contents of the container within flow lines which communicate mutually with the respective means and among components of the respective means, including opening and closing valve means and quantifiers; and wherein sensors are interposed among the flow lines, and wherein the opening and closing valve means, the quantifiers, and the sensors are connected to said control apparatus.

3. The automated synthesis apparatus in claim 1 or 2, wherein the shifting means includes a device for moving the contents by applying a pressure thereto or a device for moving the contents by gravity.

4. The automated synthesis apparatus in accordance with claim 1 or 2, wherein the reacting means comprises at least one of: a temperature means for controlling the reaction temperature of the contents; a stirring means for stirring the contents; a dropping means for dropping the contents to effect an addition; a timer means for controlling the reaction time of the contents; a drying means for drying the contents; a means of extracting the specific reaction mixture from the contents.

5. The automated synthesis apparatus in accordance with claim 1 or 2, wherein the respective means of the synthesis processing apparatus comprise:
   a sample supply unit provided with: a plurality of storing containers for storing raw materials, reagents, solvents, pH adjusting liquids; a means for automatically feeding the sample from storing cells to the storing containers, a volumetric tube and a sensor for measuring the samples to be transported from the storing containers; a flow line for a flowing operation from each of the storing container to another element of said synthesis processing apparatus, and an electromagnetic valve for opening and closing flow passages interposed in each flow line;
   a reaction unit composed of: a reaction vessel unit; an extraction/dehydration unit; a pH adjusting unit and a reaction unit, provided with a plurality of reaction vessels and pH adjusting vessels; flow lines for feeding a sample of an optional storing container from among storing containers provided in the sample supply unit; flow lines provided for circulating samples among the plurality of reaction vessels, and among these reaction vessels and pH compensating vessels; extraction/separation funnels and dehydrating tubes provided for circulating samples through the flow lines among the respective vessels, a means for analyzing a reaction liquid connected through the respective reaction vessels and flow lines; and electromagnetic valves for opening and closing the flow passages interposed in the respective flow lines;
   a purifying unit provided with a purifier connected to the respective reaction vessels and flow lines provided in the reaction units, and to a fraction collector so as to feed an optional purified product collected in the fraction collector through the flow lines to the reaction vessels of the reaction units;
   a temperature control unit provided with a means for circulating hot media or cold media to heat or cool the reaction vessels and a separate heater for also heating the reaction vessels;
   a washing unit for transporting the washing liquid to the reaction vessels and quantifying devices.

6. The automated synthesis apparatus in accordance with claim 1 or 2, wherein the control apparatus controls the driving of the synthesis processing apparatus in accordance with an inputted synthesis procedure program, and also, enables a manual input of an interrupt program during the execution of the synthesis procedure program so that the control of the synthesis processing apparatus may be effected in accordance with the manually inputted interrupt program.

7. A method for automatically controlling the operation of an automated synthesis apparatus which includes: a means for shifting contents of at least one container selected from a plurality of storing containers, including reaction vessels to another container; a means for reacting the contents of selected reaction vessels; a means for analyzing with analyzers at least one portion of the contents taken out of the reaction vessels; a means for separating and purifying with purifiers at least one material from the contents of the reaction vessels; and a means for restoring each of the means to their initial condition, said method comprising the steps of:
   storing in advance a plurality of unit operating procedures, each of the operating unit procedures operating one of the means of the synthesis processing apparatus;

compiling at least one selected unit operating procedure to set up an operating procedure for synthesizing a specific target compounds;

selecting and connecting together each means of the synthesis processing apparatus in accordance with the compiled operating procedures to set up control procedures for operating all of the selected means of the synthesis processing apparatus in sequence; and actuating the control procedure to operate each means of the synthesis processing apparatus for synthesizing the specific target compound.

8. The controlling method in accordance with claim 7, further comprising the steps of, in a unit operating procedure for operating a means for moving the contents to another container from one storing container and circulating the contents to the container: feeding a required amount to one specific reaction vessel of the reaction unit from one specific storing container of the sample supply unit; feeding an entire amount of samples from one specific storing container of the sample supply unit to one specific reaction vessel; transporting the contents of one specific reaction vessel to another specific reaction vessel; extraction/dehydration the contents of one specific reaction vessel and to transport an upper layer liquid to another specific reaction vessel; extraction/dehydration of the contents of one specific reaction vessel and to transport a lower layer liquid to another specific reaction vessel, transporting the contents from one specific reaction vessel to the pH adjusting vessel; transporting the contents of the pH adjusting vessel to one specific reaction vessel; transporting the contents of a fraction tube to one specific reaction vessel; transporting the contents of one specific reaction vessel to the container of the purifying unit; transporting the contents of one specific reaction vessel to the extraction/separation funnel; wasting the contents from the extraction/separation funnel; transporting the contents of the storing container of the extraction/dehydration unit to the extraction/separation funnels for washing them; transporting the contents of the extraction/separation funnels to the storing container; transporting the contents of the extraction/separation funnels to two specific reaction vessels; transporting the contents of the extraction/separation funnels to one specific reaction vessel; transporting the contents of one specific reaction vessel to the storing container of the reaction analyzing unit; and transporting the washing liquid to one specific reaction vessel through one specific quantifier device.

9. The controlling method in accordance with claim 7, comprising the steps of, in a unit operating procedure for operating a means for reacting the contents of the selected specific reaction vessel: in starting the cooling of one specific contents in the reaction vessel; completing the cooling of one specific contents in the reaction vessel; effecting the concentration amount of one specific contents in the reaction vessel; starting the stirring of one specific contents in the reaction vessel; completing the stirring of one specific contents in the reaction vessel.

10. The controlling method in accordance with claim 7, comprising the step of, in a unit operating procedure for operating a means for automatically analyzing with an analyzer with one portion of the reactant taken out from the reaction vessel being selected: turning on an analyzing HPLC switch; turning off the analyzing HPLC switch; sampling the samples of one specific reaction vessel to effect the analyzing operation with HPLC after dilution.

11. The controlling method in accordance with claim 7, further comprising the steps of, in a unit operating procedure for operating a means for separating and purifying a specific material from the contents within the reaction vessel by a separating and purifying device selecting a chromatocolumn to operate with a detector; resetting the chromatocolumn and the detector; and purifying samples to an HPLC from the storing container so as to effect a chromatographing operation.

12. The controlling method in accordance with claim 7, further comprising the steps of, in a unit operating procedure for operating a means for restoring the means of the automated synthesis apparatus to their initial conditions: transporting a washing liquid to one specific reaction vessel through one specific quantifying device; drying one specific reaction vessel; said drying the flow lines.

13. The controlling method in accordance with claim 7, further comprising a step of including, in the unit operation procedure, a starting procedure of setting by inputting of the synthesis conditions, a sub-operation procedure for execution exclusive use.

14. The controlling method in accordance with claim 7, further comprising the steps of, in the effecting a synthesis procedure program: inputting a program name; selecting a start procedure for inputting synthesis conditions; selecting a unit operating procedure; and sequentially inputting a name of the unit operating procedure selected in accordance with an operation order so as to effect a combining operation.

15. The controlling method in accordance with claim 7, further comprising the step of interrupting the execution in accordance with the synthesis procedure program by an automatic synthesis controlling program in accordance with an interrupt program so that the driving of the synthesis processing apparatus is effected in accordance with the interruption program.

16. The controlling method in accordance with claim 15, further comprising the step of including, in the interrupt program: a program for changing a time setting of a reaction, or changing a concentration of the synthesis procedure program; a program arranged so that an analysis start and completion can be effected at an optional time; a program for re-setting conditions at a purification time; and a program adapted to change so that a determination so as to the completion of a reaction may be effected by an automatic analysis of a reaction condition, instead of a time setting.

17. The automated synthesis apparatus in accordance with claim 3, wherein the reacting means comprises at least one of: a temperature means for controlling the reaction temperature of the contents; a stirring means for stirring the contents; a dropping means for dropping the contents to effect an addition; a timer means for controlling the reaction time of the contents; a drying means for drying the contents; a means of extracting the specific reaction mixture from the contents.

18. The automated synthesis apparatus in accordance with claim 3, wherein the respective means of the synthesis processing apparatus comprise:

a sample supply unit provided with; plurality of storing containers for storing raw materials, reagents, solvents, pH adjusting liquids; a means for automatically feeding the sample from storing cells to the storing containers, a volumetric tube and a sensor for measuring the samples to be transported from the storing containers; a flow line for a flowing operation from each of the storing container to another element of said synthesis processing apparatus, and an electromagnetic valve for opening and closing flow passages interposed in each flow line;

a reaction unit composed of: a reaction vessel unit; an extraction/dehydration unit; a pH adjusting unit and a reaction unit, provided with a plurality of reaction vessels and pH adjusting vessels; flow lines for feeding a sample of an optional storing container from among storing containers provided in the sample supply unit; flow lines provided for circulating samples among the plurality of reaction vessels, and among these reaction vessels and Ph compensating vessels; extraction/separation funnels and dehydrating tubes provided for circulating samples through the flow lines among the respective vessels, a means for analyzing a reaction liquid connected through the respective reaction vessels and flow lines; and electromagnetic valves for opening and closing the flow passages interposed in the respective flow lines;

a purifying unit provided with a purifier connected to the respective reaction vessels and flow lines provided in the reaction units, and to a fraction collector so as to feed an optional purified product collected in the fraction collector through the flow lines to the reaction vessels of the reaction units;

a temperature control unit provided with a means for circulating hot media or cold media to heat or cool the reaction vessels and a separate heater for also heating the reaction vessels;

a washing unit for transporting the washing liquid to the reaction vessels and quantifying devices.

19. The automated synthesis apparatus in accordance with claim 4, wherein the respective means of the synthesis processing apparatus comprise:

a sample supply unit provided with: a plurality of storing containers for storing raw materials, reagents, solvents, pH adjusting liquids; a means for automatically feeding the sample from storing cells to the storing containers, a volumetric tube and a sensor for measuring the samples to be transported from the storing containers; a flow line for a flowing operation from each of the storing container to another element of said synthesis processing apparatus, and an electromagnetic valve for opening and closing flow passages interposed in each flow line;

a reaction unit composed of: a reaction vessel unit; an extraction/dehydration unit; a pH adjusting unit and a reaction unit, provided with a plurality of reaction vessels pH adjusting vessels; flow lines for feeding a sample of an optional storing container from among storing containers provided in the sample supply unit; flow lines provided for circulating samples among the plurality of reaction vessels, and among these reaction vessels and pH compensating vessels; extraction/separation funnels and dehydrating tubes provided for circulating samples through the flow lines among the respective vessels, a means for analyzing a reaction liquid connected through the respective reaction vessels and flow lines; and electromagnetic valves for opening and closing the flow passages interposed in the respective flow lines;

a purifying unit provided with a purifier connected to the respective reaction vessels and flow lines provided in the reaction units, and to a fraction collector so as to feed an optional purified product collected in the fraction collector through the flow lines to the reaction vessels of the reaction units;

a temperature control unit provided with a means for circulating hot media or cold media to heat or cool the reaction vessels and a separate heater for also heating the reaction vessels;

a washing unit for transporting the washing liquid to the reaction vessels and quantifying devices.

20. The automated synthesis apparatus in accordance with claim 17, wherein the respective means of the synthesis processing apparatus comprises:

a sample supply unit provided with; a plurality of storing containers for storing raw materials, reagents, solvents, pH adjusting liquids; a means for automatically feeding the sample from storing cells to the storing containers, a volumetric tube and a sensor for measuring the samples to be transported from the storing containers; a flow line for a flowing operation from each of the storing container to another element of said synthesis processing apparatus, and an electromagnetic valve for opening and closing flow passages interposed in each flow line;

a reaction unit composed of: a reaction vessel unit; an extraction/dehydration unit; a pH adjusting unit and a reaction unit, provided with a plurality of reaction vessels pH adjusting vessels; flow lines for feeding a sample of an optional storing container from among storing containers provided in the sample supply unit; flow lines provided for circulating samples among the plurality of reaction vessels, and among these reaction vessels and pH compensating vessels; extraction/separation funnels and dehydrating tubes provided for circulating samples through the flow lines among the respective vessels, a means for analyzing a reaction liquid connected through the respective reaction vessels and flow lines; and electromagnetic valves for opening and closing the flow passages interposed in the respective flow lines;

a purifying unit provided with a purifier connected to the respective reaction vessels and flow lines provided in the reaction units, and to a fraction collector so as to feed an optional purified product collected in the fraction collector through the flow lines to the reaction vessels of the reaction units;

a temperature control unit provided with a means for circulating hot media or cold media to heat or cool the reaction vessels and a separate heater for also heating the reaction vessels;

a washing unit for transporting the washing liquid to the reaction vessels and quantifying devices.

21. The automated synthesis apparatus in accordance with claim 3, wherein the control apparatus controls the driving of the synthesis processing apparatus in accordance with an inputted synthesis procedure program, and also, enables a manual input of an interrupt program during the execution of the synthesis procedure program so that the control of the synthesis processing apparatus may be effected in accordance with the manually inputted interrupt program.

22. The automated synthesis apparatus in accordance with claim 4, wherein the control apparatus controls the driving of the synthesis processing apparatus in accordance with an inputted synthesis procedure program, and also, enables a manual input of an interrupt program during the execution of the synthesis procedure program so that the control of the synthesis processing apparatus may be effected in accordance with the manually inputted interrupt program.

23. The automated synthesis apparatus in accordance with claim 5, wherein the control apparatus controls the driving of the synthesis processing apparatus in accordance with an inputted synthesis procedure program, and also, enables a manual input of an interrupt program during the execution of the synthesis procedure program so that the control of the synthesis processing apparatus may be effected in accordance with the manually inputted interrupt program.

24. The automated synthesis apparatus in accordance with claim 17, wherein the control apparatus controls the driving of the synthesis processing apparatus in accordance with an inputted synthesis procedure program, and also, enables a manual input of an interrupt program during the execution of the synthesis procedure program so that the control of the synthesis processing apparatus may be effected in accordance with the manually inputted interrupt program.

25. The automated synthesis apparatus in accordance with claim 18, wherein the control apparatus controls the driving of the synthesis processing apparatus in accordance with an inputted synthesis procedure program, and also, enables a manual input of an interrupt program during the execution of the synthesis procedure program so that the control of the synthesis processing apparatus may be effected in accordance with the manually inputted interrupt program.

26. The automated synthesis apparatus in accordance with claim 19, wherein the control apparatus controls the driving of the synthesis processing apparatus in accordance with an inputted synthesis procedure program, and also, enables a manual input of an interrupt program during the execution of the synthesis procedure program so that the control of the synthesis processing apparatus may be effected in accordance with the manually inputted interrupt program.

27. The automated synthesis apparatus in accordance with claim 20, wherein the control apparatus controls the driving of the synthesis processing apparatus in accordance with an inputted synthesis procedure program, and also, enables a manual input of an interrupt program during the execution of the synthesis procedure program so that the control of the synthesis processing apparatus may be effected in accordance with the manually inputted interrupt program.

28. The automated synthesis apparatus in accordance with claims 1 or 2, wherein the respective means of the synthesis processing apparatus comprise:

a sample supply unit provided with: a plurality of storing containers for storing raw materials, reagents, solvents, pH adjusting liquids; a means for automatically feeding the sample from storing cells to the storing containers, a volumetric tube and a sensor for measuring the samples to be transported from the storing containers; a flow line for flowing operation from each of the storing container to another element of said synthesis processing apparatus and an electromagnetic valve for opening and closing flow passages interposed in each flow line;

a reaction unit composed of: a reaction vessel unit; an extraction/dehydration unit; a pH adjusting unit and a reaction unit, provided with a plurality of reaction vessels and pH adjusting vessels; flow lines for feeding a sample of an optional storing container from among storing containers provided in the sample supply unit; flow lines provided for circulating samples among the plurality of reaction vessels, and among these reaction vessels and pH compensating vessels; extraction/separation funnels and dehydrating tubes provided for circulating samples through the flow lines among the respective vessels, a means for analyzing a reaction liquid connected through the respective reaction vessels and flow lines; and electromagnetic valves for opening and closing the flow passages interposed in the respective flow lines;

a purifying unit for separating each of upper and lower layers of a separated liquid by utilizing the difference in electrical conductivity of the upper and lower layers and connected through the respective reaction vessels and flow lines provided in the reaction units, and with a fraction collector so as to feed an optional purified products collected to the fraction collector through the flow lines to the reaction vessels of the reaction units;

a temperature control unit provided with a means for circulating hot media or cold media to heat or cool the reaction vessels and a separate heater for also heating the reaction vessels;

a washing unit for transporting the washing liquid to the reaction vessels and quantifying devices.

29. An apparatus in accordance with claim 28, wherein the purifying unit comprises: an electode provided for measuring in a plurality of level positions the electric conduction degree of a solution within a cell, and a deciding means for deciding whether or not the electric conduction degree detected in the plurality of level positions becomes the same as the measured value at the previous time.

30. An apparatus in accordance with claim 28, wherein the purifying unit comprises: a pair of electrodes for measuring the electrode conduction degree of a solution to be discharged from a cell, and a deciding means for deciding whether or not variations are caused in the electric conduction degree measured by the opposite electrode.

31. An apparatus in accordance with claim 28, wherein the purifying unit comprises: an electrode provided for measuring in a plurality of level positions the electric conduction degree of a solution within a cell, a pair of opposite electrodes for measuring the electric conduction degree of the solution to be discharged from the cell, a first deciding means for deciding whether or not the electric conduction degree detached in the plurality of level positions has become the same as the measured value at the previous time, and a second deciding means for deciding whether or not the vibrations are caused in the electric conduction degree measured by the opposite electrode at the discharging time of the solution.

32. An apparatus in accordance with claim 28, further comprising a control means for controlling so that the open time of the above-described valve may become shorter as the PH for measuring with the PH meter becomes closer to a target valve.

33. An apparatus in accordance with claim 29, wherein an electrode provided within a cell is composed of a common electrode disposed in the upper, lower directions, an individual electrode disposed in a plurality of levels in given intervals in the upper, lower directions sidewards of the common electrode.

34. An apparatus in accordance with claim 30, wherein the one pair of opposite electrodes are oppositely disposed in the discharging opening of the cell.

35. An apparatus in accordance with claim 31, where the cell is composed of a separated liquid funnel.

36. An apparatus in accordance with claim 31, further comprising a valve for dripping acid an alkali into a cell, a PH meter for measuring the PH within the cell, a means for stirring the solution within the cell are provided, the PH being adapted to be measured after the decision of the separation of two layer by the deciding means after the stirring stop.

37. The automated synthesis apparatus in accordance with claims 1 or 2, wherein the respective means of the synthesis processing apparatus comprise:

a sample supply unit provided with; a plurality of storing containers for storing raw materials, reagents, solvents, pH adjusting liquids; a means for automatically feeding the sample from storing cells to the storing containers, a volumetric tube and a sensor for measuring the samples to be transported from the storing containers; a flow line for flowing operation from each of the storing container to another element of said synthesis processing apparatus, and an electromagnetic valve for opening and closing flow passages interposed in each flow line;

a reaction unit composed of: a reaction vessel unit; an extraction/dehydration unit a pH adjusting unit and a reaction unit, provided with a plurality of reaction vessels and pH adjusting vessels; flow lines for feeding a sample of an optional storing container from among storing containers provided in the sample supply unit; flow lines provided for circulating samples among the plurality of reaction vessels, and among these reaction vessels and pH compensating vessels; extraction/separation funnels and dehydrating tubes provided for circulating samples through the flow lines among the respective vessels, a means for analyzing a reaction liquid connected through the respective reaction vessels and flow lines; and electromagnetic valves for opening and closing the flow passages interposed in the respective flow lines;

a purifying unit comprising a purifier combined with a separation liquid unit and connected through the respective reaction vessels and flow lines provided in the reaction units, and to a fraction collector so as to feed an optional purified product collected in the fraction collector through the flow lines to the reaction vessels of the reaction units;

a temperature control unit provided with a means for circulating hot media or cold media to heat or cool the reaction vessels and a separate heater for also heating the reaction vessels;

a washing unit for transporting the washing liquid to the reaction vessels and quantifying devices.

* * * * *